(12) United States Patent
Iguchi

(10) Patent No.: US 10,663,315 B2
(45) Date of Patent: *May 26, 2020

(54) VEHICLE DISPLAY CONTROL DEVICE AND VEHICLE DISPLAY CONTROL METHOD

(71) Applicant: DENSO CORPORATION, Kariya, Aichi-pref. (JP)

(72) Inventor: Sei Iguchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/013,223

(22) Filed: Jun. 20, 2018

(65) Prior Publication Data

US 2018/0299286 A1 Oct. 18, 2018

Related U.S. Application Data

(63) Continuation of application No. 15/549,491, filed as application No. PCT/JP2016/000489 on Feb. 1, 2016, now Pat. No. 10,197,414.

(51) Int. Cl.
*G01C 21/34* (2006.01)
*G01C 21/36* (2006.01)
(Continued)

(52) U.S. Cl.
CPC ............ *G01C 21/365* (2013.01); *B60K 35/00* (2013.01); *B60W 30/0956* (2013.01);
(Continued)

(58) Field of Classification Search
CPC .......... G01C 21/365; G08G 1/096805; G08G 1/096861; B60W 30/12; B60W 30/0956;
(Continued)

(56) References Cited

U.S. PATENT DOCUMENTS 8,195,386 B2 * 6/2012 Hu ..................... G01C 21/3647
345/7
9,393,870 B2 * 7/2016 Ng-Thow-Hing .......................... G02B 27/0101
(Continued)

FOREIGN PATENT DOCUMENTS

DE 10 2011 007329 10/2012
JP 2005-199992 7/2005
(Continued)

*Primary Examiner* — Jose R Soto Lopez
(74) *Attorney, Agent, or Firm* — Knobbe, Martens, Olson & Bear, LLP

(57) ABSTRACT

A vehicle display control device controls a virtual image display performed by a head-up display which superimposes a display image on outside scenery of the host vehicle. The host vehicle is equipped with an automatic control unit which executes an automatic control to the host vehicle. The vehicle display control device includes: a route information acquisition unit that acquires route information related to a scheduled route of the host vehicle, the automatic control unit setting the scheduled route for the host vehicle; and a route image formation unit that forms a route image indicative of the scheduled route based on the route information acquired by the route information acquisition unit. The head-up display projects the route image as the display image in a virtual image display region that is superimposed on a forward traveling road included in the outside scenery.

16 Claims, 33 Drawing Sheets

(51) Int. Cl.
*B60K 35/00* (2006.01)
*G02B 27/01* (2006.01)
*G09G 5/00* (2006.01)
*B60W 30/095* (2012.01)
*B60W 30/12* (2020.01)
*G08G 1/0968* (2006.01)
*B60W 30/08* (2012.01)
*B60W 50/14* (2020.01)

(52) U.S. Cl.
CPC ............. *B60W 30/12* (2013.01); *G02B 27/01* (2013.01); *G08G 1/096805* (2013.01); *G08G 1/096861* (2013.01); *G09G 5/00* (2013.01); *B60K 2370/1529* (2019.05); *B60K 2370/166* (2019.05); *B60K 2370/177* (2019.05); *B60K 2370/334* (2019.05); *B60W 30/08* (2013.01); *B60W 2050/146* (2013.01); *G02B 2027/0138* (2013.01); *G02B 2027/0141* (2013.01)

(58) Field of Classification Search
CPC .. B60W 2050/146; B60W 30/08; G09G 5/00; G02B 27/01; G02B 2027/0138; G02B 2027/0141; B60K 35/00; B60K 2370/177; B60K 2370/166; B60K 2370/1529; B60K 2370/334
See application file for complete search history.

(56) References Cited

U.S. PATENT DOCUMENTS

| | | | |
|---|---|---|---|
| 9,733,100 B2* | 8/2017 | Milicic | G01C 21/3658 |
| 10,102,438 B2* | 10/2018 | Kishi | G02B 27/01 |
| 10,215,583 B2* | 2/2019 | Ng-Thow-Hing | H04N 7/188 |
| 10,281,293 B2* | 5/2019 | Musabji | G01C 21/3638 |
| 2003/0132862 A1* | 7/2003 | Kurosawa | G01C 21/3635 340/995.1 |
| 2005/0154505 A1 | 7/2005 | Nakamura et al. | |
| 2005/0182551 A1* | 8/2005 | Sugano | B60K 31/0008 701/96 |
| 2005/0232469 A1* | 10/2005 | Schofield | B60R 1/12 382/104 |
| 2005/0267684 A1 | 12/2005 | Kawakami | |
| 2007/0043503 A1* | 2/2007 | Oesterling | G01C 21/00 701/431 |
| 2007/0106475 A1* | 5/2007 | Kondoh | B60K 26/021 701/301 |
| 2007/0109148 A1* | 5/2007 | Wada | G01C 21/36 340/995.17 |
| 2008/0136612 A1* | 6/2008 | Machii | G01S 11/12 340/435 |
| 2009/0005961 A1* | 1/2009 | Grabowski | G01C 21/365 701/532 |
| 2009/0140845 A1* | 6/2009 | Hioki | B60K 35/00 340/425.5 |
| 2009/0143974 A1* | 6/2009 | Adachi | G01C 21/34 701/532 |
| 2010/0153000 A1* | 6/2010 | Akita | G01C 21/3632 701/429 |
| 2010/0268452 A1* | 10/2010 | Kindo | G01C 21/3658 701/533 |
| 2011/0029230 A1* | 2/2011 | Kimura | G01C 21/3461 701/533 |
| 2011/0052042 A1* | 3/2011 | Ben Tzvi | G06T 19/006 382/154 |
| 2011/0251768 A1* | 10/2011 | Luo | B60W 30/12 701/70 |
| 2012/0062743 A1* | 3/2012 | Lynam | B60Q 9/005 348/148 |
| 2012/0093357 A1* | 4/2012 | Seder | B60W 30/095 382/103 |
| 2012/0169513 A1* | 7/2012 | Szczerba | G02B 27/01 340/905 |
| 2012/0173069 A1* | 7/2012 | Tsimhoni | G01C 21/365 701/25 |
| 2012/0215377 A1* | 8/2012 | Takemura | B60W 30/12 701/1 |
| 2013/0097557 A1* | 4/2013 | Madau | G02B 27/01 715/810 |
| 2013/0226455 A1* | 8/2013 | Hayashida | G01C 21/3415 701/533 |
| 2014/0005908 A1 | 1/2014 | Kollberg | |
| 2014/0092134 A1* | 4/2014 | Nagasawa | B60K 35/00 345/633 |
| 2014/0092250 A1* | 4/2014 | Nagasawa | G01C 21/3602 348/148 |
| 2014/0225721 A1* | 8/2014 | Simon | B60K 35/00 340/435 |
| 2014/0272812 A1* | 9/2014 | Hing | G02B 27/01 434/69 |
| 2014/0297174 A1* | 10/2014 | Tomizawa | G01C 21/365 701/408 |
| 2014/0365965 A1* | 12/2014 | Bray | G06T 11/001 715/810 |
| 2015/0094955 A1* | 4/2015 | Lee | H04W 4/021 701/532 |
| 2015/0331487 A1* | 11/2015 | Roth | B60K 37/00 345/156 |
| 2015/0363934 A1* | 12/2015 | Ko | G01C 21/3602 701/431 |
| 2015/0375679 A1* | 12/2015 | Ann | B60R 1/00 348/148 |
| 2016/0073031 A1* | 3/2016 | Watanabe | G02F 1/0121 345/7 |
| 2016/0075235 A1* | 3/2016 | Takamatsu | B60K 35/00 340/438 |
| 2016/0153789 A1* | 6/2016 | Gallar | G01C 21/3635 701/408 |
| 2016/0153802 A1* | 6/2016 | Sato | G01C 21/3626 701/526 |
| 2016/0167514 A1* | 6/2016 | Nishizaki | B60K 35/00 345/7 |
| 2016/0170487 A1* | 6/2016 | Saisho | G01C 21/3635 345/156 |
| 2016/0216521 A1* | 7/2016 | Yachida | G01C 21/365 |
| 2017/0146796 A1 | 5/2017 | Kosaka | |
| 2017/0227372 A1 | 8/2017 | Chen | |
| 2018/0023970 A1 | 1/2018 | Iguchi | |
| 2019/0057552 A1* | 2/2019 | Ko | G06T 17/05 |

FOREIGN PATENT DOCUMENTS

| | | |
|---|---|---|
| JP | 2013-078964 | 5/2013 |
| JP | 2013-237290 | 11/2013 |
| JP | 2014-213763 | 11/2014 |

* cited by examiner

VEHICLE DISPLAY CONTROL DEVICE AND VEHICLE DISPLAY CONTROL METHOD

CROSS REFERENCE TO RELATED APPLICATION

This application is a continuation application of U.S. patent application Ser. No. 15/549,491, filed on Aug. 8, 2017, which is a national stage application under 35 U.S.C. § 371(c) of PCT Application No. PCT/JP2016/000489, filed on Feb. 1, 2016, which claims priority from Japanese Patent Application No. 2015-023622, filed on Feb. 9, 2015, the disclosures of which are incorporated herein by reference.

TECHNICAL FIELD

The present disclosure relates to a vehicle display control device and a vehicle display control method.

BACKGROUND ART

Up to now, a vehicle display control device that controls a virtual image display for a head-up display (HUD: head-up display) that superimposes a display image related to a traveling state of a host vehicle that is automatically controlled by an automatic control unit on an outside scenery of the host vehicle to perform the virtual image display has been widely known.

In a device disclosed in Patent Literature 1 as one type of the vehicle display control device described above, an emphasized image emphasizing the presence of a preceding vehicle in an outside scenery is displayed by the HUD as a virtual image at a position superimposed on a forward traveling road in the outside scenery. In this example, the automatic control unit installed in the vehicle to which the device is applied is a cruise control unit which automatically controls the cruising of the host vehicle. Therefore, during a cruise control of the cruise control unit, an emphasized image formed in a virtual image display region is formed. This allows a user to correctly and promptly grasp the presence of the preceding vehicle from which a distance to the host vehicle is secured under the control of the cruise control unit, and therefore the feeling of security can be brought to the user.

PRIOR ART LITERATURE

Patent Literature

Patent Literature 1: German Patent Application Publication No. 102011007329

SUMMARY OF INVENTION

Information to be known by the user during the control of the automatic control unit is not just the presence of the preceding vehicle. For example, whether the scheduled route to be scheduled for the host vehicle under the control of the automatic control unit is a correct route desired by the user, or not, is important in bringing the feeling of security to the user.

The present disclosure has been made in view of the above difficulties, and an object of the present disclosure is to provide a vehicle display control device and a vehicle display control method which bring the feeling of security to a user.

According to an aspect of the present disclosure, a vehicle display control device executing a control to a virtual image display performed by a head-up display is provided. The head-up display superimposes a display image related to a traveling state of a host vehicle on an outside scenery of the host vehicle to perform the virtual image display, and an automatic control unit is equipped to the host vehicle and executes an automatic control to the traveling state of the host vehicle. The vehicle display control device includes a route information acquisition unit and a route image formation unit. The route information acquisition unit acquires route information related to a scheduled route of the host vehicle, and the automatic control unit sets the scheduled route for the host vehicle. The route image formation unit forms a route image indicative of the scheduled route based on the route information acquired by the route information acquisition unit. The head-up display projects the route image as the display image in a virtual image display region that is superimposed on a forward traveling road included in the outside scenery. The route information acquisition unit and the route image formation unit are implemented by at least one processor.

According to another aspect of the present disclosure, a vehicle display control method for executing a control to a virtual image display performed by a head-up display is provided. The head-up display superimposes a display image related to a traveling state of a host vehicle on an outside scenery of the host vehicle to perform the virtual image display, and an automatic control unit is equipped to the host vehicle and executes an automatic control to the travelling state of the host vehicle. The vehicle display control method comprising: acquiring route information related to a scheduled route of the host vehicle, the automatic control unit setting the scheduled route for the host vehicle; and forming a route image indicative of the scheduled route based on the route information that is acquired, the head-up display projecting the route image as the display image in a virtual image display region that is superimposed on a forward traveling road included in the outside scenery. The acquiring of the route information and the forming of the route image are executed by at least one processor.

According to the vehicle display control device and the vehicle display control method, the route image are projected as the display image by the HUD in the virtual image display region which is superimposed on the forward traveling road of the host vehicle. At this time, the route image is formed based on the route information related to the scheduled route so as to indicate the scheduled route scheduled for the host vehicle under the automatic control of the automatic control unit, and the route image is superimposed on the forward traveling road. This makes it possible for the user to grasp the correctness of the scheduled route intuitively and in advance, based on a superimposed condition on the forward traveling road, thereby being capable of bringing the feeling of security to the user.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Figure 1:
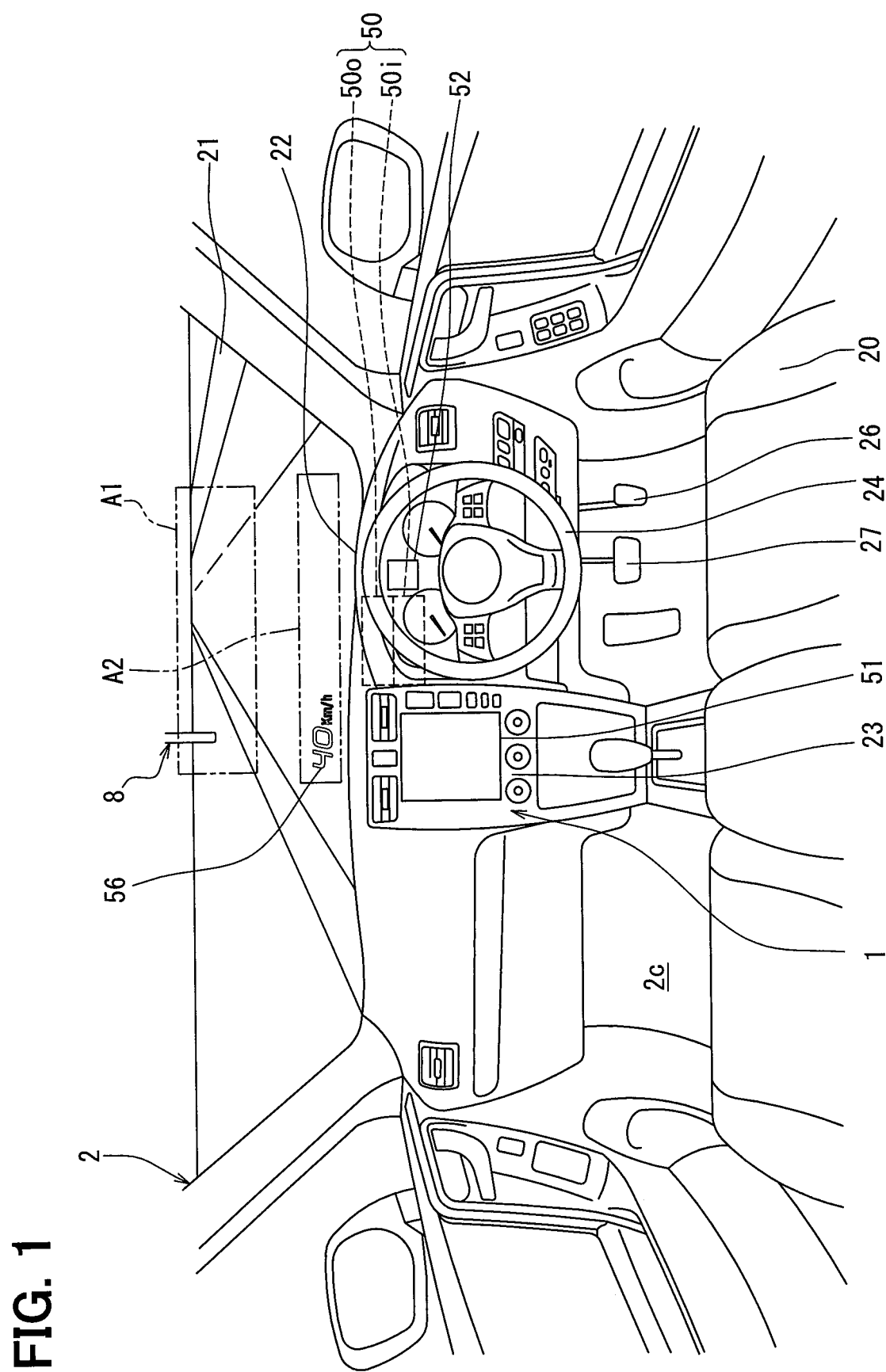
FIG. 1 is an internal view illustrating an inside of a vehicle compartment of a host vehicle equipped with a travel assist system according to a first embodiment of the present disclosure.

Hereinafter, description will be given of the multiple embodiments of the present disclosure based on the drawings. The same reference numerals are assigned to the corresponding elements in the embodiments, and overlapping descriptions thereof may be omitted. When only a portion of a configuration in each embodiment is described, with respect to other portions of the configuration, configurations of other embodiments described in advance can be applied. In addition to the combinations of configurations clearly depicted in the explanation of the embodiments, as long as problems do not particularly arise in a combination, the configurations of multiple embodiments may be partially combined with each other, even when not clearly described.

(First Embodiment)

Figure 2:
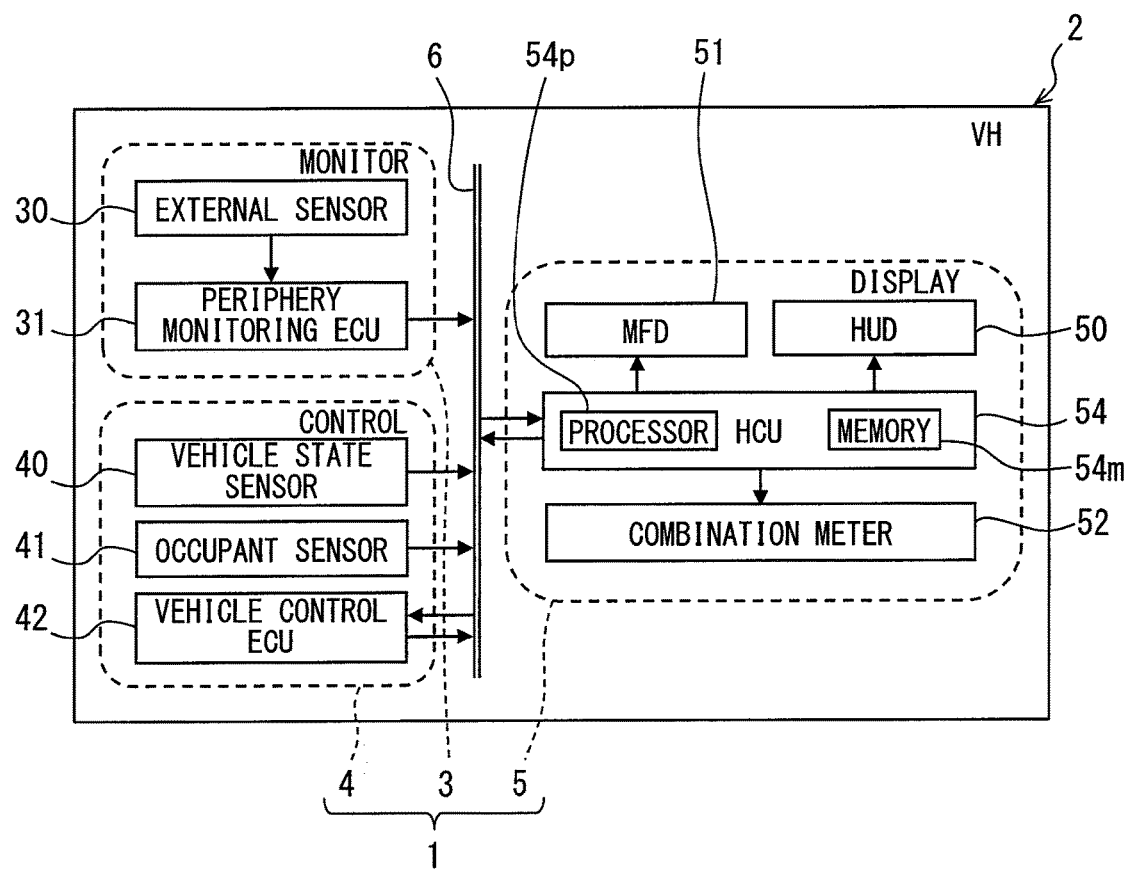
FIG. 2 is a block diagram illustrating a travel assist system according to the first embodiment.

A travel assist system 1 according to a first embodiment of the present disclosure is mounted on a host vehicle (VH) 2 as illustrated in FIGS. 1 and 2.

As illustrated in FIG. 2, the travel assist system 1 includes a periphery monitoring system (MONITOR) 3, a vehicle control system (CONTROL) 4, and a display system (DISPLAY) 5. The respective systems 3, 4, and 5 of the travel assist system 1 are connected to each other through an in-vehicle network 6 such as a LAN (local area network).

The periphery monitoring system 3 includes an external sensor 30 and a periphery monitoring ECU (electronic control unit) 31. The external sensor 30 detects an obstacle that may exist in the outside of the host vehicle 2 and collide with the host vehicle 2, such as other vehicles, artificial structures, humans, or animals, and traffic indications existing in the outside. The external sensor 30 is one kind or plural kinds of sonar, radar, camera, and the like, for example.

More specifically, the sonar is an ultrasonic sensor installed in, for example, a front portion or a rear portion of the host vehicle 2. The sonar receives a reflected wave of an ultrasonic wave transmitted to a detection area of the outside scenery of the host vehicle 2 to detect an obstacle in the detection area and outputs a detection signal. The radar is a millimeter wave sensor or a laser sensor installed in, for example, a front portion or a rear portion of the host vehicle 2. The radar receives the millimeter wave or quasi-millimeter wave transmitted to the detection area outside of the host vehicle 2 or the reflected wave of the laser to detect an obstacle in the detection area and output a detection signal. The camera is a monocular type or compound eye type camera installed in, for example, an inner rearview mirror or a door mirror of the host vehicle 2. The camera images the detection area outside of the host vehicle 2, to thereby detect an obstacle or a traffic indication in the detection area and output an image signal.

The periphery monitoring ECU 31 illustrated in FIG. 2 is mainly implemented by a microcomputer having a processor and a memory, and is connected to the external sensor 30 and the in-vehicle network 6. The periphery monitoring ECU 31 acquires sign information such as a speed limit sign and a lane sign and lane line information such as a white lane line and a yellow lane line based on the output signal of the external sensor 30. At the same time, the periphery monitoring ECU 31 acquires obstacle information such as the type of obstacle and a relative relationship of the obstacle to the host vehicle 2, based on an output signal of the external sensor 30. In this example, as the obstacle information, for example, an inter-vehicle distance, a relative speed, and so on between a preceding vehicle 8v (refer to FIGS. 9 to 11) that is a forward obstacle and the host vehicle 2 are acquired by the periphery monitoring ECU 31.

The vehicle control system 4 includes a vehicle state sensor 40, an occupant sensor 41, and a vehicle control ECU 42. The vehicle state sensor 40 is connected to the in-vehicle network 6. The vehicle state sensor 40 detects a traveling state of the host vehicle 2. The vehicle state sensor 40 includes one type or multiple types of sensors among, for example, a vehicle speed sensor, a rotation speed sensor, a steering angle sensor, a fuel sensor, a water temperature sensor, a radio wave receiver, and the like.

More specifically, the vehicle speed sensor detects the vehicle speed of the host vehicle 2 to output a vehicle speed signal corresponding to the detection. The rotation speed sensor detects an engine speed in the host vehicle 2 to output a rotation speed signal corresponding to the detection. The steering angle sensor detects a steering angle of the host vehicle 2 to output a steering angle signal corresponding to the detection. The fuel sensor detects the remaining fuel level in a fuel tank of the host vehicle 2 to output a fuel signal corresponding to the detection. The water temperature sensor detects a coolant temperature of an internal combustion engine in the host vehicle 2 to output a water temperature signal corresponding to the detection. The radio wave receiver receives output radio waves from, for example, positioning satellites, other vehicle transmitters for an inter-vehicle communication, roadside equipment for a road-to-vehicle communication, and the like to output a traffic signal. In this example, the traffic signal is a signal indicative of traffic information related to the host vehicle 2, such as a traveling position, a traveling direction, a traveling road condition, and a speed limit, and the above obstacle information.

The occupant sensor 41 is connected to the in-vehicle network 6. The occupant sensor 41 detects a state or operation of a user who has entered the vehicle compartment 2c of the host vehicle 2 illustrated in FIG. 1. The occupant sensor 41 includes one or more types of, for example, a power switch, a user state monitor, a display setting switch, a turn switch, and the like, and three types of an automatic control switch, a lane control switch, and a cruise control switch.

More specifically, the power switch is turned on by the user in the vehicle compartment 2c in order to start the internal combustion engine or the electric motor of the host vehicle 2, to thereby output a power signal corresponding to the operation. The user state monitor images a user state on the driver's seat 20 in the vehicle compartment 2c by the aid of an image sensor to detect the user state and output an image signal. The display setting switch is operated by the user in order to set the display state in the vehicle compartment 2c to output a display setting signal corresponding to the operation. The turn switch is turned on by the user in the vehicle compartment 2c in order to operate a direction indicator of the host vehicle 2 to output a turn signal corresponding to the operation.

In order to command an automatic control for the traveling state of the host vehicle 2, the automatic control switch is turned on by the user in the vehicle compartment 2c to output an automatic control signal corresponding to the operation. In order to command an automatic control for a width direction position on the traveling lane on which the host vehicle 2 travels, the lane control switch is turned on by the user in the vehicle compartment 2c to output a lane control signal corresponding to the operation. In order to command a cruise automatic control for keeping an inter-vehicle distance or a vehicle speed in the host vehicle 2, the cruise control switch is turned on by the user in the vehicle compartment 2c to output a cruise control signal corresponding to the operation.

The vehicle control ECU 42 illustrated in FIG. 2 is mainly implemented by a microcomputer having a processor and a memory, and is connected to the in-vehicle network 6. The vehicle control ECU 42 that is mounted in the host vehicle 2 as the "automatic control unit" is implemented by one type or multiple types including at least an integrated control ECU of an engine control ECU, a motor control ECU, a brake control ECU, a steering control ECU, the integrated control ECU and the like.

More specifically, the engine control ECU controls the operation of a throttle actuator of an engine and a fuel injection valve according to the operation of an accelerator pedal 26 in the vehicle compartment 2c illustrated in FIG. 1 or automatically to accelerate or decelerate a vehicle speed of the host vehicle 2. The motor control ECU controls the operation of a motor generator according to the operation of the accelerator pedal 26 in the vehicle compartment 2c or automatically to accelerate or decelerate the vehicle speed of the host vehicle 2. The brake control ECU controls the operation of a brake actuator according to the operation of a brake pedal 27 in the vehicle compartment 2c or automatically to accelerate or decelerate the vehicle speed of the host vehicle 2. The steering control ECU automatically controls the operation of an electric power steering according to the operation of a steering wheel 24 in the vehicle compartment 2c, to thereby adjust a steering angle of the host vehicle 2. The integrated control ECU synchronously controls the operation of the other control ECUs based on, for example, output signals of the sensors 40 and 41, information acquired by the periphery monitoring ECU 31, control information by the other control ECU in the vehicle control ECU 42, and the like.

In particular, the integrated control ECU executes a lane control for automatically controlling a position in a width direction of a traveling lane of the host vehicle 2 in a traveling road, to thereby perform a lane keeping assist (LKA) for restricting a departure from a lane marking such as a white lane line or a yellow lane line. The integrated control ECU mounted on the host vehicle 2 as the "lane control unit" for performing the LKA controls the operation of the steering control ECU based on acquired information by the periphery monitoring ECU 31 and an output signal of the radio wave receiver. At this time, the integrated control ECU sets a scheduled route Rp (refer to FIGS. 6 to 8, 10 to 12) scheduled for the host vehicle 2 as needed, to thereby cause the lane control to follow the route Rp.

Figure 14:
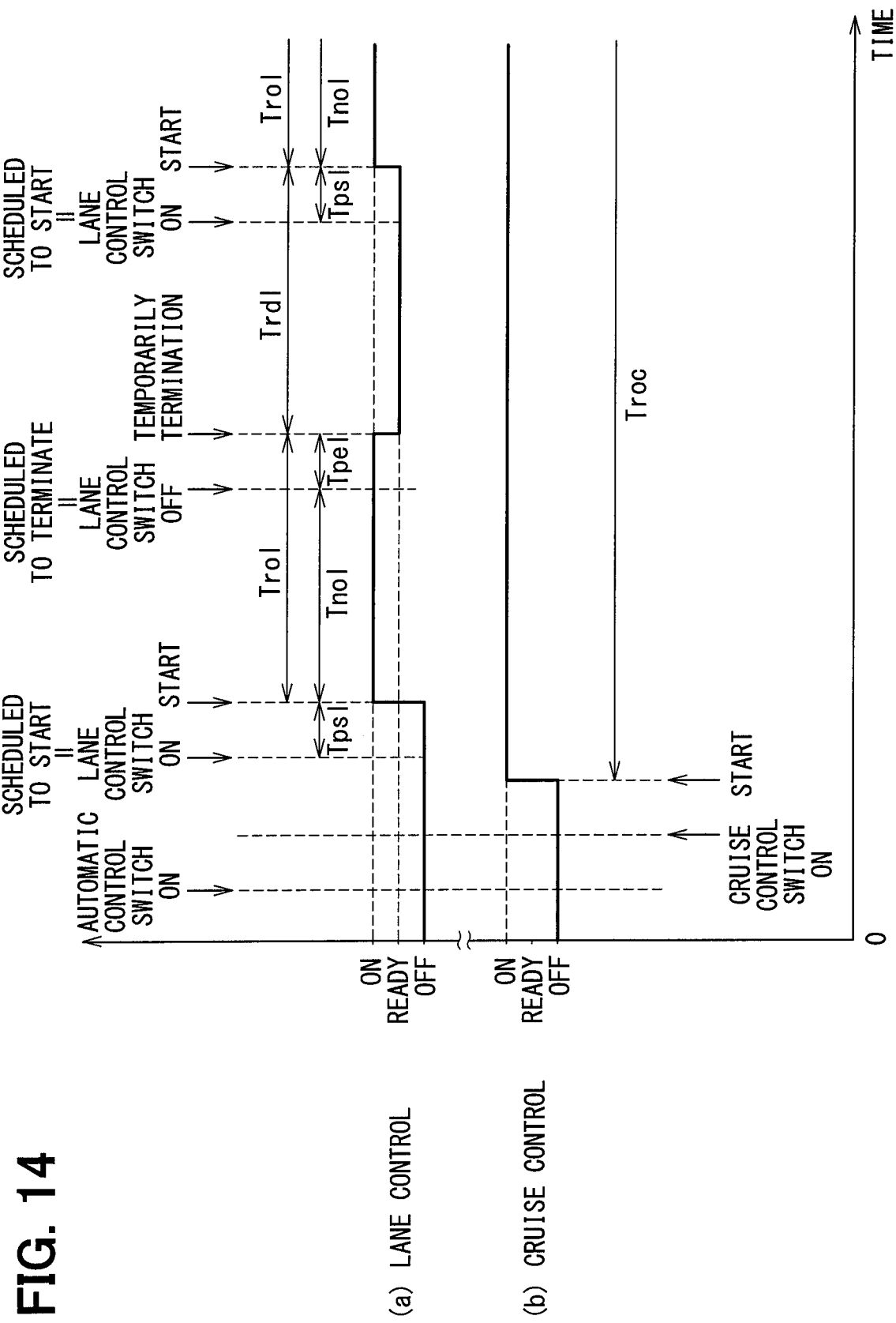
FIG. 14 is a time chart illustrating a lane control and a cruise control according to the first embodiment.
Figure 15:
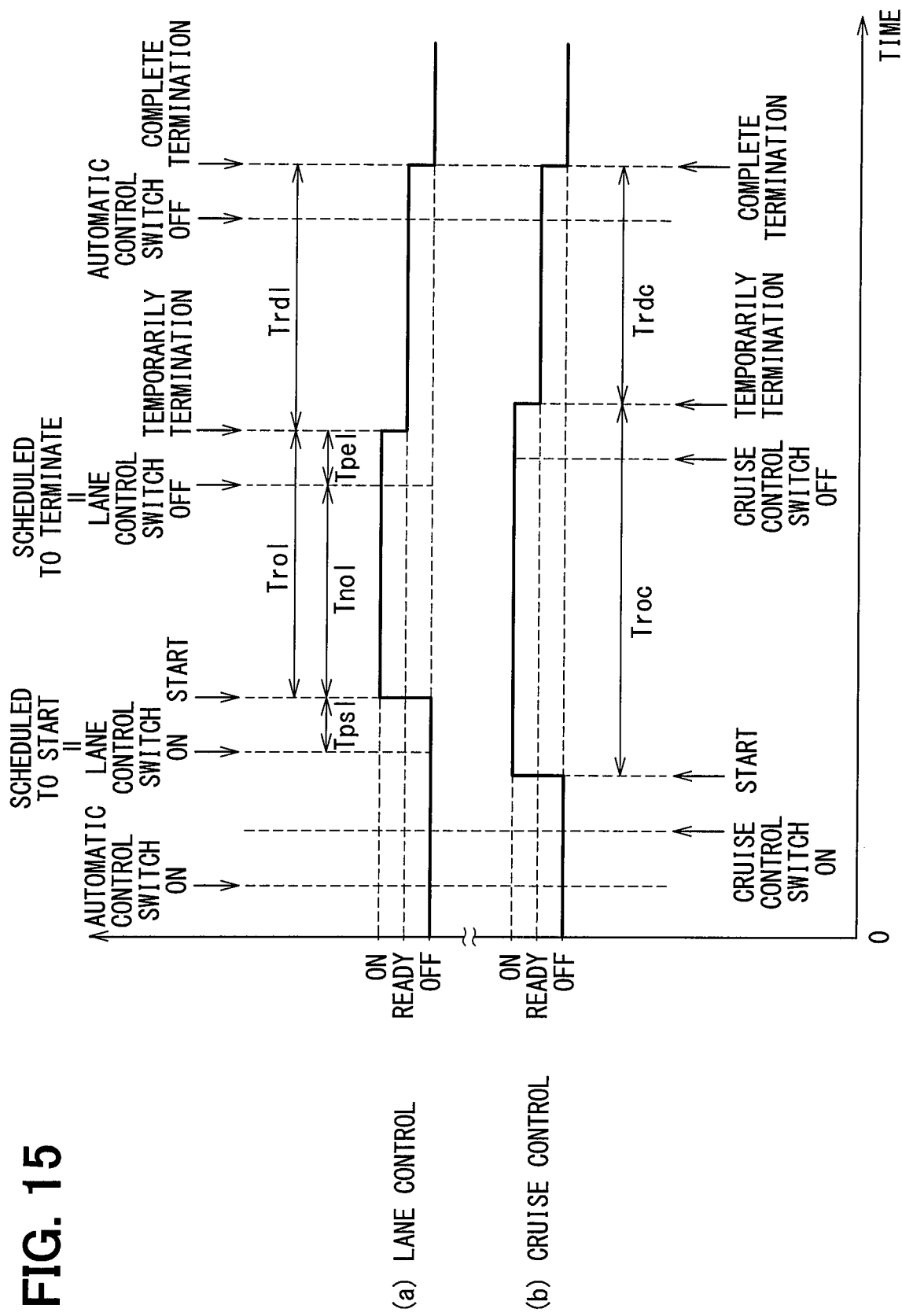
FIG. 15 is a time chart illustrating a lane control and a cruise control according to the first embodiment.
Figure 16:
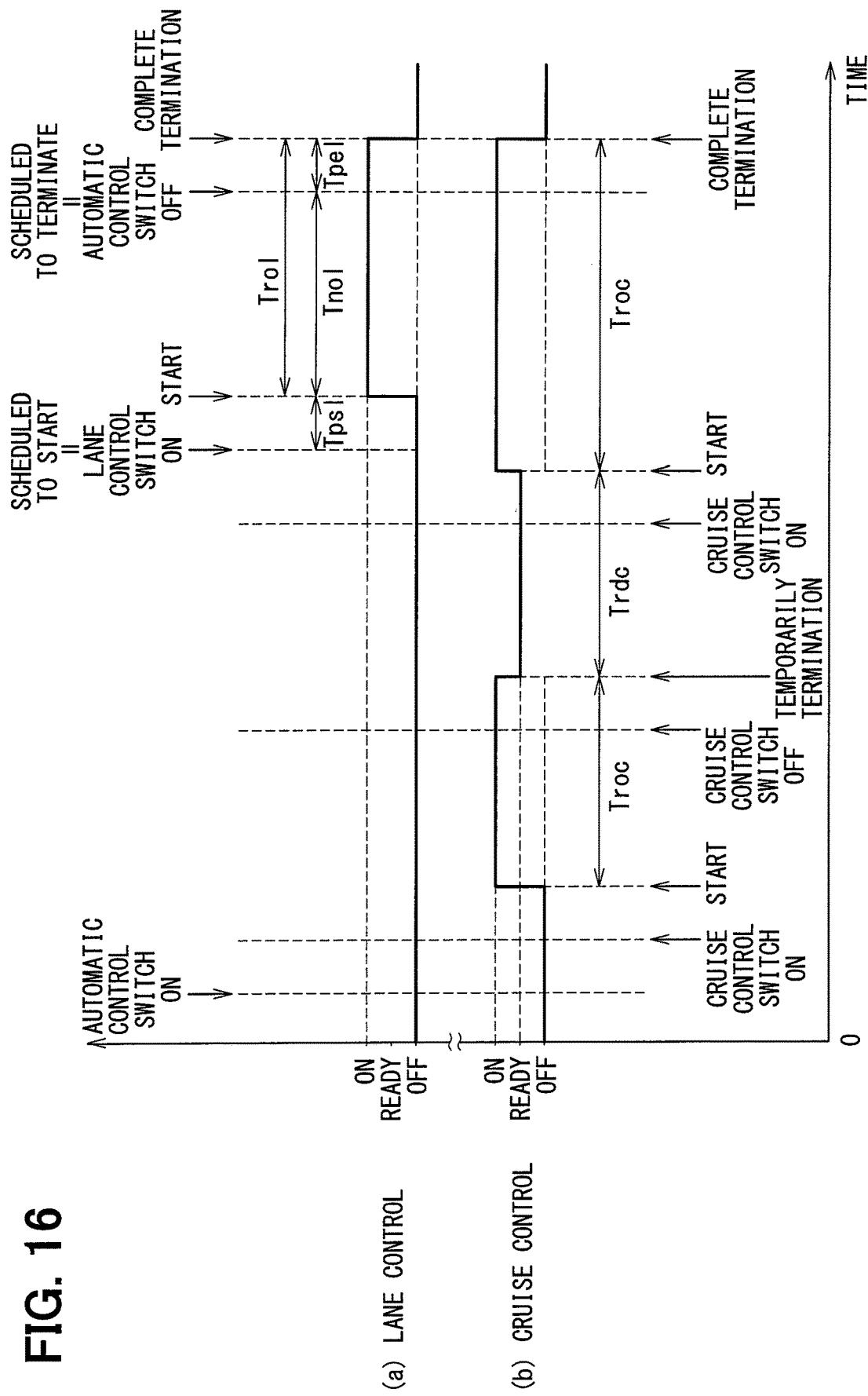
FIG. 16 is a time chart illustrating a lane control and a cruise control according to the first embodiment.

As illustrated in (a) of each of FIGS. 14, 15 and 16, the lane control of the LKA starts and puts into an on state when the lane control switch is turned on under a state that the automatic control switch and the cruise control switch are turned on. On the other hand, as illustrated in (a) of FIGS. 14 and 15, under a condition that the automatic control switch and the cruise control switch are turned on, for example, when the lane control switch is turned off according to the disappearance of the lane marking, the lane control is temporarily terminated and is put in a ready state. Further, as illustrated in (a) of FIGS. 15 and 16, when the automatic control switch is turned off irrespective of the lane control switch and the cruise control switch, the lane control is completely terminated and put into an off state.

The integrated control ECU according to the present embodiment executes a cruise control for automatically controlling the cruising of the host vehicle 2 during follow-up traveling or independent traveling depending on the presence or absence of the preceding vehicle 8v in the outside scenery 8. As a result, the integrated control ECU also performs a full speed range adaptive cruise control (FSRA) for keeping an inter-vehicle distance or a vehicle speed in a full vehicle speed range. As the "cruise control unit" for performing the FSRA, the integrated control ECU mounted on the host vehicle 2 controls the operation of an engine control ECU or a motor control ECU and the operation of a brake control ECU based on the acquired information by the periphery monitoring ECU 31 and the output signal of the radio wave receiver.

As illustrated in (b) of FIGS. 14, 15, and 16, the cruise control by the FSRA starts and puts in an on state when the cruise control switch is turned on under a state that the automatic control switch is turned on. On the other hand, as illustrated in (b) of FIGS. 15 and 16, under a state that the automatic control switch is turned on, for example, the cruise control switch is turned off according to the braking of the host vehicle 2 or the like due to the operation of the brake pedal 27, the cruise control is temporarily terminated and puts into a ready state. Furthermore, as illustrated in (b) of FIGS. 15 and 16, when the automatic control switch is turned off regardless of the cruise control switch, the cruise control is completely terminated and puts into the off state.

As illustrated in FIG. 2, the display system 5 is mounted on the host vehicle 2 for visually presenting information. The display system 5 includes an HUD 50, an MFD (multi-function display) 51, a combination meter 52, and an HCU (human machine interface (HMI) control unit) 54.

Figure 3:
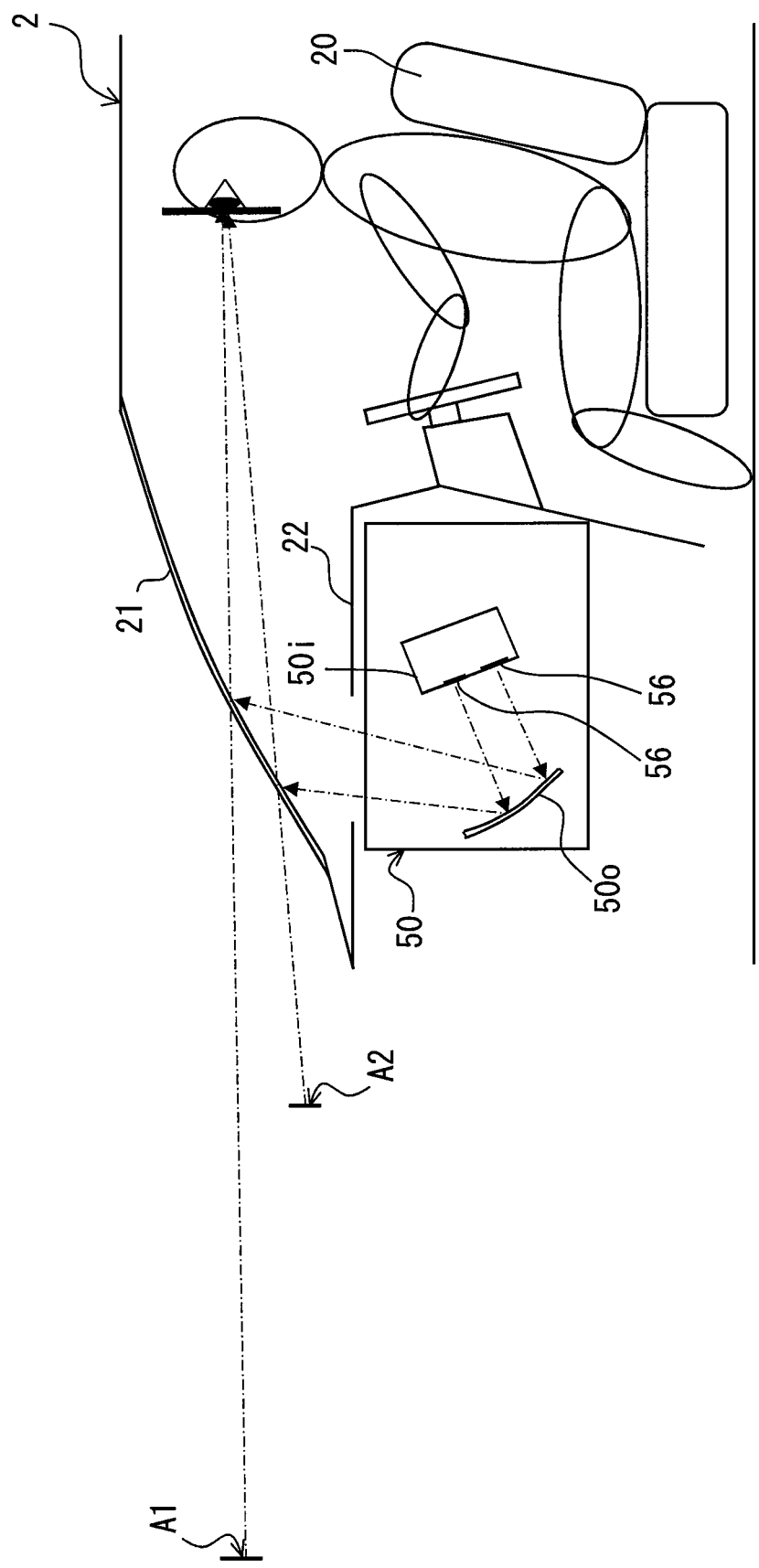
FIG. 3 is a structural view schematically illustrating a detailed configuration of an HUD according to the first embodiment.

The HUD 50 is installed in the instrument panel 22 in the vehicle compartment 2c illustrated in FIGS. 1 and 3. The HUD 50 projects a display image 56 formed on a display device 50i such as a liquid crystal panel or a projector through an optical system 500 on a front windshield 21 functioning as a "projection member" in the host vehicle 2. In this example, the front windshield 21 is made of a light transmissive glass so as to transmit the outside scenery 8 existing in front of the host vehicle 2 outside of the vehicle compartment 2c. As a result, a light flux of the display image 56 reflected by the front windshield 21 and a light flux from the outside scenery 8 transmitted through the front windshield 21 are perceived by the user on a driver's seat 20. As described above, a virtual image of the display image 56 focused at a position forward of the front windshield 21 is displayed so as to be superimposed on a part of the outside scenery 8 as illustrated in FIGS. 1 and 4 to 13, and becomes visible by the user on the driver's seat 20. At this time, since the display image 56 is semi-transparently displayed as a virtual image, a portion of the outside scenery 8 on which the image 56 is superimposed can be also visually recognized.

In particular, as illustrated in FIGS. 4 to 13, the display image 56 displayed as the virtual image by the HUD 50 includes a route image 560, a start image 561, a termination image 562, emphasized images 563, 564 and operation images 565, 566 as multiple types of images related to the traveling state of the host vehicle 2. Those images 560, 561, 562, 563, 564, 565, and 566 are displayed as virtual images in any of periods Tnol, Tpel, Tpsl, Trol, Trdl, Troc, and Trdc illustrated in operation examples of FIGS. 14 to 16.

As illustrated in FIGS. 6 to 8 and 10 to 12, the route image 560 is formed in a first virtual image display region A1 superimposed on a forward traveling road 8r in the outside scenery 8. As a result, in the first virtual image display region A1, the route image 560 shows the scheduled route Rp whom the host vehicle 2 is made to follow under the lane control of the LKA, while being superimposed on the forward traveling road 8r. The first virtual image display region A1 (refer to FIGS. 1 and 3) is set at a position spaced apart from the driver's seat 20 in the forward direction by, for example, approximately 15 m.

Figure 6:
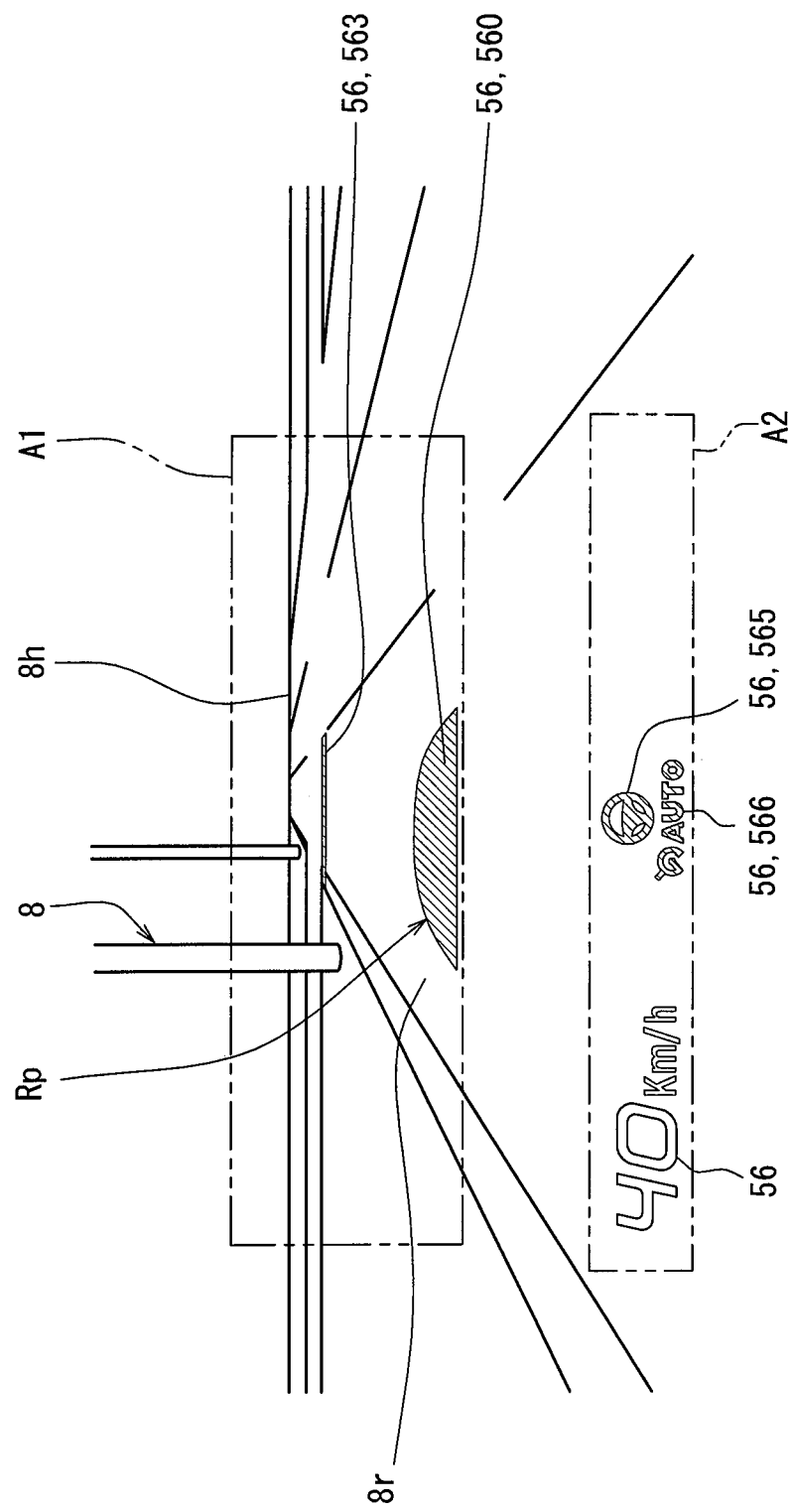
FIG. 6 is a front view illustrating a virtual image display state according to the first embodiment.
Figure 7:
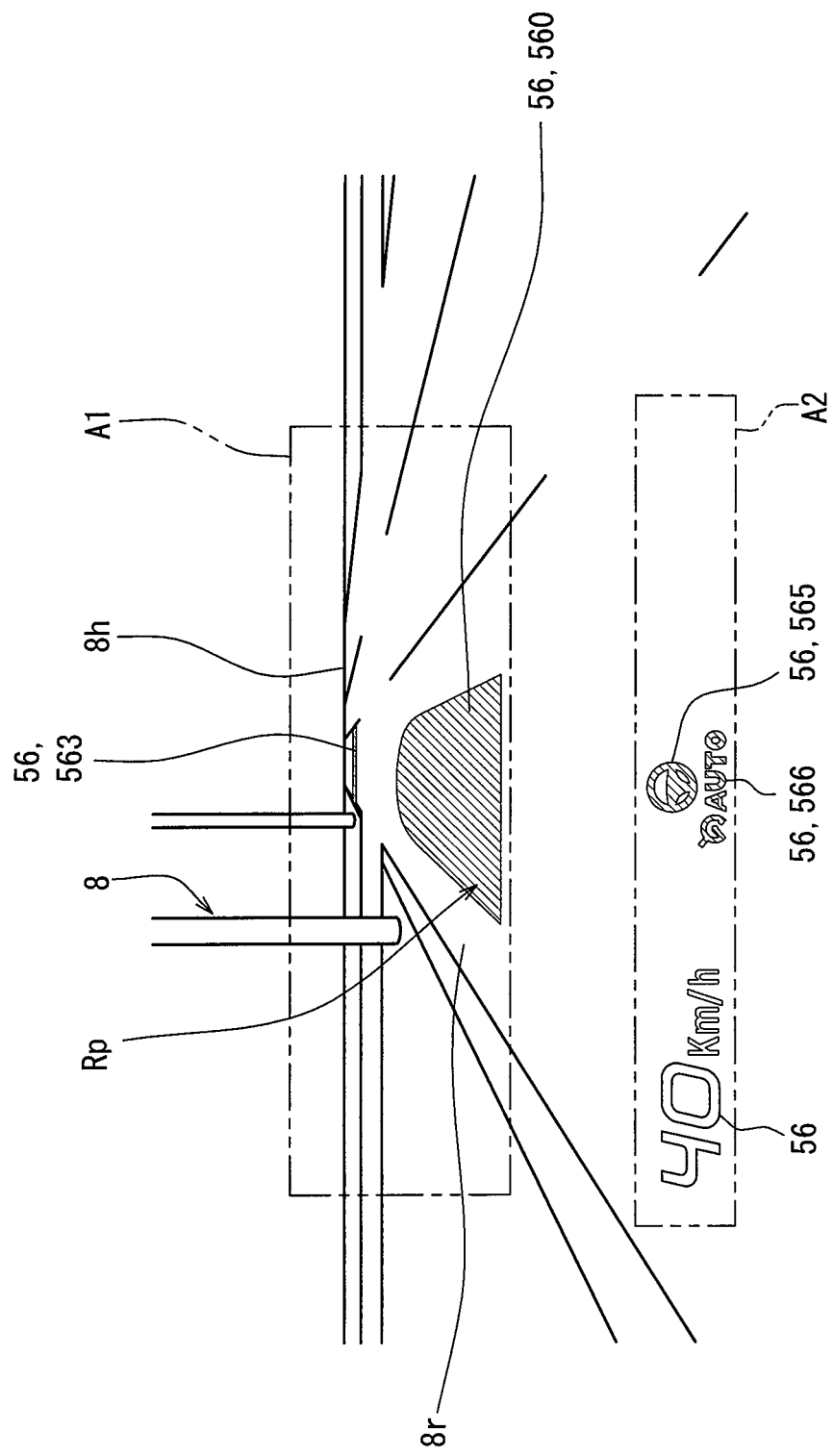
FIG. 7 is a front view illustrating a virtual image display state according to the first embodiment.
Figure 10:
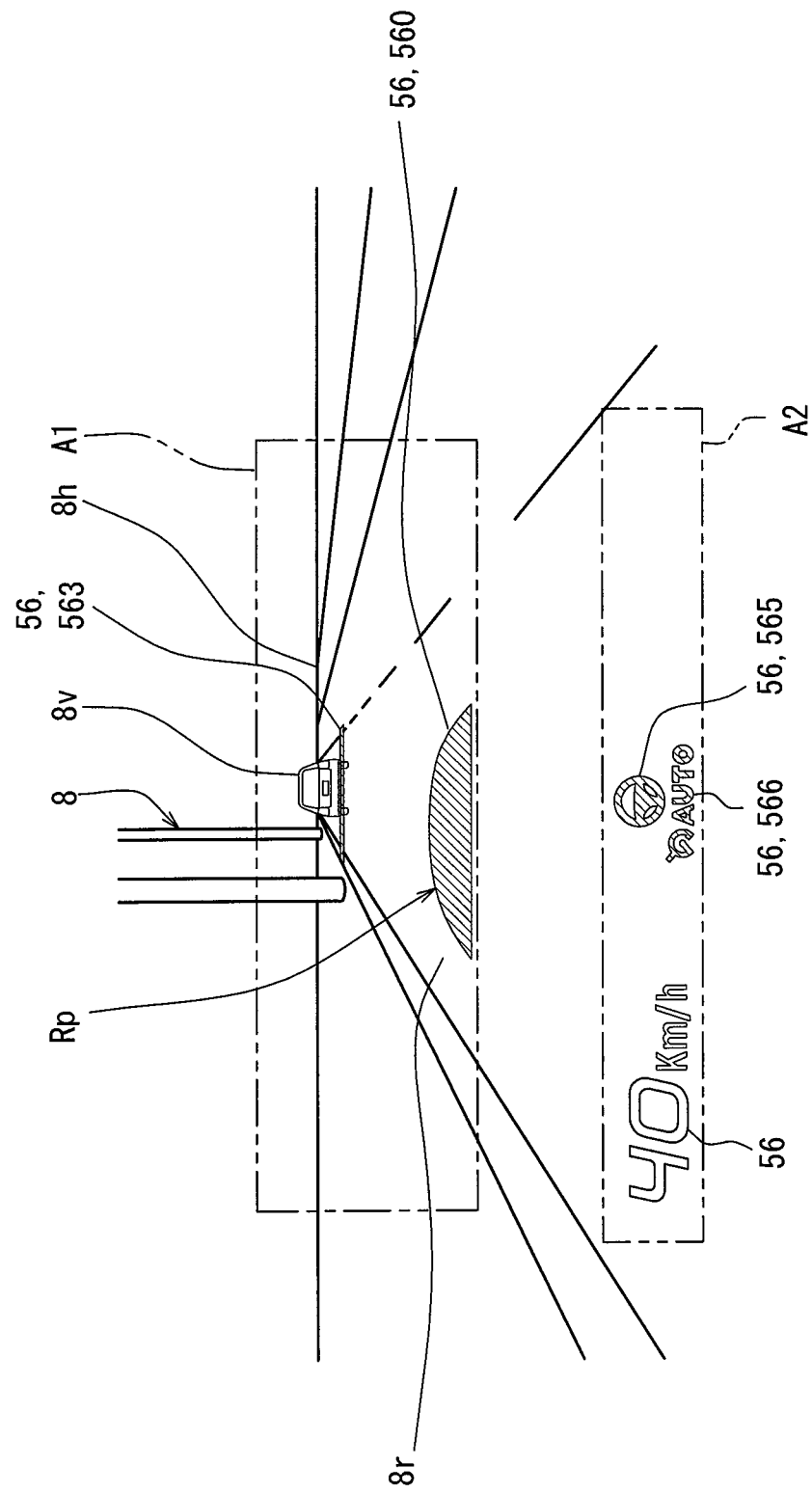
FIG. 10 is a front view illustrating a virtual image display state according to the first embodiment.

The route image 560 is intermittently displayed as a virtual image in predetermined periods Tnol and Tpel (refer to FIGS. 14 to 16) in which the lane control is turned on. In this example, the route image 560 during independent traveling when the host vehicle 2 travels independently is repeatedly formed in a moving image fashion gradually extending from the host vehicle 2 side toward a horizontal line 8h side onward as illustrated in FIGS. 6 and 7. On the other hand, as illustrated in FIGS. 10 and 11, the route image 560 during follow-up traveling where the host vehicle 2 travels while following a rear of the preceding vehicle 8v is repeatedly formed in a moving image fashion that is gradually extended from the host vehicle 2 side toward the preceding vehicle 8v side onward.

Figure 8:
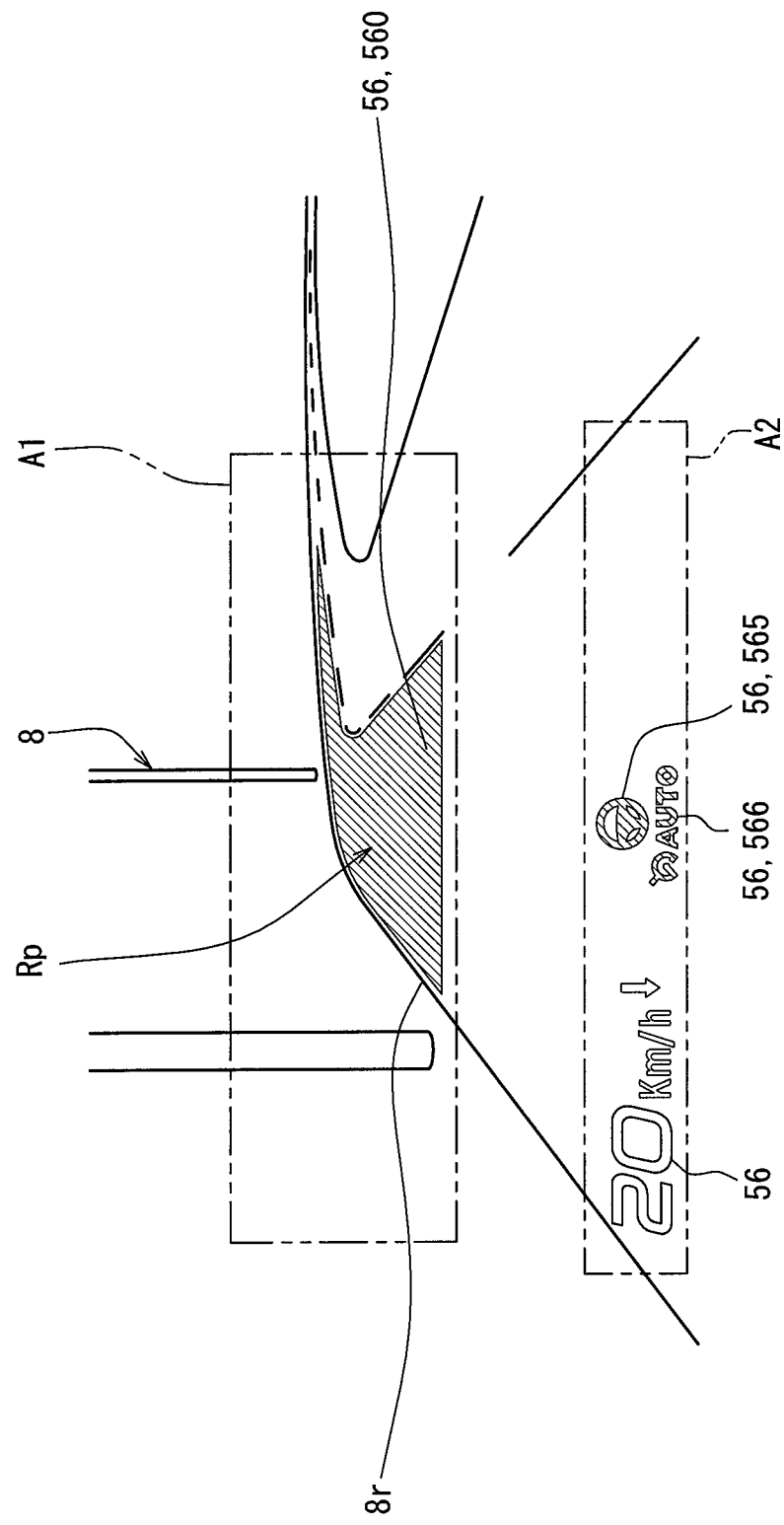
FIG. 8 is a front view illustrating a virtual image display state according to the first embodiment.
Figure 11:
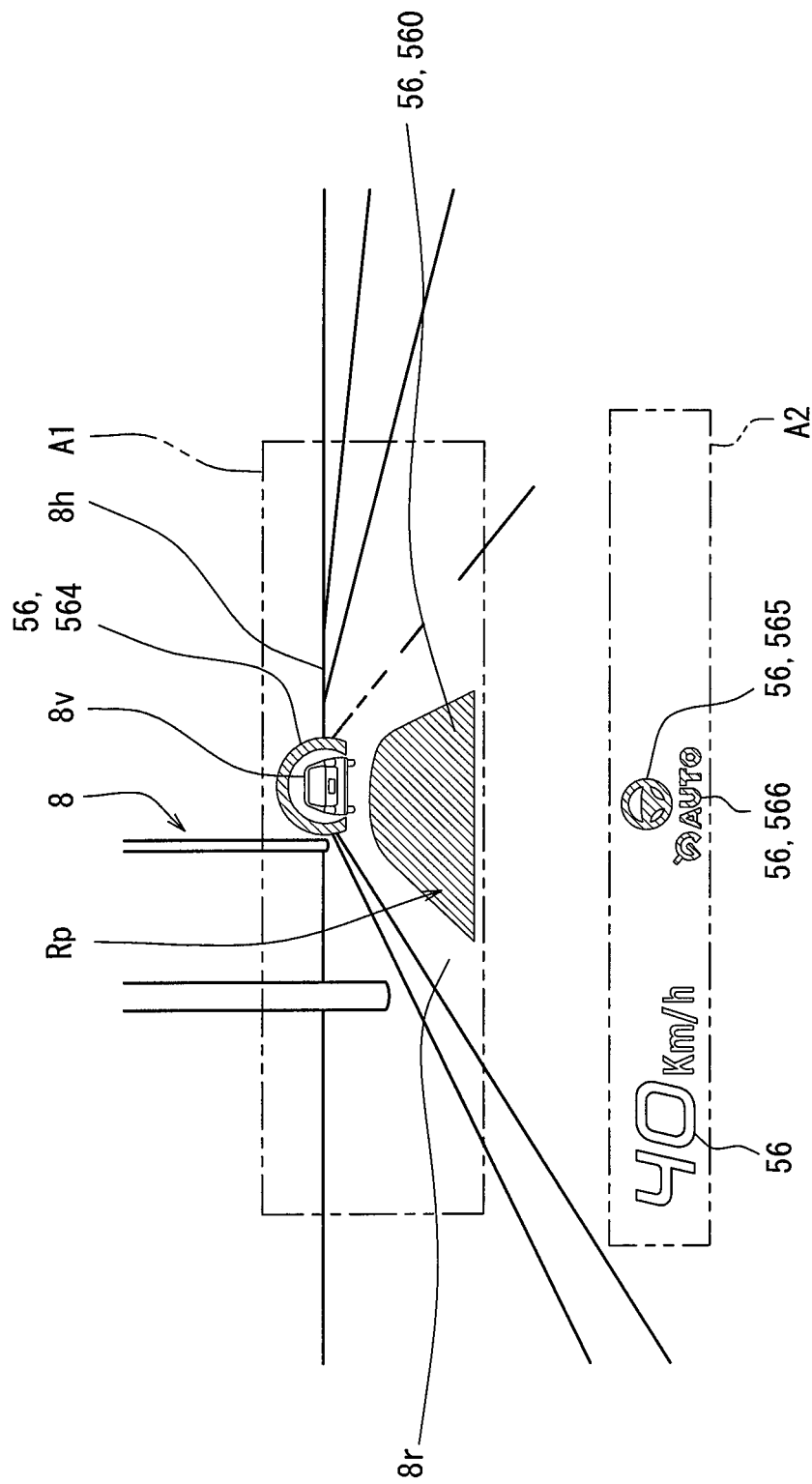
FIG. 11 is a front view illustrating a virtual image display state according to the first embodiment.
Figure 12:
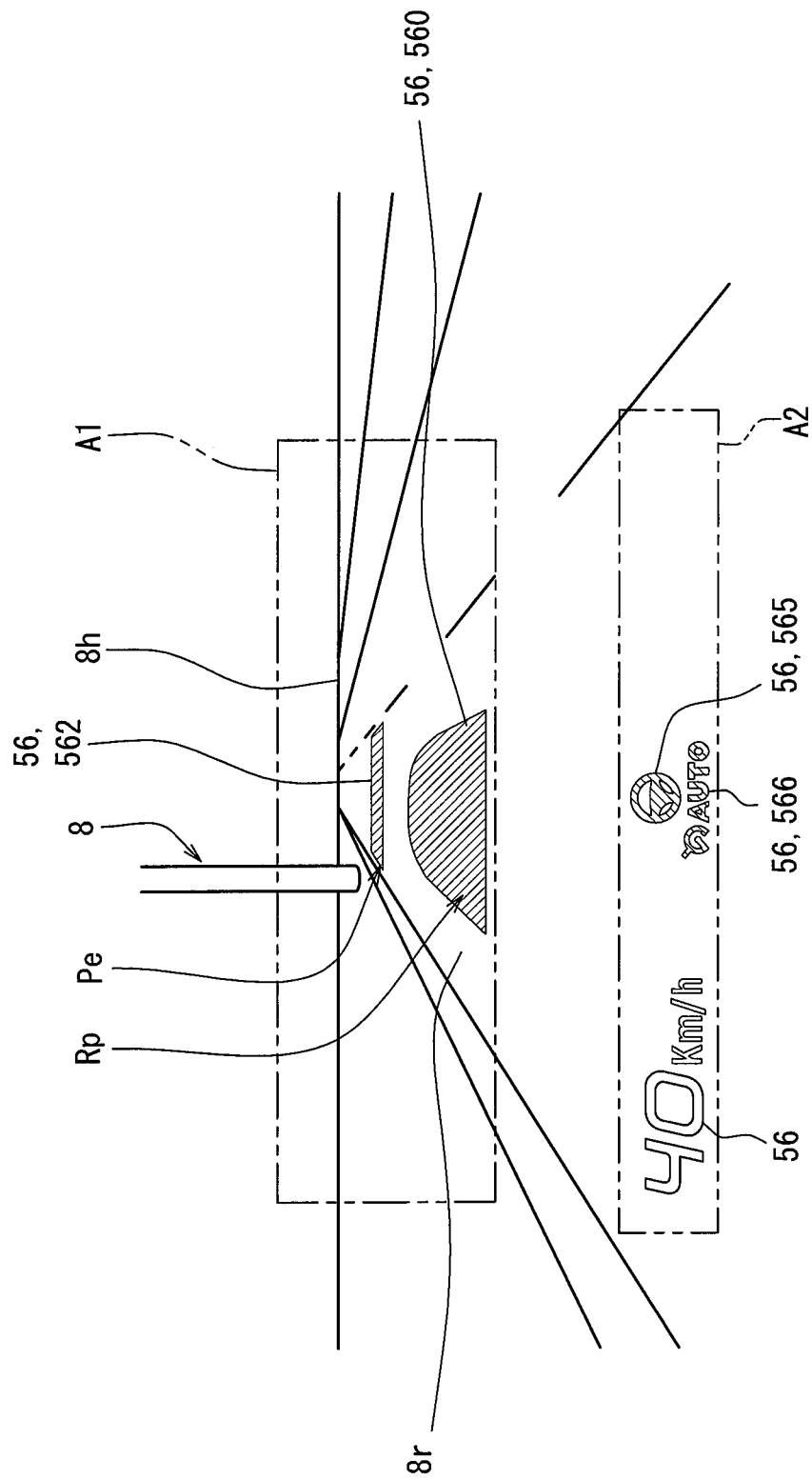
FIG. 12 is a front view illustrating a virtual image display state according to the first embodiment.

In any of those traveling, when the scheduled route Rp is straight, the route image 560 is formed straight as illustrated in FIGS. 7, 11, and 12. On the other hand, when the scheduled route Rp is a curve, as illustrated in FIG. 8, the route image 560 is curved. Further, during any traveling, a display color of the route image 560 is set according to a state of the lane control.

Figure 13:
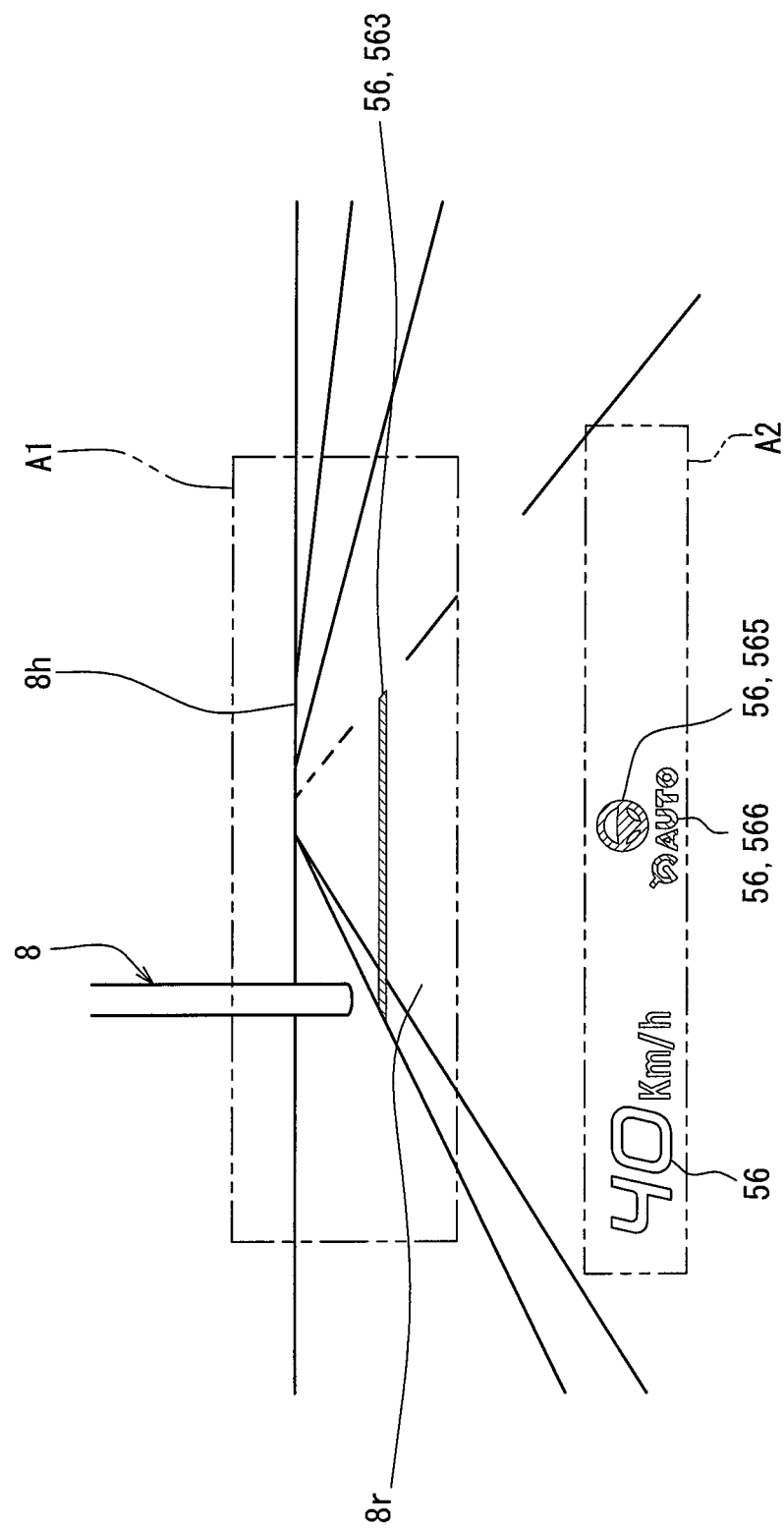
FIG. 13 is a front view illustrating a virtual image display state according to the first embodiment.

Specifically, in a normal on period Tnol (refer to FIGS. 14 to 16) from the start of the lane control until a temporary termination or a complete termination of the lane control is scheduled, a display color of the route image 560 is set to, for example, light blue indicated by right-up hatched lines in FIGS. 6 to 8, 10, and 11, or the like. On the other hand, in a scheduled termination period Tpel (refer to FIGS. 14 to 16) after the temporal termination or the completion termination of the lane control has been scheduled until the temporal or complete completion of the lane control has been performed, the display color of the route image 560 is set to a color different from that in the normal on period Tnol, for example, an amber color indicated by left-up hatched lines in FIG. 12. Furthermore, when the lane control becomes in a ready state due to the temporal termination or when the lane control is turned off due to the complete termination, the display per se of the route image 560 is terminated as illustrated in FIGS. 4 and 13.

Figure 4:
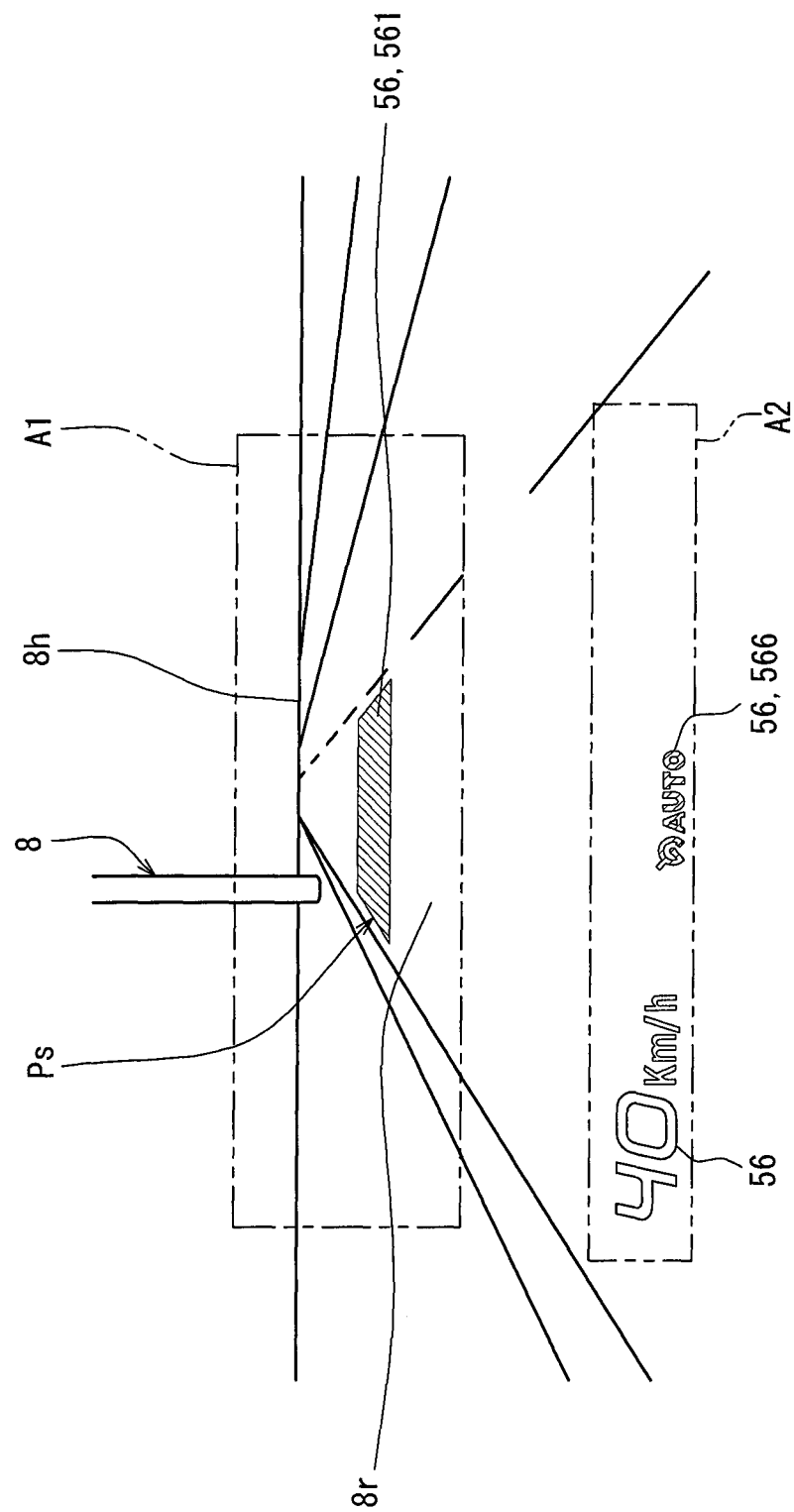
FIG. 4 is a front view illustrating a virtual image display state according to the first embodiment.

As illustrated in FIG. 4, similar to the route image 560, the start image 561 is formed in the first virtual image display region A1 superimposed on the forward traveling road 8r in the outside scenery 8. As a result, in the first virtual image display region A1, the start image 561 shows a scheduled start position Ps at which the start of the lane control is scheduled which is superimposed on the forward traveling road 8r.

Figure 5:
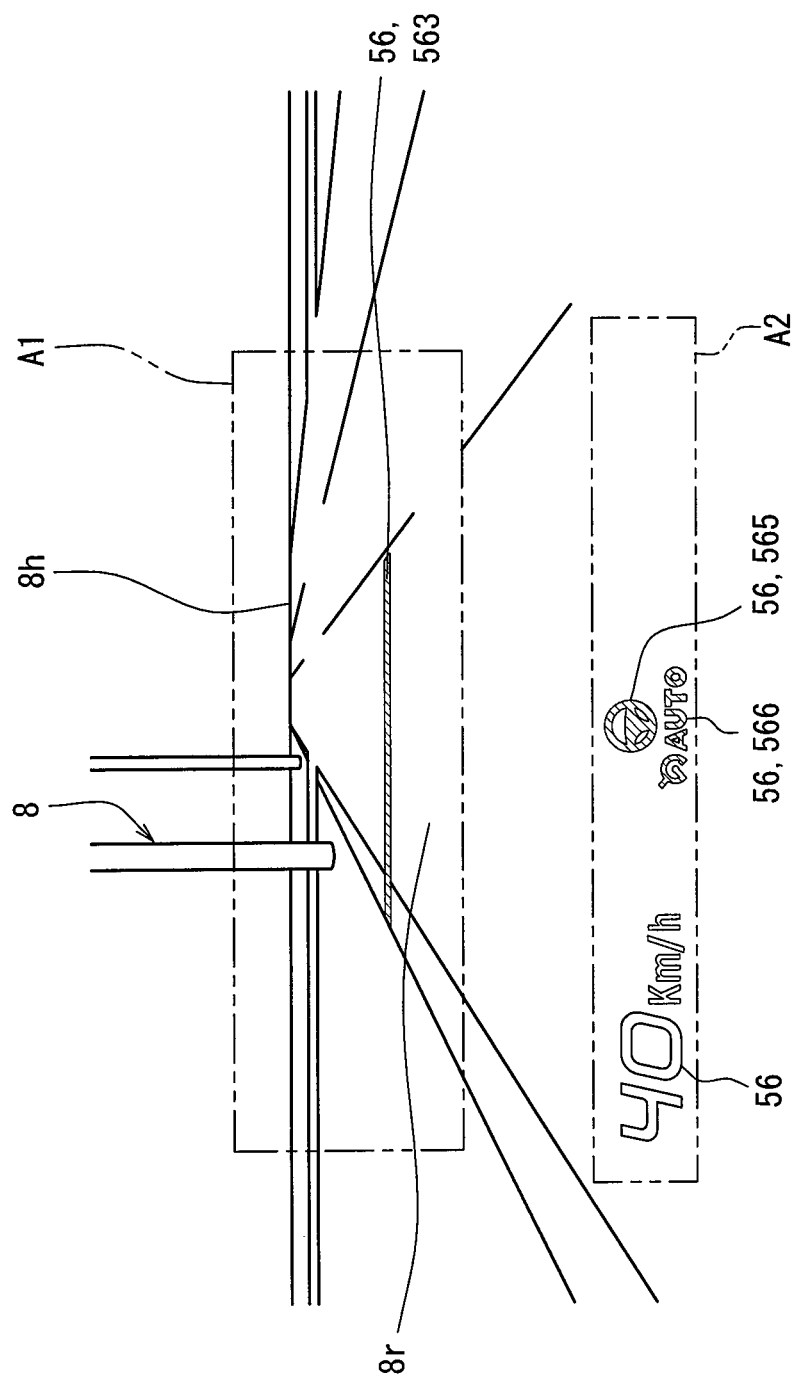
FIG. 5 is a front view illustrating a virtual image display state according to the first embodiment.

In the scheduled start period Tpsl (refer to FIGS. 14 to 16) after the start of the lane control is scheduled until the host vehicle 2 reaches the scheduled start position Ps, the start image 561 is continuously superimposed and displayed at the position Ps on the forward traveling road 8r as a virtual image. At this time, the start image 561 is formed in a moving image fashion in which a trapezoidal figure whose upper base and lower base are along the horizontal line 8h as illustrated in FIG. 4 is enlarged as the host vehicle 2 approaches the scheduled start position Ps. At this time, the display color of the start image 561 is set to the same color as that of the route image 560 in the normal on period Tnol, for example, light blue indicated by right-up hatched lines in FIG. 4. On the other hand, when the host vehicle 2 reaches the scheduled start position Ps, the display per se of the start image 561 is terminated as illustrated in FIG. 5.

As illustrated in FIG. 12, similar to the route image 560, the termination image 562 is formed in the first virtual image display region A1 superimposed on the forward traveling road 8r in the outside scenery 8. As a result, in the first virtual image display region A1, the termination image 562 shows a scheduled termination position Pe at which the termination of the lane control is scheduled which is superimposed on the forward traveling road 8r.

In the scheduled termination period Tpel (refer to FIGS. 14 to 16) after the end of the lane control is scheduled until the host vehicle 2 reaches the scheduled termination position Pe, the termination image 562 is continuously superimposed and displayed at the position Pe on the forward traveling road 8r as a virtual image. At this time, the termination image 562 is formed in a moving image fashion in which a trapezoidal figure whose upper base and lower base are along the horizontal line 8h as illustrated in FIG. 12 is enlarged as the host vehicle 2 approaches the scheduled termination position Pe. At this time, the display color of the termination image 562 is set to the same color as that of the route image 560 in the same period Tpel, for example, amber color indicated by left-up hatched lines in FIG. 12. In other words, the display color of the termination image 562 is set to a color different from that of the start image 561. On the other hand, when the host vehicle 2 reaches the scheduled termination position Pe, the display per se of the termination image 562 is terminated as illustrated in FIG. 13.

As illustrated in FIGS. 5 to 7, 9 to 11, and 13, similar to the route image 560, the emphasized images 563 and 564 are formed in the first virtual image display region A1 superimposed on the forward traveling road 8r in the outside scenery 8. As a result, in the first virtual image display region A1, the emphasized images 563 and 564 are superimposed on the forward traveling road 8r to emphasize the presence or absence of the preceding vehicle 8v followed by the host vehicle 2 under the cruise control of the FSRA.

The emphasized images 563 and 564 are intermittently displayed as a virtual image in a real on period Troc (refer to FIGS. 14 to 16) in which the cruise control is on. In this example, in the real on period Troc during the independent traveling where the host vehicle 2 travels, independently, the detection emphasized image 563 is repetitively formed in a moving image fashion gradually moving from the host vehicle 2 side toward the horizontal line 8h side onward as illustrated in FIGS. 5 and 7. At this time, the detection emphasized image 563 is formed in an elongated bar shape along the horizontal line 8h. At this time, the display color of the detection emphasized image 563 is set to the same color as that of the route image 560 in the normal on period Tnol, for example, light blue indicated by right-up hatched lines in FIGS. 5 to 7 and 13. Furthermore, in the real on period Troc during the independent traveling, the vehicle emphasized image 564 is not formed.

Figure 9:
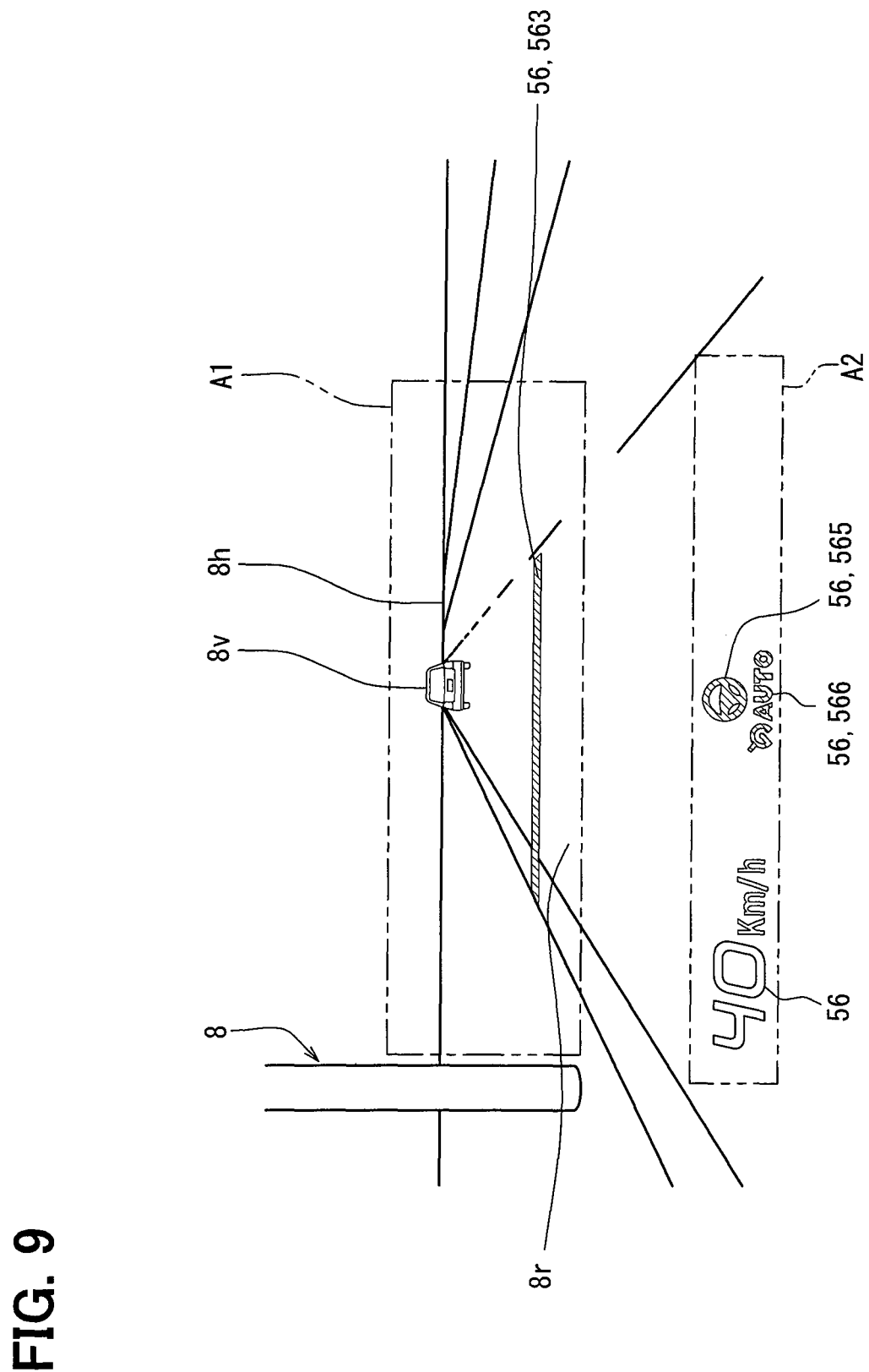
FIG. 9 is a front view illustrating a virtual image display state according to the first embodiment.

On the other hand, as illustrated in FIGS. 9 and 10, in the real on period Troc during the follow-up traveling when the host vehicle 2 travels while following the rear of the preceding vehicle 8v, the detection emphasized image 563 is repetitively formed in a moving image fashion that is gradually moved from the host vehicle 2 side toward the preceding vehicle 8v side onward. Similarly at this time, the detection emphasized image 563 is formed in an elongated bar shape along the horizontal line 8h. Similarly, at this time, the display color of the detection emphasized image 563 is set to the same color as that of the route image 560 in the normal on period Tnol, for example, light blue indicated by right-up hatched lines in FIGS. 9 and 10. In other words, the display color of the detection emphasized image 563 is the same between the independent traveling time and the follow-up traveling time.

Furthermore, during the real on period Troc during the follow-up traveling, after the detection emphasized image 563 has moved to the preceding vehicle 8v before the horizontal line 8h as illustrated in FIG. 10, the vehicle emphasized image 564 is formed while the detection emphasized image 563 is cleared as illustrated in FIG. 11. At this time, the vehicle emphasized image 564 is formed in an annular shape surrounding the preceding vehicle 8v, in particular, in the present embodiment, a continuous circular arc shape around the preceding vehicle 8v excluding a lower side of the preceding vehicle 8v. At this time, the display color of the vehicle emphasized image 564 is also set to be the same color as that of the route image 560 in the normal on period Tnol, for example, light blue indicated by right-up hatched lines in FIG. 11. In other words, the display color of the detection emphasized image 563 and the display color of the vehicle emphasized image 564 are the same color during the follow-up traveling.

Such a vehicle emphasized image 564 is cleared after has been temporarily displayed, and the display of the next emphasized images 563 and 564 is repeated. In the present embodiment as described above, after the detection emphasized image 563 of the moving image fashion gradually moving to the preceding vehicle 8v has been formed, the detection emphasized image 563 is changed to the annular vehicle emphasized image 564 surrounding the preceding vehicle 8v.

As illustrated in FIGS. 4 to 13, the operation images 565 and 566 are formed in the second virtual image display region A2 which is lower than the first virtual image display region A1 and superimposed on the forward traveling road 8r on the host vehicle 2 side. As a result, in the second virtual image display region A2, the lane operation image 565 shows the state of the lane control superimposed on the forward traveling road 8r as the operation state of the integrated control ECU in the vehicle control ECU 42. The cruise operation image 566 formed under the lane operation image 565 in the second virtual image display region A2 shows the operation state of the cruise control superimposed on the forward traveling road 8r as the operation state of the integrated control ECU in the vehicle control ECU 42. Incidentally, the second virtual image display region A2 (refer to FIGS. 1 and 3) is set at a position spaced apart from the driver's seat 20 in the forward direction by, for example, about 2 m.

The lane operation image 565 is continuously displayed as a virtual image in predetermined periods Trol and Trdl (refer to FIGS. 14 to 16) in which the lane control is in an on state or a ready state. In this example, the lane operation image 565 imitates the steering wheel 24 for keeping the traveling lane of the host vehicle 2 as illustrated in FIGS. 5 to 13 so as to form the imaginary lane control. In this case, a display color of the lane operation image 565 is set according to a state of the lane control.

Specifically, in the real on period Trol (refer to FIGS. 14 to 16) from the start of the lane control until the temporary termination or the complete termination of the lane control, a display color of the lane operation image 565 is set to, for example, light blue indicated by right-up hatched lines in FIGS. 5 to 12, or the like, which is the same color as that of the route image 560 in the normal on period Tnol. On the other hand, in a ready period Trdl (refer to FIGS. 14 and 15)

after the lane control becomes in a ready state due to the temporal termination until the lane control again starts or is completely terminated, the display color of the lane operation image 565 is set to the same color as that of the route image 560 in the scheduled termination period Tpel, for example, an amber color indicated by left-up hatched lines in FIG. 13. Furthermore, when the lane control becomes in the off state due to the complete termination, the display per se of the lane operation image 565 is terminated as illustrated in FIGS. 1 and 4. As described above, in the present embodiment, the display color of the lane operation image 565 is changed as the lane control state is switched between the on state and the ready state.

As compared with the lane operation image 565 described above, the cruise operation image 566 is continuously displayed as a virtual image in predetermined periods Troc and Trdc (refer to FIGS. 14 to 16) in which the cruise control is in the on state or the ready state. In this example, the cruise operation image 566 is formed so that the imaginary cruise control is formed by combining graphics and letters together as illustrated in FIGS. 4 to 13. In this case, a display color of the cruise operation image 566 is set according to a state of the cruise control.

Specifically, in the real on period Troc (refer to FIGS. 14 to 16) from the start of the cruise control until the temporary termination or the complete termination of the lane control, a display color of the cruise operation image 566 is set to, for example, light blue indicated by right-up hatched lines in FIGS. 5 to 13, or the like, which is the same color as that of the lane operation image 565 in the real on period Trol. On the other hand, in a ready period Trdc (refer to FIGS. 15 and 16) after the cruise control becomes in the ready state due to the temporal termination until the cruise control again starts or is completely terminated, the display color of the cruise operation image 566 is set to the same color as that of the lane operation image 565 in the ready period Trdl, for example, an amber color indicated by left-up hatched lines in FIG. 4. Furthermore, when the cruise control becomes in the off state due to the complete termination, the display per se of the cruise operation image 566 is terminated as illustrated in FIG. 1. As described above, in the present embodiment, the display color of the cruise operation image 566 is changed as the cruise control state is switched between the on state and the ready state.

Incidentally, as the virtual image display by the HUD 50, in addition to the display of the above images 560, 561, 562, 563, 564, 565, and 566, the display of an image 56 indicating one type or plural types of information among, for example, a traveling state of the host vehicle 2, navigation information, sign information, obstacle information, and so on may be employed. In this example, FIGS. 1 and 4 to 13 illustrate examples in which the virtual image of the display image 56 indicative of the vehicle speed is displayed in the second virtual image display region A2 below the first virtual image display region A1. With the use of a light transmissive combiner disposed on the instrument panel 22 and transmitting the outside scenery 8 in cooperation with the front windshield 21, the virtual image display can also be performed by projecting the display image 56 on the combiner. Further, the navigation information described above can be acquired based on map information stored in the memory 54m and an output signal of the sensor 40, for example, in the HCU 54 to be described in detail later.

The MFD 51 is installed in the center console 23 in the vehicle compartment 2c illustrated in FIG. 1. The MFD 51 displays a real image of the image formed so as to indicate predetermined information on one or a plurality of liquid crystal panels so as to be visually recognized by the user on the driver's seat 20. As the real image display by the MFD 51, the display of the image that indicates one type or plural types of information among navigation information, audio information, video information, communication information, and so on is employed.

The combination meter 52 is installed in the instrument panel 22 in the vehicle compartment 2c. The combination meter 52 displays vehicle information on the host vehicle 2 so that the user on the driver's seat 20 can visually recognize the vehicle information. The combination meter 52 is a digital meter that displays vehicle information based on an image formed on the liquid crystal panel, or an analog meter that displays vehicle information by indicating a scale with a pointer. As the display by the combination meter 52, display showing one or more types of information among, for example, the vehicle speed, the engine speed, the remaining fuel level, and the coolant temperature as well as the operating states of the turn switch, the automatic control switch, the lane control switch, and the cruise control switch, and so on may be employed.

As illustrated in FIG. 2, the HCU 54 is mainly implemented by a microcomputer having a processor 54p and a memory 54m, and is connected to display elements 50, 51, and 52 of the display system 5 and the in-vehicle network 6. The HCU 54 synchronously controls the operation of the display elements 50, 51, and 52. In this situation, based on, for example, output signals of the sensors 40 and 41, information acquired by the ECU 31, control information in the ECU 42, information stored in the memory 54m, and acquired information of the HCU 54 itself, the HCU 54 controls the operation of those components. Incidentally, the memory 54m of the HCU 54 and the memories of the other various ECUs are respectively configured with the use of one or more storage media such as a semiconductor memory, a magnetic medium, or an optical medium.

More particularly, in the present embodiment, the HCU 54 that reads the images 560, 561, 562, 563, 564, 565, and 566 stored in the memory 54m as data and displays the virtual image on the HUD 50 functions as a "vehicle display control device". More specifically, the HCU 54 executes a display control program by the aid of the processor 54 to perform multiple flows illustrated in FIGS. 17 to 22. It should be noted that the image storage unit for storing the display image 56 may be provided by any one of the respective memories of the built-in ECUs in the display elements 50, 51, and 52, or in cooperation with the multiple memories among those respective memories and the memory 54m of the HCU 54. Each of the flows starts according to on-operation of the power switch as the occupant sensor 41 and terminates according to off-operation of the same switch. In addition, symbol "S" in each flow means each step.

Figure 17:
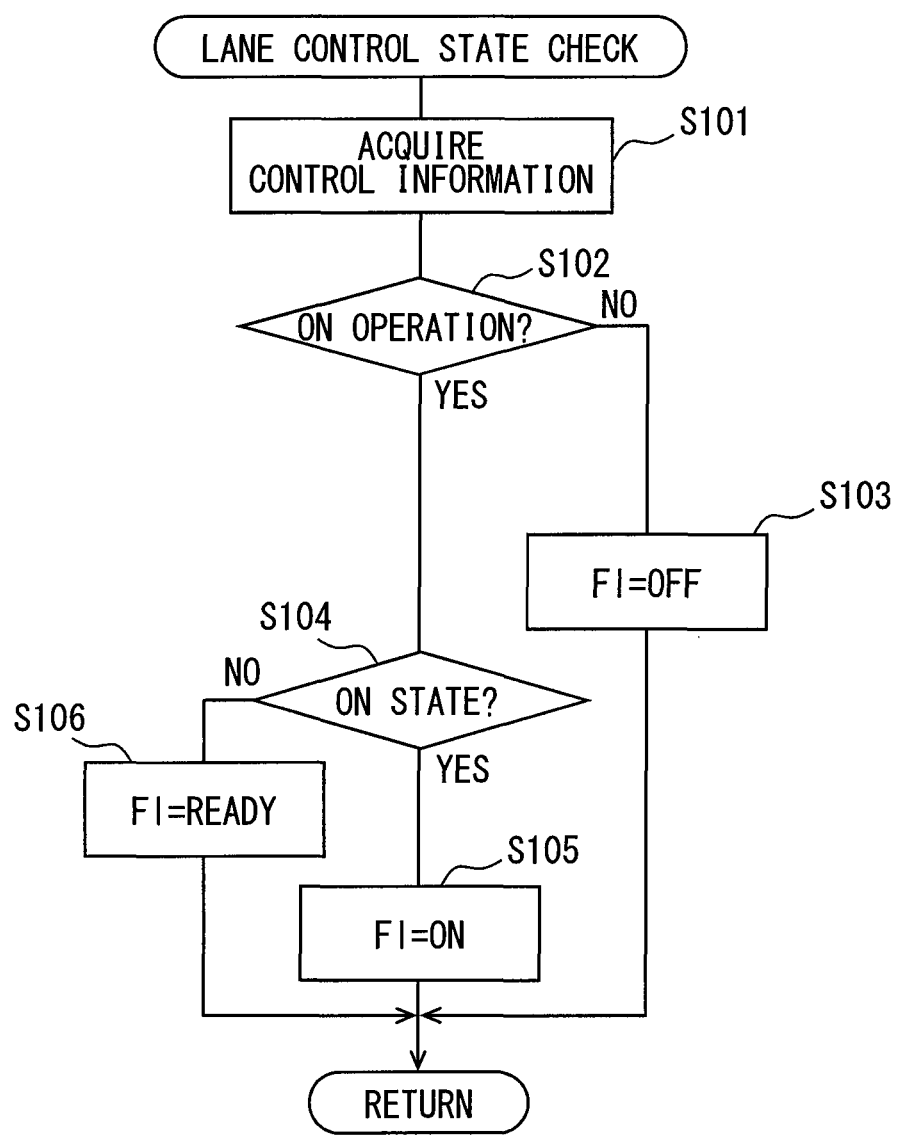
FIG. 17 is a flowchart illustrating a lane control state check flow according to the first embodiment.

First, a lane control state check flow illustrated in FIG. 17 will be described. In the lane control state check flow, it is assumed that a lane control state flag Fl stored in the memory 54m is set to "off" with the start or termination according to the operation of the power switch.

In S101 of the lane control state check flow, control information in the integrated control ECU of the vehicle control ECU 42 is acquired as "operation information" related to the lane control. In subsequent S102, it is determined whether the automatic control switch is turned on, or not, based on the acquired information in S101. As a result, if a negative determination is made, the process proceeds to S103, where the lane control state flag Fl is set to "off" indicating that the lane control is in the off state, and then the process returns to S101. On the other hand, if an affirmative determination is made, the process proceeds to S104.

In S104, it is determined whether the lane control is in the on state, or not, based on the acquired information in S101. As a result, if an affirmative determination is made, the process proceeds to S105, where the lane control state flag Fl is set to "on" indicating that the lane control is in the on state, and then the process returns to S101. On the other hand, if a negative determination is made, the process proceeds to S106, where the lane control state flag Fl is set to "ready" indicating that the lane control is in the ready state, and the process returns to S101.

Figure 18:
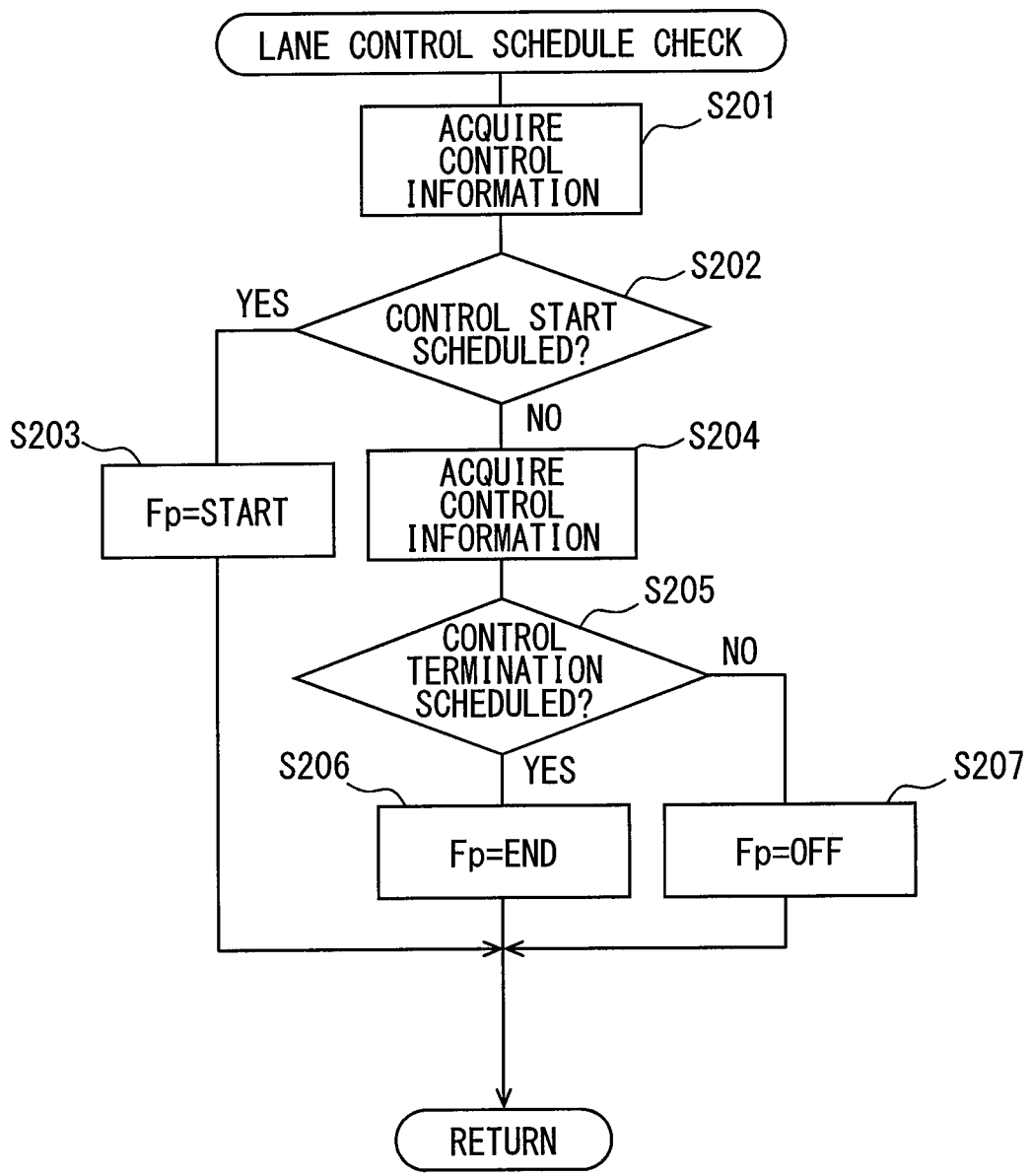
FIG. 18 is a flowchart illustrating a lane control schedule check flow according to the first embodiment.

Next, a lane control schedule check flow illustrated in FIG. 18 will be described. In the lane control schedule check flow, it is assumed that a lane control schedule flag Fp stored in the memory 54m is set to "off" with the start or termination according to the operation of the power switch.

In S201 of the lane control schedule check flow, control information in the integrated control ECU of the vehicle control ECU 42 is acquired as "start information" related to the scheduled start position Ps at which the start of the lane control is scheduled. In subsequent S202, it is determined whether the start of the lane control has been scheduled, or not, based on the acquired information in S201. As a result, if an affirmative determination is made, the process proceeds to S203, where the lane control schedule flag Fp is set to "start" indicating that the lane control is scheduled to start and then the process returns to S201. On the other hand, if a negative determination is made, the process proceeds to S204.

In S204, control information in the integrated control ECU is acquired as "termination information" related to the scheduled termination position Pe at which the lane control is scheduled to be terminated. In subsequent S205, it is determined whether the termination of the lane control has been scheduled, or not, based on the acquired information in S201. As a result, if an affirmative determination is made, the process proceeds to S206, where the lane control schedule flag Fp is set to "end" indicating that the lane control is scheduled to terminate and then the process returns to S201. On the other hand, if a negative determination is made, the process proceeds to S207, where the lane control schedule flag Fp is set to "off" indicating that there is no start schedule or no termination schedule of the lane control and then the process returns to S201.

Figure 19:
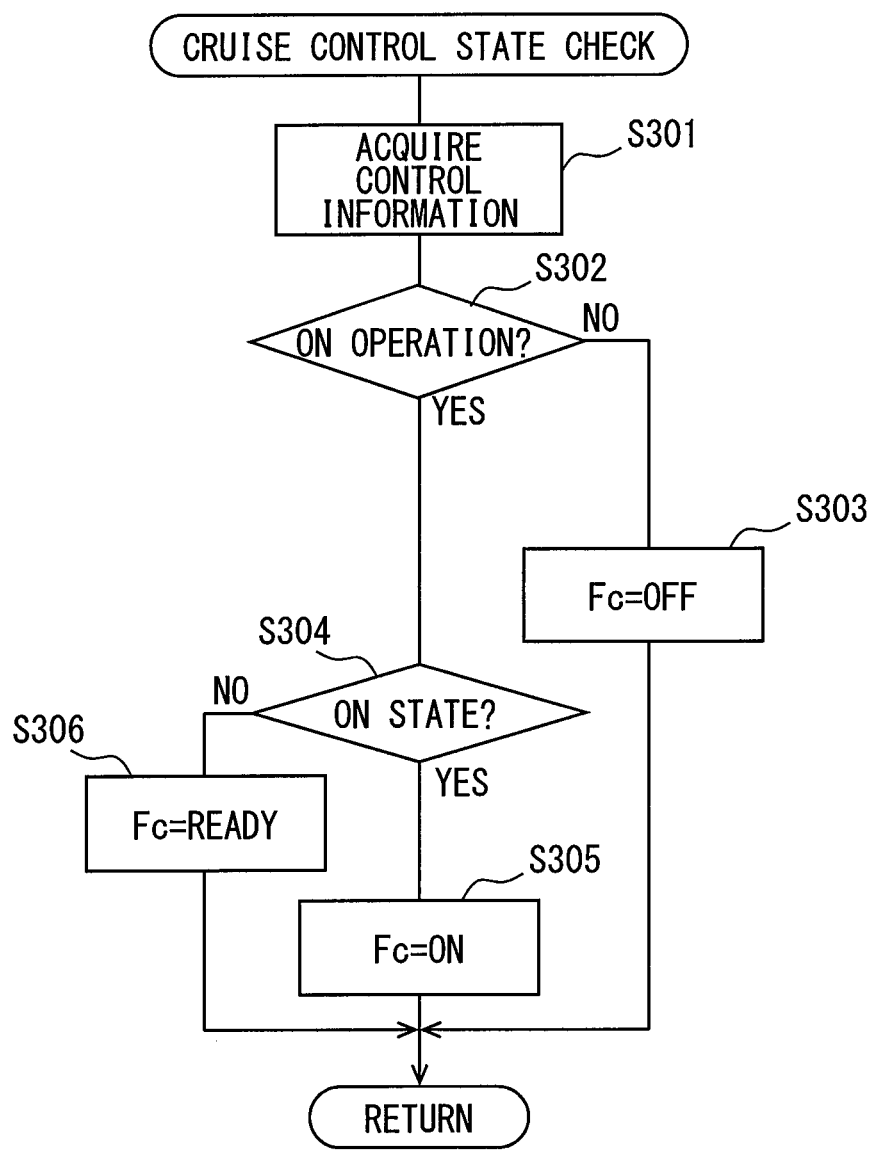
FIG. 19 is a flowchart illustrating a cruise control state check flow according to the first embodiment.

Next, a cruise control state check flow illustrated in FIG. 19 will be described. In the cruise control state check flow, it is assumed that a cruise control state flag Fc stored in the memory 54m is set to "off" with the start or termination according to the operation of the power switch.

In S301 of the cruise control state check flow, control information in the integrated control ECU of the vehicle control ECU 42 is acquired as "operation information" related to the cruise control. In subsequent S302, it is determined whether the automatic control switch is turned on, or not, based on the acquired information in S301. As a result, if a negative determination is made, the process proceeds to S303, where the cruise control state flag Fc is set to "off" indicating that the cruise control is in the off state, and then the process returns to S301. On the other hand, if an affirmative determination is made, the process proceeds to S304.

In S304, it is determined whether the cruise control is in the on state, or not, based on the acquired information in S301. As a result, if an affirmative determination is made, the process proceeds to S305, where the cruise control state flag Fc is set to "on" indicating that the cruise control is in the on state, and then the process returns to S301. On the other hand, if a negative determination is made, the process proceeds to S306, where the cruise control state flag Fc is set to "ready" indicating that the cruise control is in the ready state, and then the process returns to S301.

Next, the first virtual image display flow will be described as the display flow in the first virtual image display region A1 illustrated in FIGS. 20 and 21. In the flowchart, the route image 560, the start image 561, the termination image 562, the detection emphasized image 563, the vehicle emphasized image 564, the lane operation image 565, and the cruise operation image 566 are indicated by IMGR, IMGS, IMGE, IMGD, IMGV, IMGL, IMGC, respectively.

Figure 20:
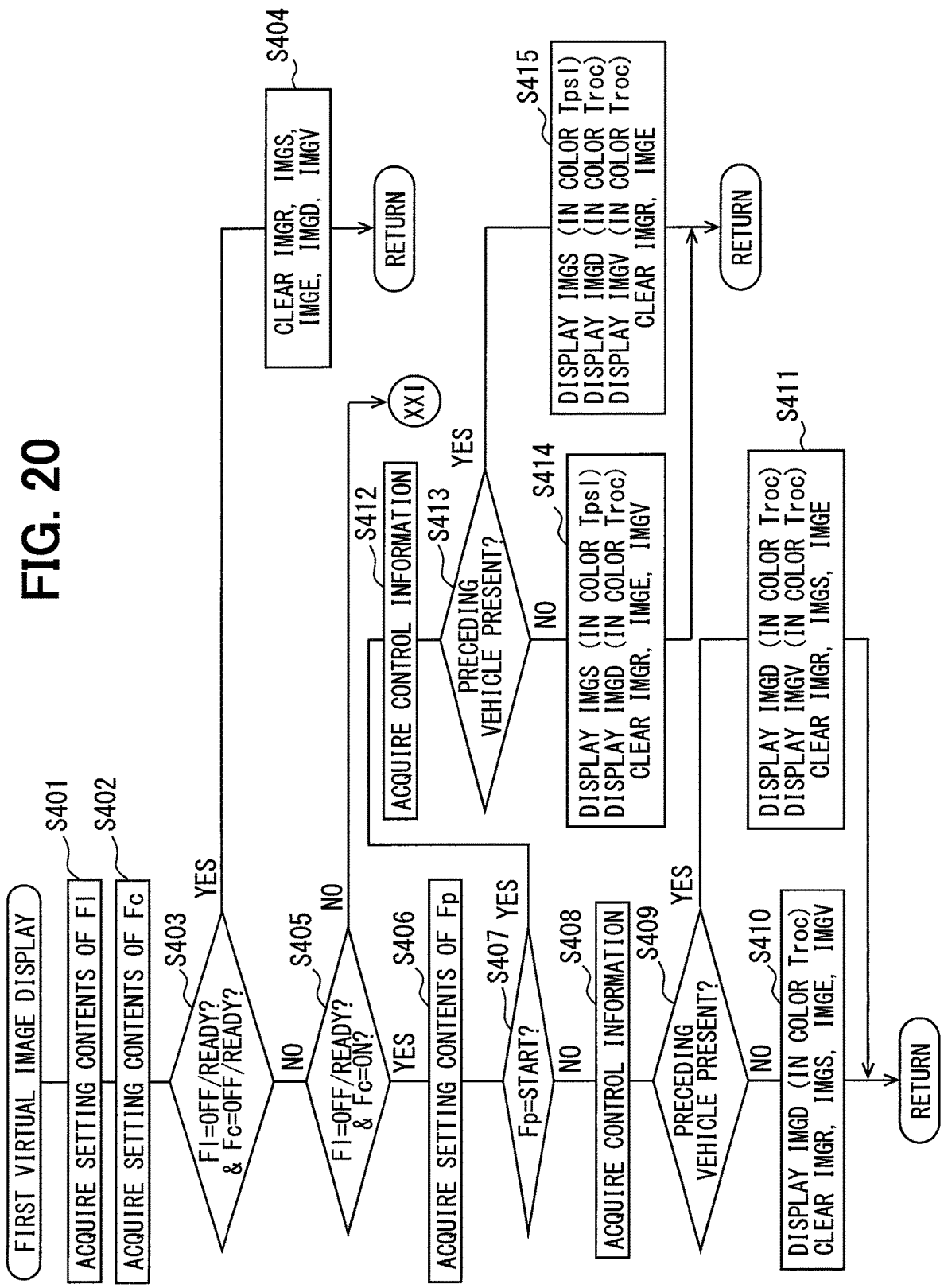
FIG. 20 is a flowchart illustrating a first virtual image display flow according to the first embodiment.

As illustrated in FIG. 20, in S401 of the first virtual image display flow, a setting content of the lane control state flag Fl is acquired. In the following S402, a setting content of the cruise control state flag Fc is acquired. In the following S403, it is determined whether a setting content of the lane control state flag Fl acquired in S401 is "off" or "ready", and a setting content of the cruise control state flag Fc acquired in S402 is "off" or "ready", or not. As a result, if an affirmative determination is made, the process shifts to S404 to clear the display of the images 560, 561, 562, 563, and 564 in the first virtual image display region A1 and then the process returns to S401. On the other hand, if a negative determination is made, the process proceeds to S405.

In S405, it is determined whether the setting content of the lane control state flag Fl acquired in S401 is "off" or "ready", and the setting content of the cruise control state flag Fc acquired in S402 is "on", or not. As a result, if an affirmative determination is made, the process proceeds to S406.

In S406, a setting content of the lane control schedule flag Fp is acquired. In the following S407, it is determined whether the setting content of the lane control schedule flag Fp acquired in S406 is "start", or not. As a result, if a negative determination is made, the process proceeds to S408 to acquire control information in the integrated control ECU of the vehicle control ECU 42 as "forward information" related to the preceding vehicle 8v. In the following S409, it is determined whether there is a preceding vehicle 8v to be followed by the host vehicle 2 under the cruise control, or not, based on the acquired information in S408. As a result, if a negative determination is made, the process proceeds to S410, whereas if an affirmative determination is made, the process proceeds to S411.

In S410 where the host vehicle 2 is traveling independently without the presence of the preceding vehicle 8v, the detection emphasized image 563 is formed with the display color of the real on period Troc and displayed in the first virtual image display region A1. In particular, in S410 of the present embodiment, the detection emphasized image 563 of the moving image fashion moving toward the horizontal line 8h side is formed based on the control information in the integrated control ECU acquired in S408. At the same time, in S410, the display of the images 560, 561, 562, and 564 in the first virtual image display region A1 is cleared.

On the other hand, in S411 where the preceding vehicle 8v is present, and host vehicle 2 is traveling while following the preceding vehicle 8v, the detection emphasized image 563 and the vehicle emphasized image 564 are sequentially formed with the display color of the real on period Troc and displayed in the first virtual image display region A1. In particular, in S411 of the present embodiment, after the detection emphasized image 563 of the moving image fashion moving toward the preceding vehicle 8v side is formed based on the control information in the integrated control ECU acquired in S408, the annular vehicle emphasized image 564 surrounding the preceding vehicle 8v is formed. At the same time, in S411, the display of the images 560, 561, and 562 in the first virtual image display region A1 is cleared. After the execution of S411 and S410 described above has been completed, the process returns to S401.

In the case where a negative determination is made in S407, a succeeding process is the above-described S408 to S411, whereas in the case where an affirmative determination is made in S407, the process shifts to S412. In S412, the control information in the integrated control ECU is acquired as "start information" related to the scheduled start position Ps and "forward information" related to the preceding vehicle 8v. In subsequent S413, it is determined whether there is the preceding vehicle 8v that is followed by the host vehicle 2 under the cruise control, or not, based on the acquired information in S412. As a result, if a negative determination is made, the process proceeds to S414, whereas if an affirmative determination is made, the process proceeds to S415.

In S414 where the host vehicle 2 is traveling independently, the start image 561 is formed with the display color of the scheduled start period Tpsl and displayed in the first virtual image display region A1. In particular, in S414 of the present embodiment, the start image 561 superimposed and displayed at the scheduled start position Ps is formed based on the control information in the integrated control ECU acquired in S412. At the same time, in S414, the detection emphasized image 563 is formed in the same manner as that in S410 described above and displayed in the first virtual image display region A1 on the basis of the control information in the integrated control ECU acquired in S412. Further, in S414, the display of the images 560, 562, and 564 in the first virtual image display region A1 is cleared.

On the other hand, in S415 where the host vehicle 2 is traveling in a follow-up manner, the start image 561 is formed in the same manner as that in S414 described above and displayed in the first virtual image display region A1 on the basis of the control information in the integrated control ECU acquired in S412. At the same time, in S415, the detection emphasized image 563 and the vehicle emphasized image 564 are formed in the same manner as that in S411 described above and displayed in the first virtual image display region A1 on the basis of the control information in the integrated control ECU acquired in S412. Further, in S415, the display of the images 560 and 562 in the first virtual image display region A1 is cleared. After the execution of S415 and S414 described above has been completed, the process returns to S401.

Figure 21:
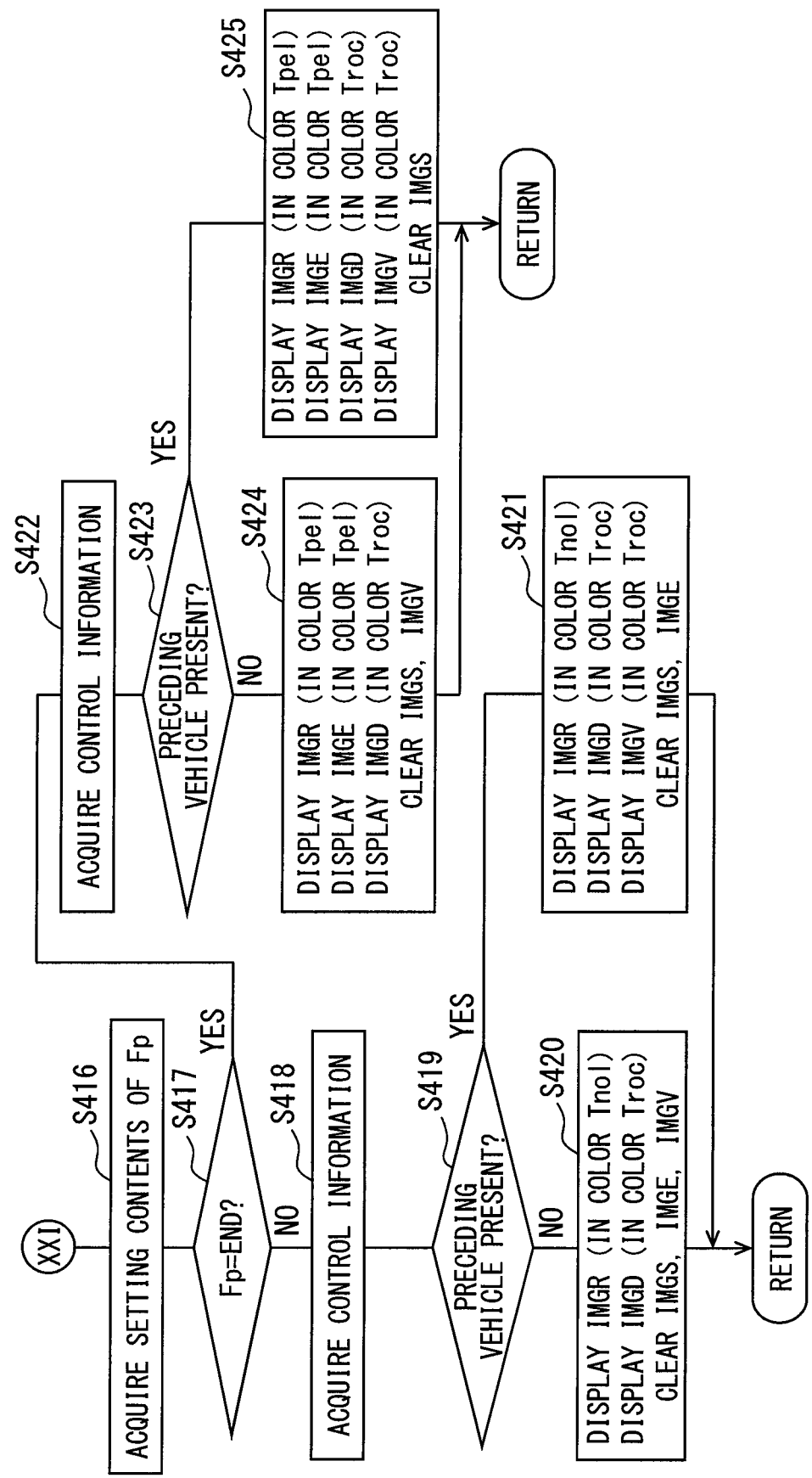
FIG. 21 is a flowchart illustrating a first virtual image display flow according to the first embodiment.

In the case where an affirmative determination is made in S405, a succeeding process is S406 to S415 described above, whereas in the case where a negative determination is made in S405, the process shifts to S416 as illustrated in FIG. 21. In other words, when the setting content of the lane control state flag Fl acquired in S401 is "on", and the setting content of the cruise control state flag Fc acquired in S402 is "on", the process proceeds to S416.

In S416, a setting content of the lane control schedule flag Fp is acquired. In subsequent S417, it is determined whether the setting content of the lane control schedule flag Fp acquired in S416 is "end", or not. As a result, if a negative determination is made, the process proceeds to S418 to acquire control information in the integrated control ECU as "route information" related to the scheduled route Rp and the "forward information" related to the preceding vehicle 8v. Further, in the following S419, it is determined whether there is a preceding vehicle 8v to be followed by the host vehicle 2 under the cruise control, or not, based on the acquired information in S418. As a result, if a negative determination is made, the process proceeds to S420, whereas if an affirmative determination is made, the process proceeds to S421.

In S420 where the host vehicle 2 is traveling independently, the route image 560 is formed with the display color of the normal on period Tnol and displayed in the first virtual image display region A1. In particular, in S420 of the present embodiment, the route image 560 superimposed and displayed on the scheduled route Rp is formed based on the control information in the integrated control ECU acquired in S418. At the same time, in S420, the detection emphasized image 563 is formed in the same manner as that in S410 described above and displayed in the first virtual image display region A1 on the basis of the control information in the integrated control ECU acquired in S418. Further, in S420, the display of the images 561, 562, and 564 in the first virtual image display region A1 is cleared.

On the other hand, in S421 where the host vehicle 2 is traveling in the follow-up manner, the route image 560 is formed in the same manner as that in S420 described above and displayed in the first virtual image display region A1 on the basis of the control information in the integrated control ECU acquired in S418. At the same time, in S421, the detection emphasized image 563 and the vehicle emphasized image 564 are formed in the same manner as that in S411 described above and displayed in the first virtual image display region A1 on the basis of the control information in the integrated control ECU acquired in S418. Further, in S421, the display of the images 561 and 562 in the first virtual image display region A1 is cleared. After the execution of S421 and S420 described above has been completed, the process returns to S401.

In the case where a negative determination is made in S417, a succeeding process is the above-described S418 to S421, whereas in the case where an affirmative determination is made in S417, the process shifts to S422. In S422, the control information in the integrated control ECU is acquired as "route information" related to the scheduled route Rp, "termination information" related to the scheduled termination position Pe, and "forward information" related to the preceding vehicle 8v. In subsequent S423, it is determined whether there is the preceding vehicle 8v that is followed by the host vehicle 2 under the cruise control, or not, based on the acquired information in S422. As a result, if a negative determination is made, the process proceeds to S424, whereas if an affirmative determination is made, the process proceeds to S425.

In S424 where the host vehicle 2 is traveling independently, the route image 560 is formed with the display color of the scheduled termination period Tpel and displayed in the first virtual image display region A1. At the same time, in S424, the termination image 562 is formed with the display color of the scheduled termination period Tpel and displayed in the first virtual image display region A1. In particular, in S424 of the present embodiment, the route image 560 superimposed and displayed on the scheduled route Rp and the termination image 562 superimposed and displayed at the scheduled termination position Pe on the scheduled route Rp are formed based on the control information in the integrated control ECU acquired in S422. Further, in S424, the detection emphasized image 563 is formed in the same manner as that in S410 described above and displayed in the first virtual image display region A1 on the basis of the control information in the integrated control ECU acquired in S422. Further, in S424, the display of the images 561 and 564 in the first virtual image display region A1 is cleared.

On the other hand, in S425 where the host vehicle 2 is traveling in the follow-up manner, the route image 560 and the termination image 562 are formed in the same manner as that in S424 described above and displayed in the first virtual image display region A1 on the basis of the control information in the integrated control ECU acquired in S422. At the same time, in S425, the detection emphasized image 563 and the vehicle emphasized image 564 are formed in the same manner as that in S411 described above and displayed in the first virtual image display region A1 on the basis of the control information in the integrated control ECU acquired in S422. Further, in S425, the display of the images 561 in the first virtual image display region A1 is cleared. After the execution of S425 and S424 described above has been completed, the process returns to S401.

Figure 22:
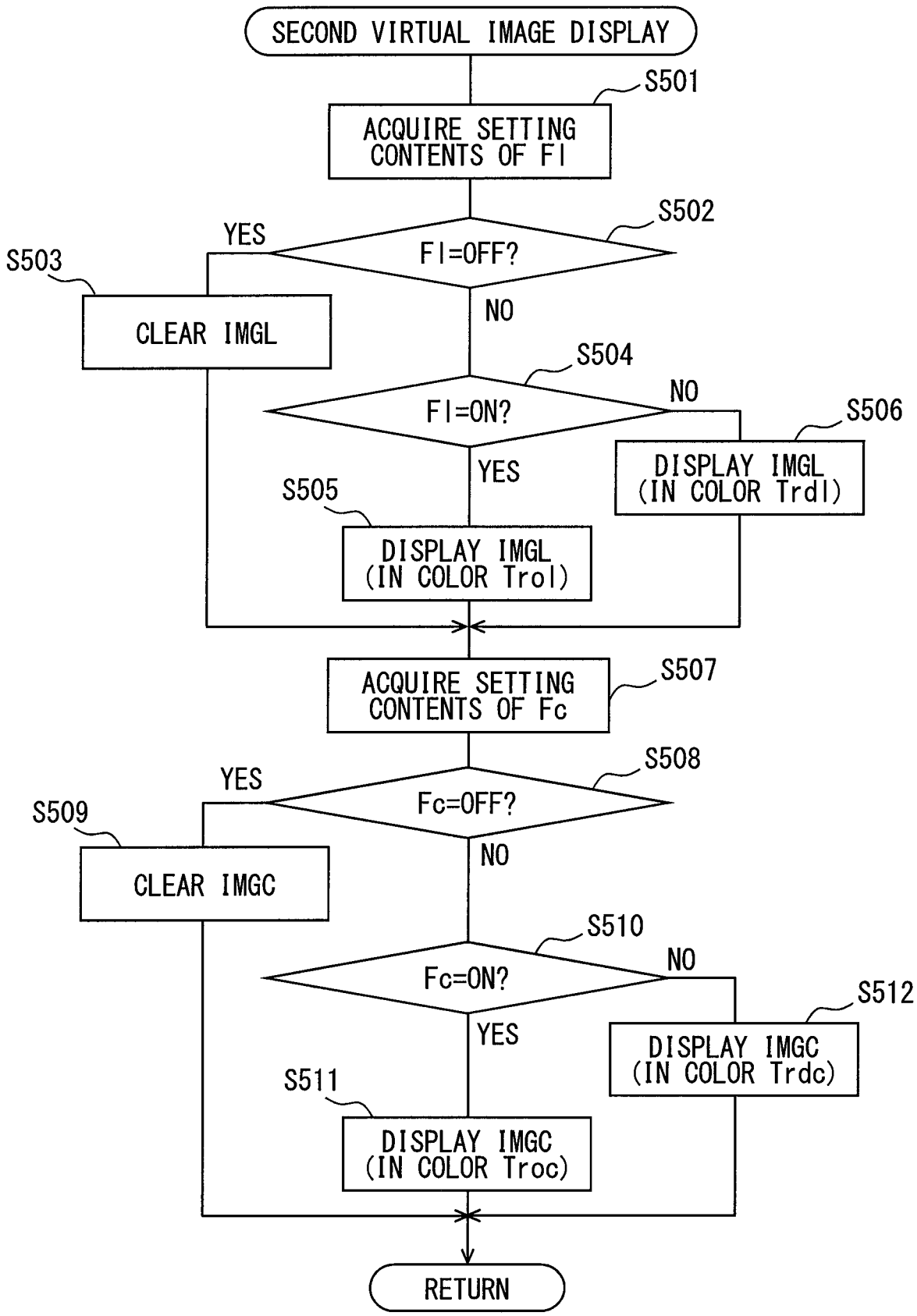
FIG. 22 is a flowchart illustrating a second virtual image display flow according to the first embodiment.

Next, the second virtual image display flow will be described as the display flow in the second virtual image display region A2 illustrated in FIG. 22.

In S501 of the second virtual image display flow, the setting content of the lane control state flag Fl is acquired. In subsequent S502, it is determined whether the setting content of the lane control state flag Fl acquired in S501 is "off", or not. As a result, if an affirmative determination is made, the process shifts to S503 to clear the display of the lane operation image 565 in the second virtual image display region A2. On the other hand, if a negative determination is made, the process proceeds to S504.

In S504, it is determined whether the setting content of the lane control state flag Fl acquired in S501 is "on", or not. As a result, if an affirmative determination is made, the process shifts to S505 where the lane operation image 565 is formed into the display color of the real on period Trol and displayed in the second virtual image display region A2. At this time, the display color of the real on period Trol is based on the setting content of the lane control state flag Fl. That is, the display color of the real on period Trol is a color based on the control information acquired as the "operation information" related to the lane control in order to set the lane control state flag Fl in the lane control state check flow.

On the other hand, if a negative determination is made in S504, the process shifts to S506 where the lane operation image 565 is formed with the display color of the ready period Trdl and displayed in the second virtual image display region A2. At this time, the display color of the ready period Trdl is based on the setting content of the lane control state flag Fl. That is, the display color of the ready period Trdl is based on the control information acquired as the "operation information" related to the lane control in order to set the lane control state flag Fl in the lane control state check flow. After the execution of S506 and S503, S505 described above has been completed, the process proceeds to S507.

In S507, a setting content of the cruise control state flag Fc is acquired. In subsequent S508, it is determined whether the setting content of the cruise control state flag Fc acquired in S507 is "off", or not. As a result, if an affirmative determination is made, the process shifts to S509 to clear the display of the cruise operation image 566 in the second virtual image display region A2. On the other hand, if a negative determination is made, the process proceeds to S510.

In subsequent S510, it is determined whether the setting content of the cruise control state flag Fc acquired in S507 is "on", or not. As a result, if an affirmative determination is made, the process shifts to S511 where the cruise operation image 566 is formed with the display color of the real on period Troc and displayed in the second virtual image display region A2. At this time, the display color of the real on period Troc is based on the setting content of the cruise control state flag Fc. In other words, the display color of the real on period Troc is a color based on the control information acquired as the "operation information" related to the cruise control in order to set the cruise control state flag Fc in the cruise control state check flow.

On the other hand, if a negative determination is made in S510, the process shifts to S512 where the cruise operation image 566 is formed with the display color of the ready period Trdc and displayed in the second virtual image display region A2. At this time, the display color of the ready period Trdc is based on the setting content of the cruise control state flag Fc. In other words, the display color of the ready period Trdc is a color based on the control information acquired as the "operation information" related to the cruise control in order to set the cruise control state flag Fc in the cruise control state check flow. After the execution of S512 and S509, S511 described above has been completed, the process returns to S501.

As described above, in the first embodiment, a portion of the HCU 54 which executes S101 to S106, S401, S418, and S422 corresponds to a "route information acquisition unit" implemented by the processor 54$p$, and a portion of the HCU 54 which executes S403 to S405, S407, S409 to S411, S413 to S415, S417, S419 to S421, and S423 to S425 corresponds to a "route image formation unit" implemented by the processor 54$p$. In the first embodiment, S101 to S106, S401, S418, and S422 correspond to a "route information acquisition step" to be executed by the processor 54$p$, and S403 to S405, S407, S409 to S411, S413 to S415, and S417, S419 to S421, and S423 to S425 correspond to a "route image formation step" to be executed by the processor 54$p$.

Furthermore, in the first embodiment, a portion of the HCU 54 which executes S201 to S207, S406, and S412 corresponds to a "start information acquisition unit" implemented by the processor 54$p$, and a portion of the HCU 54 which executes S403 to S405, S407, S409 to S411, S413 to S415, S417, S419 to S421, and S423 to S425 corresponds to a "start image formation unit" implemented by the processor 54$p$. In the first embodiment, a portion of the HCU 54 which executes S201 to S207, S416, and S422 corresponds to a "termination information acquisition unit" implemented by the processor 54$p$, and a portion of the HCU 54 which executes S403 to S405, S407, and S409 to S411, S413 to S415, S417, S419 to S421, and S423 to S425 corresponds to an "termination image formation unit" implemented by the processor 54$p$.

In addition, in the first embodiment, a portion of the HCU 54 which executes S301 to S306, S402, S408, S412, S418, and S422 corresponds to a "forward information acquisition unit" implemented by the processor 54$p$, and a portion of the HCU 54 which executes S403 to S405, S407, S409 to S411, S413 to S415, S417, S419 to S421, and S423 to S425 corresponds to an "emphasized image formation unit" implemented by the processor 54$p$. In the first embodiment, a portion of the HCU 54 which executes S101 to S106, S301 to S306, S501, and S507 corresponds to an "operation information acquisition unit" implemented by the processor 54$p$, and a portion of the HCU 54 which executes S502 to S506 and S508 to S512 corresponds to an "operation image formation unit" implemented by the processor 54$p$.

(Advantages)

The advantages of the above-described first embodiment will be described.

According to the first embodiment, the route image 560 as the display image 56 is formed by the HUD 50 in the first virtual image display region A1 superimposed on the forward traveling road 8r of the host vehicle 2. At this time, the route image 560 is formed on the basis of the control information in the integrated control ECU related to the route Rp so as to indicate the scheduled route Rp scheduled for the host vehicle 2 under the lane control in the integrated control ECU of the vehicle control ECU 42, thereby being superimposed on the forward traveling road 8r. This makes it possible for the user to grasp the correctness of the scheduled route Rp intuitively and in advance, based on a superimposed condition on the forward traveling road 8r, thereby being capable of bringing the feeling of security to the user.

Further, in the first embodiment, the route image 560 is formed so as to indicate the scheduled route Rp to be followed by the host vehicle 2 under the lane control in the integrated control ECU, and is superimposed on the forward traveling road 8r. This makes it possible for the user to grasp the correctness of the scheduled route Rp under the lane control intuitively and in advance, thereby being capable of bringing the feeling of security to the user.

Furthermore, in the first embodiment, the route image 560 is repetitively formed in a moving image fashion gradually extending forward from the host vehicle 2 side. This allows the user to intuitively and quickly grasp not only the correctness of the scheduled route Rp under the lane control but also the fact that the lane control is correctly continued. Therefore, the feeling of security can be enhanced.

According to the first embodiment, the route image 560 as the display image 56 as well as the start image 561 is formed by the HUD 50 in the first virtual image display region A1 superimposed on the forward traveling road 8r of the host vehicle 2. At this time, the start image 561 is formed on the basis of the control information in the integrated control ECU related to the scheduled start position Ps so as to indicate the scheduled start position Ps scheduled for the start of the lane control in the integrated control ECU, thereby being superimposed on the forward traveling road 8r. This allows the user to grasp not only the correctness of the scheduled route Rp but also the start of the lane control intuitively and in advance. Therefore, the feeling of security can be enhanced.

According to the first embodiment, the route image 560 as the display image 56 as well as the termination image 562 is formed by the HUD 50 in the first virtual image display region A1 superimposed on the forward traveling road 8r of the host vehicle 2. At this time, the termination image 562 is formed on the basis of the control information in the integrated control ECU related to the scheduled termination position Pe so as to indicate the scheduled termination position Pe scheduled for the termination after the lane control has started in the integrated control ECU, thereby being superimposed on the forward traveling road 8r. This allows the user to grasp not only the correctness of the scheduled route Rp but also the termination of the started lane control intuitively and in advance. Therefore, the feeling of security can be enhanced.

Furthermore, according to the first embodiment in which the display color of the termination image 562 is made different from the display color of the start image 561, the user can correctly grasp whether the lane control in the integrated control ECU is started or terminated. Therefore, such a change in the display color is effective in enhancing the user's feeling of security.

Furthermore, in the first embodiment, the display color of the route image 560 is set to the same color as the display color of the termination image 562 in the scheduled termination period Tpel in which the termination image 562 is formed. According to the above configuration, since a communication of the completion of the lane control by the integrated control ECU can be performed with the use of not only the termination image 562 but also the route image 560, the effect of allowing the user to grasp the communication correctly and in advance increases. Therefore, the above configuration is particularly effective in enhancing the user's feeling of security.

According to the first embodiment, the route image 560 as the display image 56 as well as the emphasized images 563 and 564 are formed by the HUD 50 in the first virtual image display region A1 superimposed on the forward traveling road 8r of the host vehicle 2. At this time, the emphasized images 563 and 564 are formed on the basis of the control information in the integrated control ECU related to the vehicle 8v so as to indicate the presence or absence of the preceding vehicle 8v to be followed by the host vehicle 2 under the cruise control in the integrated control ECU, thereby being superimposed on the forward traveling road 8r. This allows the user to intuitively and quickly grasp not only the correctness of the scheduled route Rp but also the presence or absence of the preceding vehicle 8v to be followed by the host vehicle 2 under the cruise control. Therefore, the feeling of security can be enhanced.

Furthermore, in the first embodiment, the detection emphasized image 563 is repetitively formed in a moving image fashion gradually moving forward from the host vehicle 2 side. This allows the user to intuitively and quickly grasp not only the correctness of the scheduled route Rp but also a fact that the presence or absence of the preceding vehicle 8v is correctly and continuously reflected on the cruise control. Therefore, the feeling of security can be enhanced.

Furthermore, in the first embodiment, the detection emphasized image 563 is repetitively formed in a moving image fashion gradually moving from the host vehicle 2 side toward the preceding vehicle 8v side, particularly, during the follow-up traveling of the host vehicle 2. This allows the user to intuitively and quickly grasp not only the correctness of the scheduled route Rp but also the fact that the preceding vehicle 8v to be followed under the cruise control is correct. Therefore, the feeling of security can be enhanced.

In the first embodiment, the detection emphasized image 563 during the follow-up traveling gradually moves to the preceding vehicle 8v in the moving image fashion, and then changes to the annular vehicle emphasized image 564 surrounding the preceding vehicle 8v. This makes it possible for the user to grasp the preceding vehicle 8v to be followed under the cruise control reliably and promptly, and therefore such changes in the emphasized images 563 and 564 are effective in enhancing the feeling of security.

Furthermore, in the first embodiment, the detection emphasized image 563 is repetitively formed in the moving image fashion gradually moving from the host vehicle 2 side toward the horizontal line 8h side of the forward traveling road 8r, particularly, during the independent traveling of the host vehicle 2. This allows the user to intuitively and quickly grasp not only the correctness of the scheduled route Rp but also the fact that the preceding vehicle 8v to be followed under the cruise control is not present. Therefore, the feeling of security can be enhanced.

In addition to the above, in the first embodiment, the operation images 565 and 566 as the display image 56 are formed by the HUD 50 in the second virtual image display region A2 that is set below the second virtual image display region A1 where the route image 560 superimposed on the forward traveling road 8r of the host vehicle 2 is formed, and on the host vehicle 2 side. In this example, the operation images 565 and 566 are formed on the basis of the control information in the integrated control ECU related to the state of the lane control or the cruise control so as to indicate the state of the lane control or the cruise control in the integrated control ECU.

Therefore, the operation images 565 and 566 are displayed as virtual images below the route image 560 and on the side of the host vehicle 2. As a result, although the operation images 565 and 566 deviate downward from the route image 560 where gazing points of the user gather, the operation images 565 and 566 can be visually recognized at a position close to the user side. From the above viewpoint, since the user can grasp not only the correctness of the scheduled route Rp but also the state of the lane control or the cruise control intuitively and promptly, the feeling of security can be enhanced.

Further, according to the first embodiment, the display colors of the operation images 565 and 566 are changed according to the switching of the state of the lane control or the cruise control, the user can correctly grasp the switching of the operation state. Therefore, such a change in the display color is effective in enhancing the user's feeling of security.

(Second Embodiment)

A second embodiment of the present disclosure is a modification of the first embodiment. A display image 56 according to the second embodiment, as illustrated in FIGS. 23 to 28, includes a route image 2560, a start image 2561, an termination image 2562, and operation images 2565, 2566, and 2567 which are different from those in the first embodiment together with emphasized images 563 and 564 similar to those in the first embodiment. Hereinafter, the route image 2560, the start image 2561, the termination image 2562, and the operation images 2565, 2566, and 2567 will be described.

Figure 23:
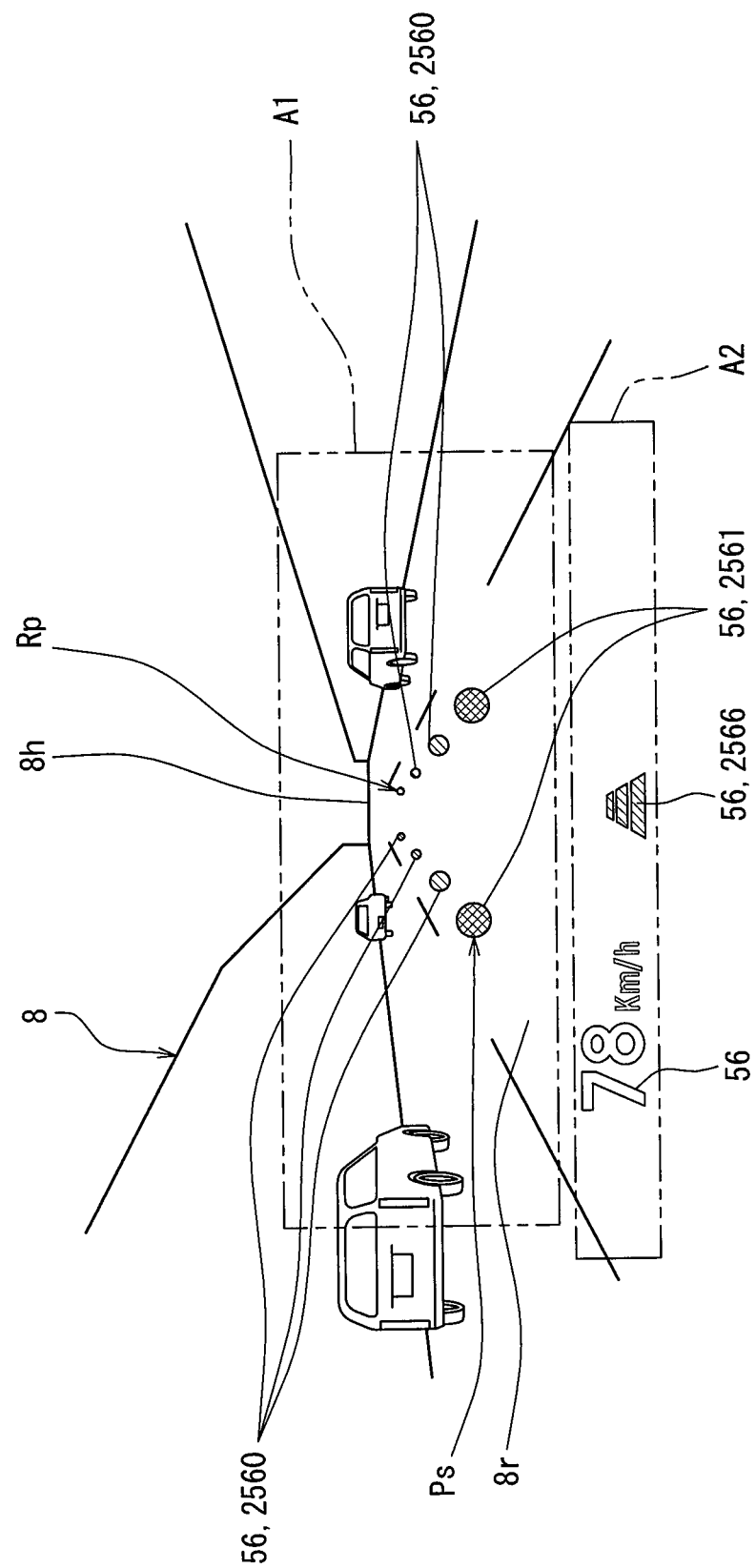
FIG. 23 is a front view illustrating a virtual image display state according to a second embodiment of the present disclosure.
Figure 24:
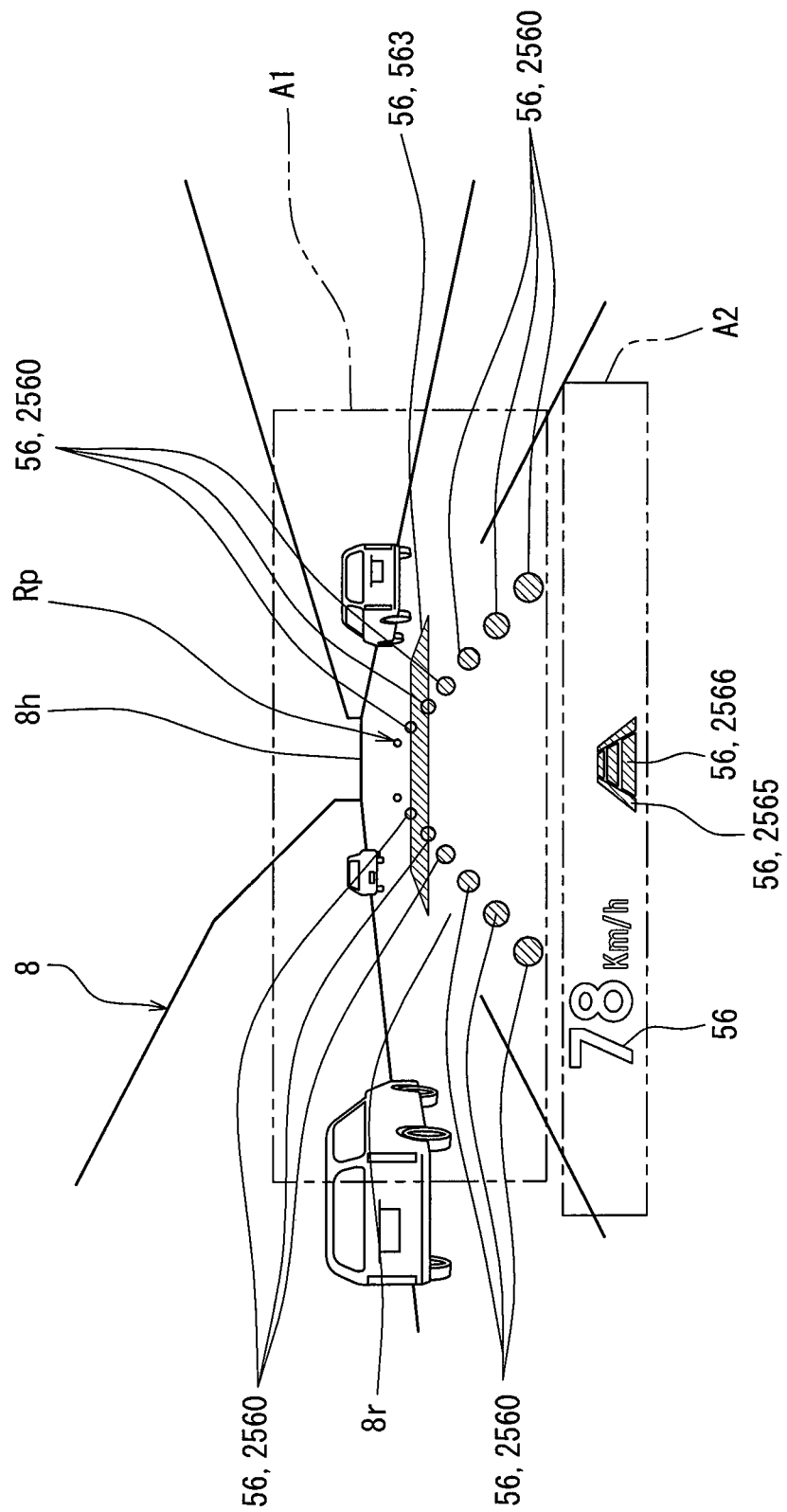
FIG. 24 is a front view illustrating a virtual image display state according to the second embodiment.
Figure 25:
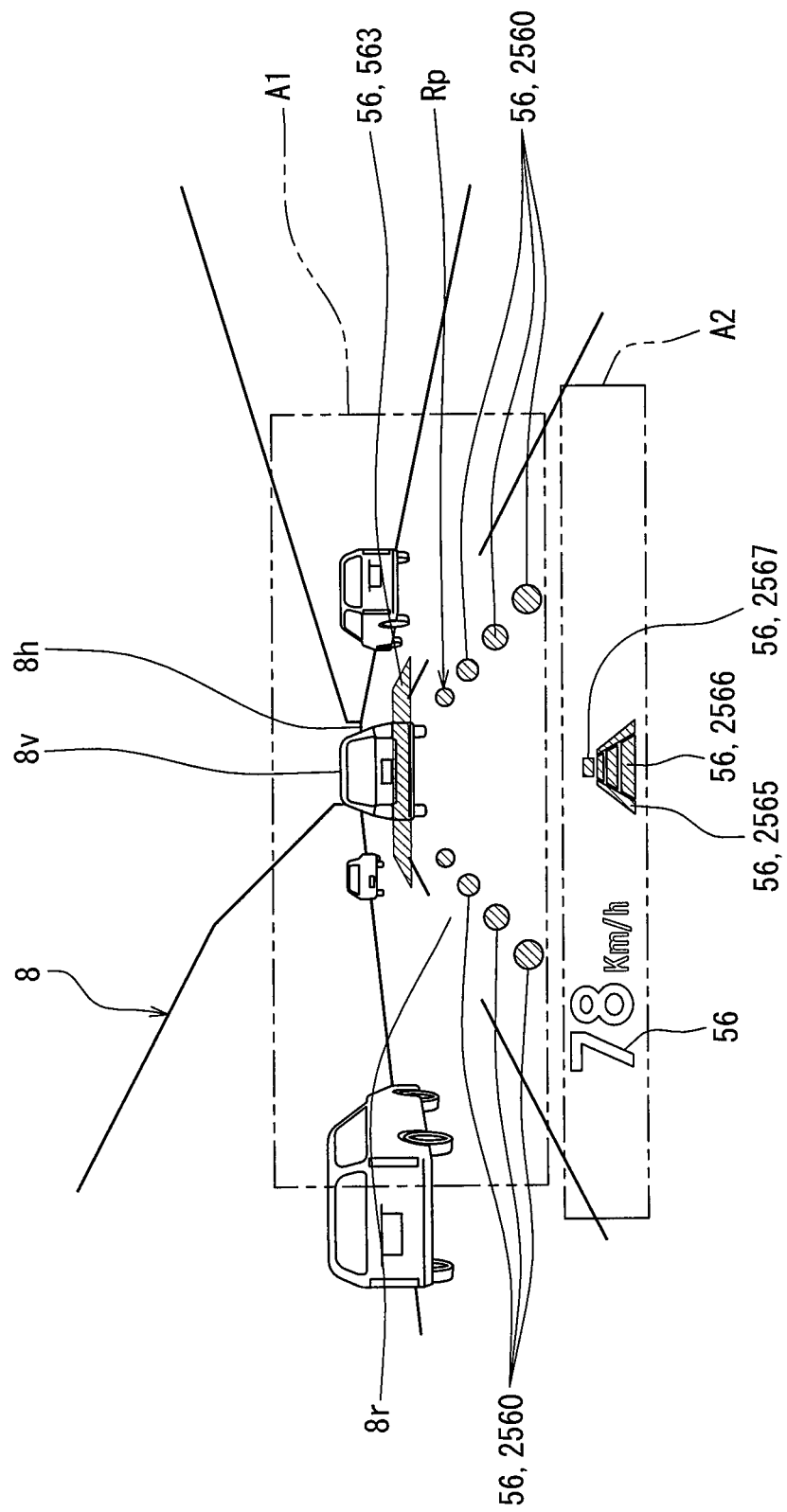
FIG. 25 is a front view illustrating a virtual image display state according to the second embodiment.
Figure 26:
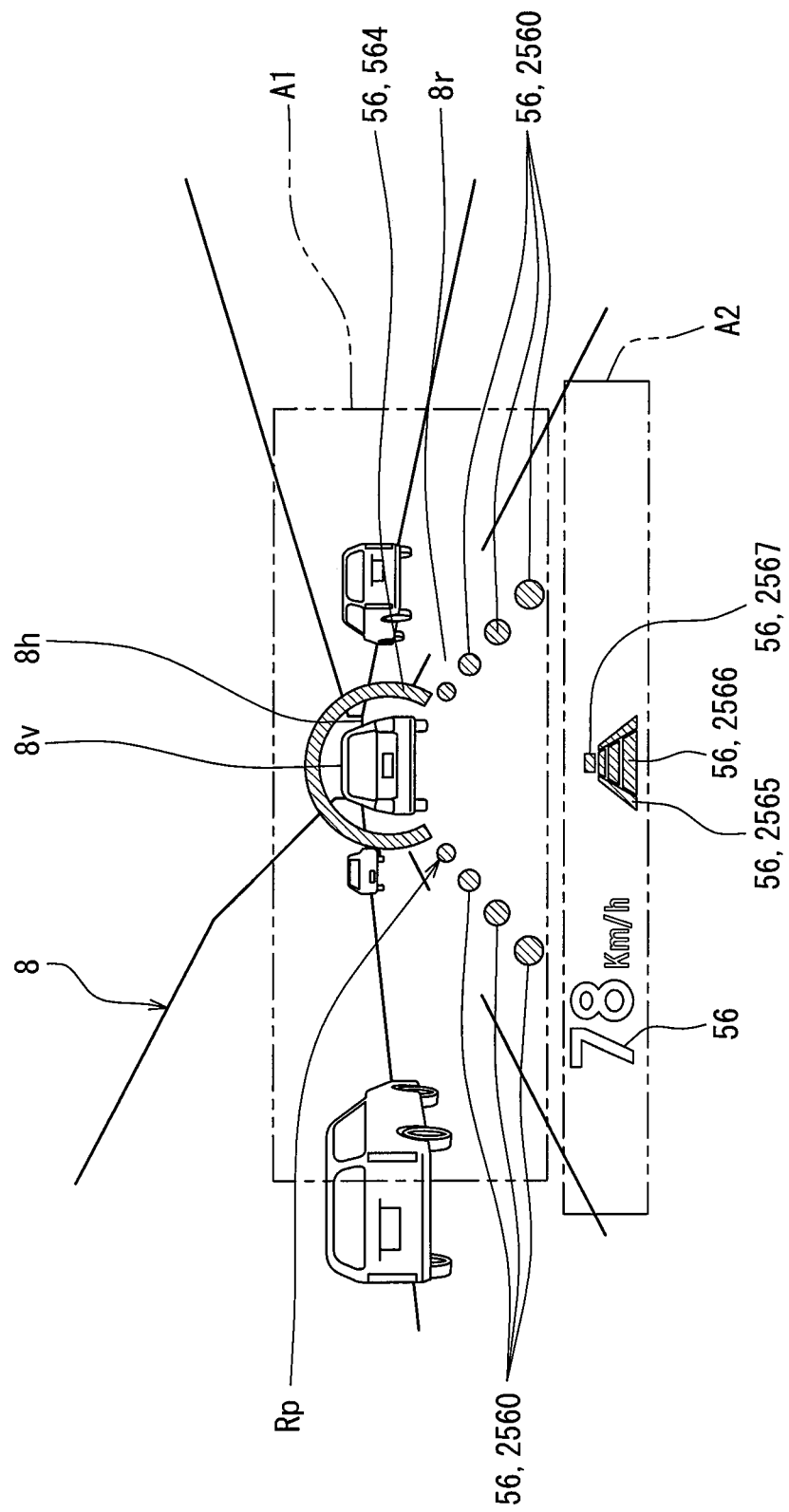
FIG. 26 is a front view illustrating a virtual image display state according to the second embodiment.
Figure 27:
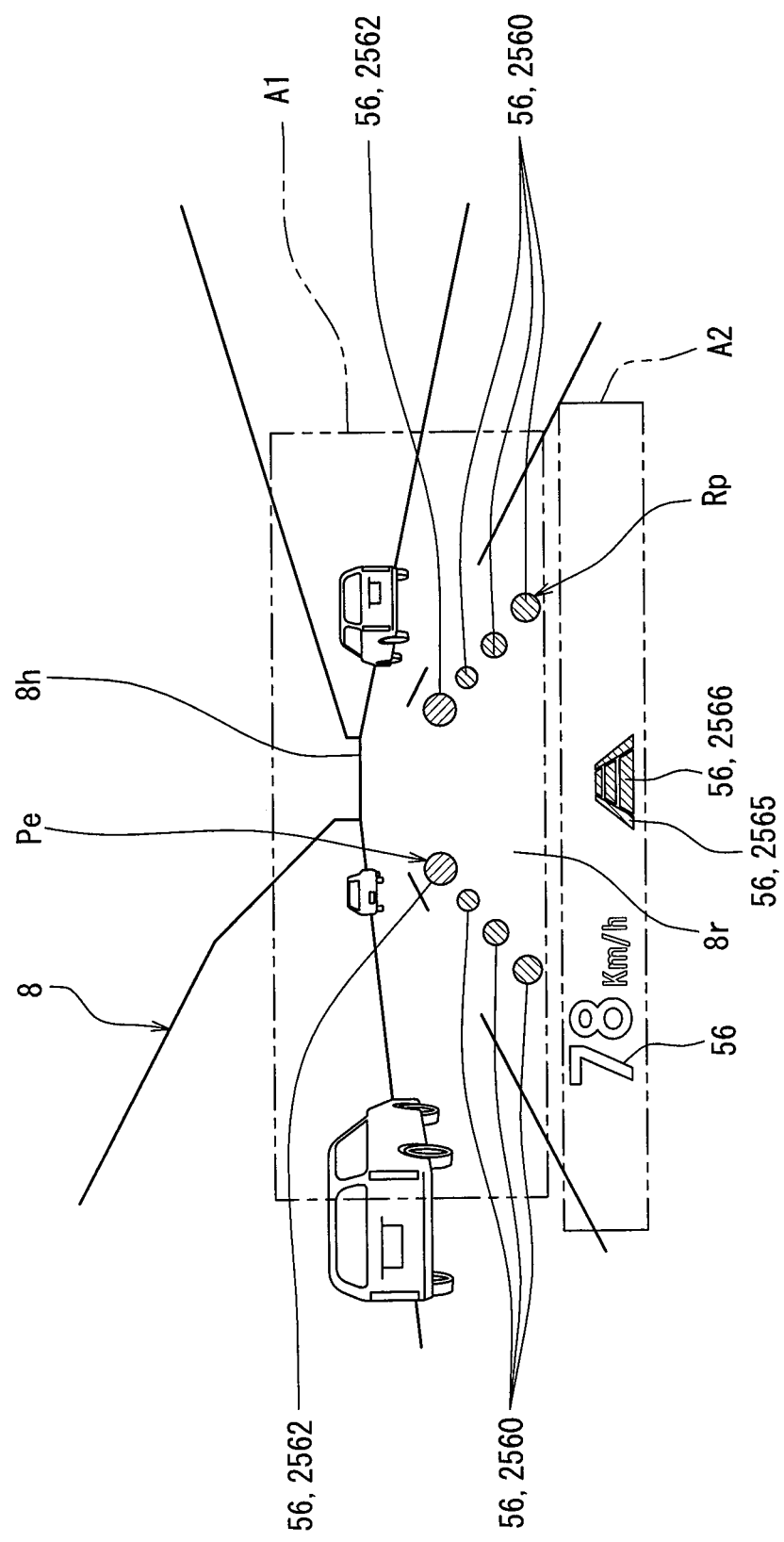
FIG. 27 is a front view illustrating a virtual image display state according to the second embodiment.

The route image 2560 illustrated in FIGS. 23 to 27 is continuously displayed as a virtual image in a scheduled start period Tpsl in addition to a normal on period Tnol and a scheduled termination period Tpel, as a result of which a scheduled route Rp is superimposed on a forward traveling road 8r in a first virtual image display region A1. In this example, as illustrated in FIGS. 23, 24, and 27, multiple route images 2560 when a host vehicle 2 travels independently are formed so as to be aligned from both sides of the host vehicle 2 toward a forward horizontal line 8h side in a dot shape. On the other hand, as illustrated in FIGS. 25 and 26, the multiple route images 2560 when the host vehicle 2 travels in a follow-up manner are formed so as to be aligned from both sides of the host vehicle 2 toward a preceding vehicle 8v side in a dot shape.

During each of those traveling, the route images 2560 are formed into a moving image fashion approaching the host vehicle 2 side according to a vehicle speed with the results that the route images 2560 are positioned and superimposed on predetermined places on the forward traveling road 8r. In any of those traveling, when the scheduled route Rp is straight, the respective route images 2560 are aligned straight as illustrated in FIGS. 23 to 27. On the other hand, when the scheduled route Rp is curved (not shown), an alignment direction of the route images 2560 is curved.

Figure 28:
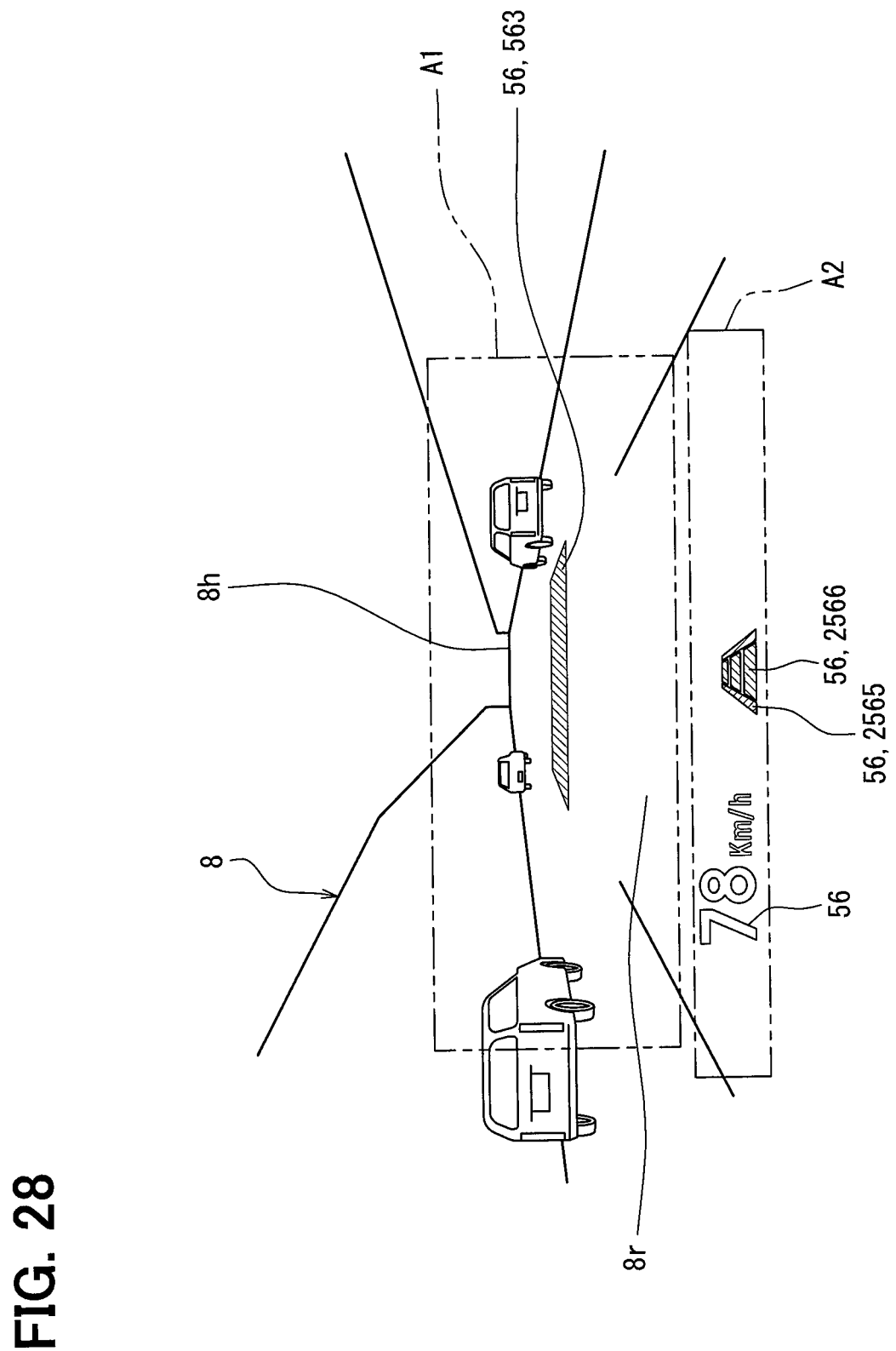
FIG. 28 is a front view illustrating a virtual image display state according to the second embodiment.

A display color of each of the route images 2560 has the same color with the exclusion of a display color of switching portions to the start image 2561 or the termination image 2562, which will be described in detail later, in either of periods Tpsl, Tnol, and Tpel at the time of independent traveling and follow-up traveling. For example, the display color of each route image 2560 is set to light blue or the like indicated by right-up hatched lines in FIGS. 23 to 27. Also, when the lane control enters a waiting state or an off state, the display itself of each route image 2560 is terminated as illustrated in FIG. 28.

The start image 2561 illustrated in FIG. 23 is continuously displayed as a virtual image together with the route images 2560 in the scheduled start period Tpsl. As a result, a scheduled start position Ps is indicated while being superimposed on a forward traveling road 8r in the first virtual display region A1. In this example, the start image 2561 is switched from a pair of images 2560 displayed at the lowest position among the route images 2560 displayed on the left and right sides of the host vehicle 2, and is formed in a dot shape. As a result, each start image 2561 is put into a moving image fashion approaching the host vehicle 2 side according to a vehicle speed. At this time, the display color of each start image 2561 is set to a color different from that of the route images 2560, for example, green or the like indicated by cross-hatched lines in FIG. 23. On the other hand, when the host vehicle 2 reaches the scheduled start position Ps, the display per se of each start image 2561 is terminated as illustrated in FIG. 24.

The termination images 2562 illustrated in FIG. 27 is continuously displayed as virtual images together with the route images 2560 in the scheduled termination period Tpel. As a result, a scheduled termination position Pe is indicated while being superimposed on the forward traveling road 8r in the first virtual display region A1. In this example, the termination images 2562 are switched from a pair of images 2560 displayed at the uppermost position among the route images 2560 displayed on the left and right sides of the host vehicle 2, and is formed in a dot shape. As a result, each termination image 2562 is put into a moving image fashion approaching the host vehicle 2 side according to a vehicle speed. At this time, the display color of each termination image 2562 is set to a color different from that of the route image 2560 and the start image 2561, for example, amber color which is indicated by left-up hatched lines in FIG. 27. On the other hand, when the host vehicle 2 reaches the scheduled termination position Pe, the display per se of each termination image 2562 is terminated as illustrated in FIG. 28.

The lane operation image 2565 illustrated in FIGS. 24 to 28 is continuously displayed as a virtual image in the real on period Trol and the ready period Trdl with the result that the state of the lane control is superimposed on the forward traveling road 8r in the second virtual image display region A2. In this example, the lane operation image 2565 imitates a lane marking by a pair of diagonally shaded figures which are spaced apart from each other in the left and right directions, thereby forming an imaginary lane control. In this case, a display color of the lane operation image 2565 is set according to a state of the lane control.

More specifically, in the real on period Trol, the display color of the lane operation image 2565 is set to the same color as that of the route image 2560, for example, light blue which is indicated by right-up hatched lines in FIGS. 24 to 27. On the other hand, in the ready period Trdl, the display color of the lane operation image 2565 is set to the same color as that of the termination images 2562 in the scheduled termination period Tpel, for example, amber color or the like which is indicated by left-up hatched lines in FIG. 28. Furthermore, when the lane control becomes in the off state, the display per se of the lane operation image 2565 is terminated as illustrated in FIG. 23. As described above, similarly, in the second embodiment, the display color of the lane operation image 2565 is changed as the lane control state is switched between the on state and the ready state.

The cruise operation image 2566 illustrated in FIGS. 23 to 28 is continuously displayed as a virtual image in the real on period Troc and the ready period Trdc with the result that the state of the cruise control is superimposed on the forward traveling road 8r in the second virtual image display region A2. In this example, the cruise operation image 2566 imitates a traveling lane with multiple diagonally shaded figures arranged vertically between hatched figures forming the lane operation image 2565, so as to form the imaginary cruise control. In this case, a display color of the cruise operation image 2566 is set according to a state of the cruise control.

More specifically, in the real on period Troc, the display color of the cruise operation image 2566 is set to the same color as that of the lane operation image 2565 in the real on period Trol, for example, light blue which is indicated by right-up hatched lines in FIGS. 24 to 28. On the other hand, in the ready period Trdc, the display color of the cruise operation image 2566 is set to the same color as that of the lane operation image 2565 in the ready period Trdl, for example, amber color or the like which is indicated by left-up hatched lines in FIG. 23. Furthermore, when the cruise control becomes in the off state, the display per se of the cruise operation image 2566 is terminated. As described above, similarly, in the second embodiment, the display color of the cruise operation image 2566 is changed as the cruise control state is switched between the on state and the ready state.

The follow-up operation image 2567 illustrated in FIGS. 25 and 26 is continuously displayed as a virtual image during the follow-up traveling in the real on period Troc with the result that the state of the follow-up traveling under the cruise control is superimposed on the forward traveling road 8r in the second virtual image display region A2. In this example, the follow-up operation image 2567 imitates the preceding vehicle 8v with a rectangular figure adjacent to an upper portion of the cruise operation image 2566 to form the imaginary cruise control during follow-up traveling. At this time, the display color of the follow-up operation image 2567 is set to the same color as that of the cruise operation image 2566 in the real on period Troc, for example, light blue which is indicated by right-up hatched lines in FIGS. 25 and 26. Furthermore, even if the cruise control is in the on state, when the host vehicle 2 switches from the follow-up traveling to independent traveling or the cruise control is turned off, the display per se of the follow-up operation image 2567 is terminated.

In the second embodiment described above, the HCU 54 performs the lane control state check flow, the lane control schedule check flow, and the cruise control state check flow similar to those in the first embodiment, while performing the first virtual image display flow and the second virtual image display flow different from those in the first embodiment. Therefore, the first virtual image display flow illustrated in FIGS. 29 to 31 and the second virtual image display flow illustrated in FIG. 32 will be described below. In the flowchart, the route image 2560, the start image 2561, the termination image 2562, the detection emphasized image 563, the vehicle emphasized image 564, the lane operation image 2565, and the cruise operation image 2566 are indicated by IMGR, IMGS, IMGE, IMGD, IMGV, IMGL, IMGC, respectively.

Figure 29:
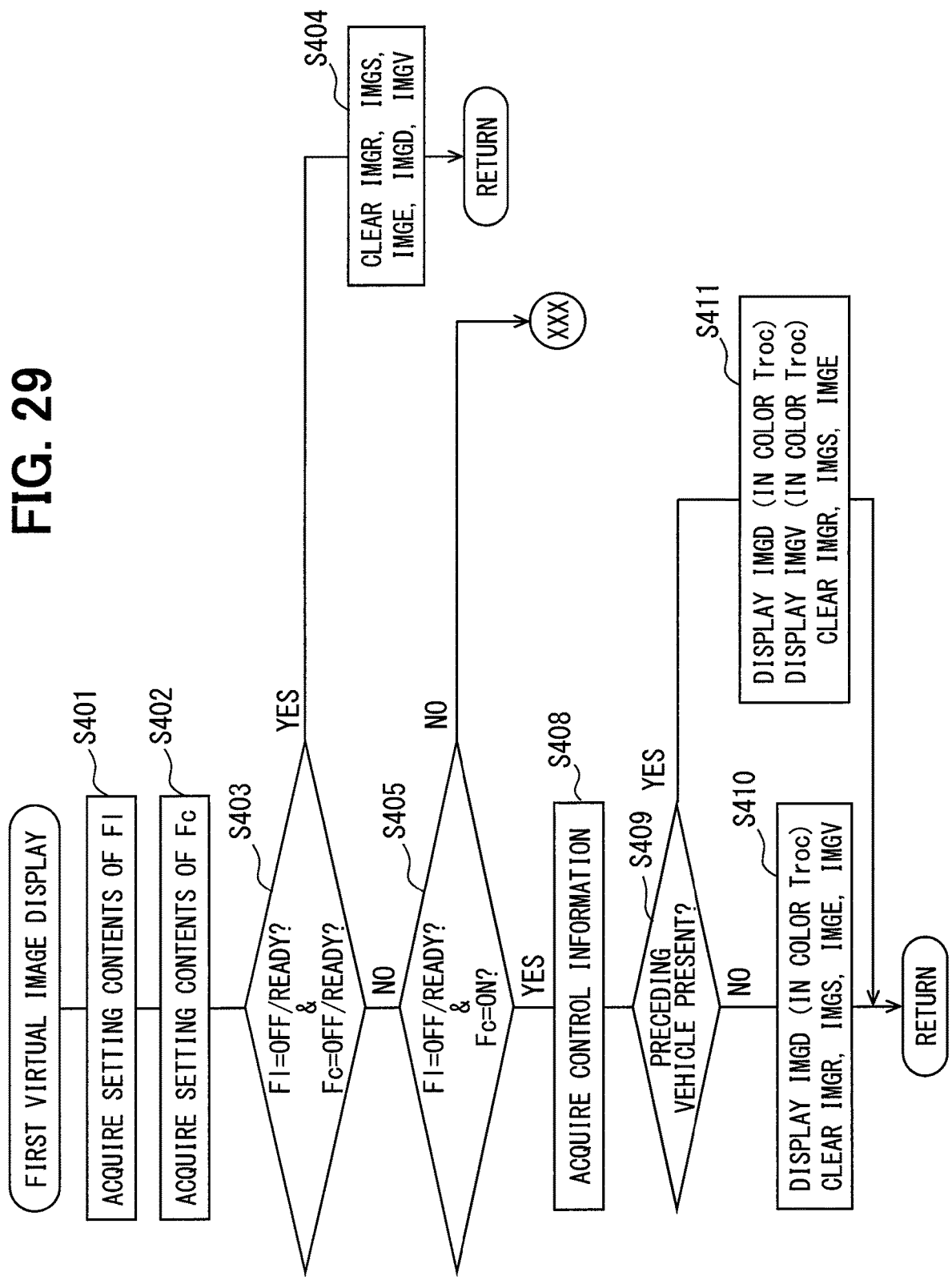
FIG. 29 is a flowchart illustrating a first virtual image display flow according to the second embodiment.

As illustrated in FIG. 29, in the first virtual image display flow according to the second embodiment, if an affirmative determination is made in S405 without the execution of S406 and S407, the process proceeds directly to S408 so that S401 to S405 and S408 to S411 are executed according to the first embodiment. In this example, the processing in S401 to S405 and S408 to S411 is processing in which the images 560, 561, and 562 are read as images 2560, 2561, and 2562.

Figure 30:
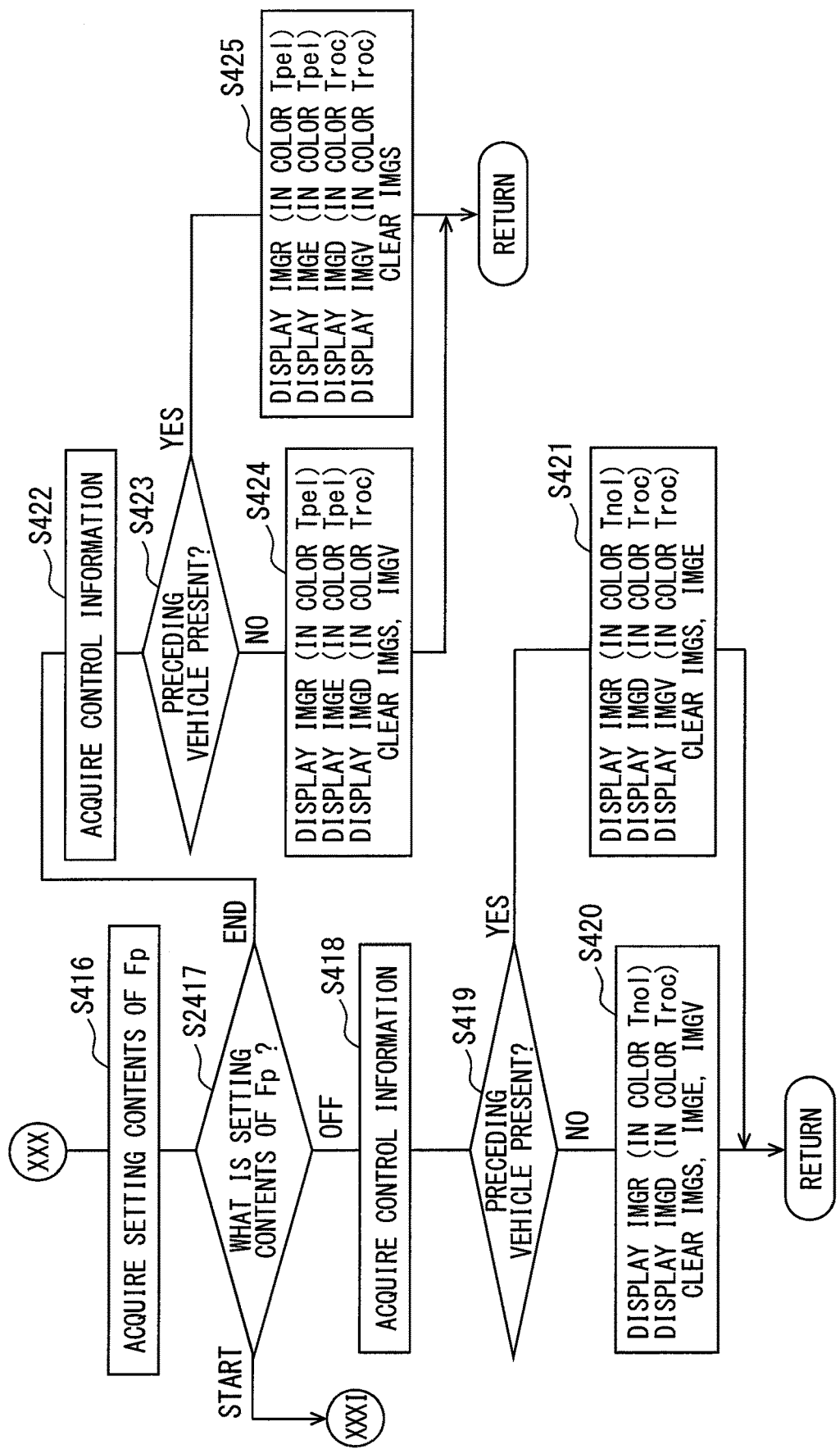
FIG. 30 is a flowchart illustrating a first virtual image display flow according to the second embodiment.

In the first virtual image display flow according to the second embodiment, when a negative determination is made in S405, S416 is executed as illustrated in FIG. 30, and then the process proceeds to S2417. In S2417, the setting content of the lane control schedule flag Fp acquired in S416 is determined. As a result, when the setting content of the lane control schedule flag Fp is "off", the processing proceeds to S418 to execute S418 to S421 according to the first embodiment. In this example, the processing in S418 to S421 is processing in which the images 560, 561, and 562 are read as images 2560, 2561, and 2562. On the other hand, as a result of the determination in S2417, if the setting content of the lane control schedule flag Fp is "end", the process proceeds to S422 to execute S422 to S425 according to the first embodiment. In this example, the processing in S422 to S425 is processing in which the images 560, 561, and 562 are read as images 2560, 2561, and 2562.

Figure 31:
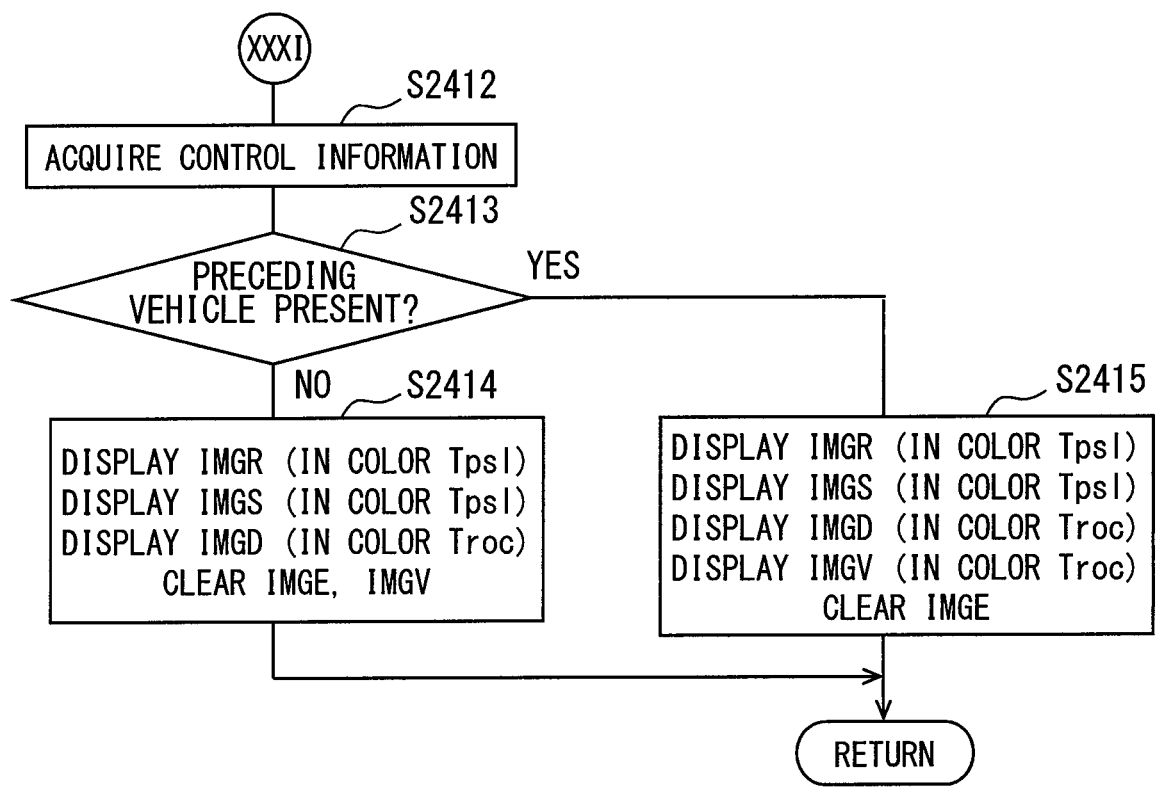
FIG. 31 is a flowchart illustrating a first virtual image display flow according to the second embodiment.

Furthermore, in the first virtual image display flow according to the second embodiment, as a result of the determination in S2417, if the setting content of the lane control schedule flag Fp is "start", the process proceeds to S2412 as illustrated in FIG. 31. In S2412, the control information in the integrated control ECU of the vehicle control ECU 42 is acquired as "route information" related to the scheduled route Rp, "start information" related to the scheduled start position Ps, and "forward information" related to the preceding vehicle 8v. In subsequent S2413, it is determined whether there is the preceding vehicle 8v that is followed by the host vehicle 2 under the cruise control, or not, based on the acquired information in S2412. As a result, if a negative determination is made, the process proceeds to S2414, whereas if an affirmative determination is made, the process proceeds to S2415.

In S2414 where the host vehicle 2 is traveling independently, the route image 2560 is formed with the display color of the scheduled start period Tpsl and displayed in the first virtual image display region A1. At the same time, in S424, the start image 2561 is formed with the display color of the scheduled start period Tpsl and displayed in the first virtual image display region A1. In particular, in S2414 of the present embodiment, the route image 2560 superimposed and displayed on the scheduled route Rp and the start image 2561 superimposed and displayed at the scheduled start position Ps on the scheduled route Rp are formed based on the control information in the integrated control ECU acquired in S2412. Further, in S2414, the detection emphasized image 563 is formed in the same manner as that in S410 described in the first embodiment and displayed in the first virtual image display region A1 on the basis of the control information in the integrated control ECU acquired in S2412. In addition, in S2414, the display of the images 2562 and 564 in the first virtual image display region A1 is cleared.

On the other hand, in S2415 where the host vehicle 2 is traveling in the follow-up manner, the route image 2560 and the start image 2561 are formed in the same manner as that in S2414 described above and displayed in the first virtual image display region A1 on the basis of the control information in the integrated control ECU acquired in S2412. At the same time, in S2415, the detection emphasized image 563 and the vehicle emphasized image 564 are formed in the same manner as that in S411 described in the first embodiment and displayed in the first virtual image display region A1 on the basis of the control information in the integrated control ECU acquired in S2412. Further, in S2415, the display of the images 2562 in the first virtual image display region A1 is cleared. After the execution of S2415 and S2414 described above has been completed, the process returns to S401.

Figure 32:
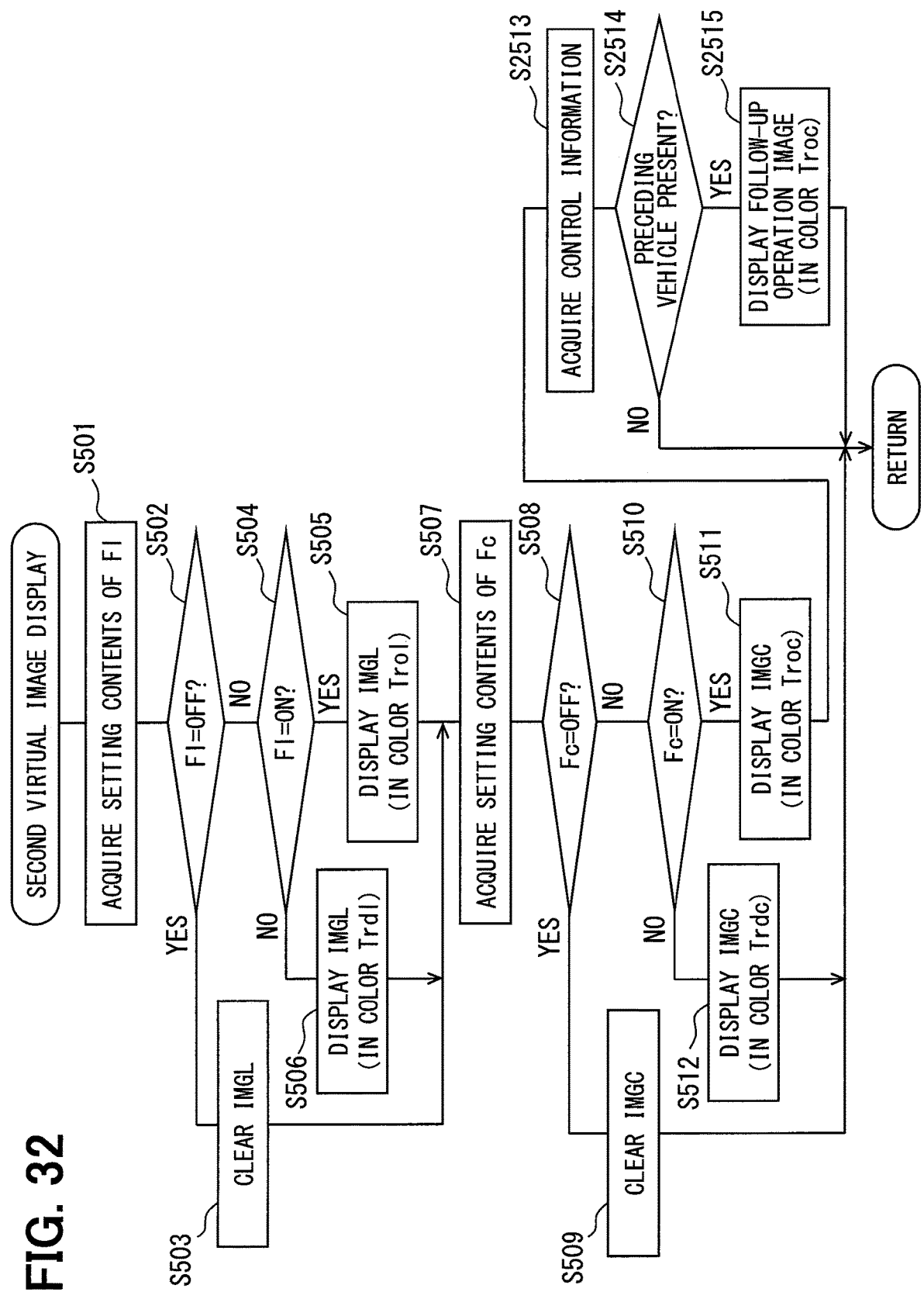
FIG. 32 is a flowchart illustrating a first virtual image display flow according to the second embodiment.

As illustrated in FIG. 32, in the second virtual image display flow according to the second embodiment, S501 to S512 are executed according to the first embodiment, except that the process proceeds to S2513 after the execution of S511 has been completed. In this example, the processing in S501 to S512 is processing in which the images 565 and 566 are read as images 2565 and 2566.

In S2513, control information in the integrated control ECU of the vehicle control ECU 42 is acquired as "operation information" related to the cruise control. In subsequent S2514, it is determined whether there is the preceding vehicle 8v that is followed by the host vehicle 2 under the cruise control, or not, based on the acquired information in S2513. As a result, if a negative determination is made, the process returns to S501, whereas if an affirmative determination is made, the process proceeds to S2515.

Further, in S2515, the follow-up operation image 2567 is formed with the display color of the real on period Troc and displayed in the second virtual image display region A2 on the basis of the control information in the integrated control ECU acquired in S2513. After the execution of S2515 described above has been completed, the process returns to S501.

As described above, in the second embodiment, a portion of the HCU 54 which executes S101 to S106, S401, S418, S422, and S2412 corresponds to a "route information acquisition unit" implemented by the processor 54p, and a portion of the HCU 54 which executes S403 to S405, S409 to S411, S419 to S421, S423 to S425, S2413 to S2415, and S2417 corresponds to a "route image formation unit" implemented by the processor 54p. In the first embodiment, S101 to S106, S401, S418, S422, and S2412 correspond to a "route information acquisition step" to be executed by the processor 54p, and S403 to S405, S409 to S411, S419 to S421, S423 to S425, S2413 to S2415, and S2417 correspond to a "route image formation step" to be executed by the processor 54p.

Furthermore, in the first embodiment, a portion of the HCU 54 which executes S201 to S207, S416, and S2412 corresponds to a "start information acquisition unit" implemented by the processor 54p, and a portion of the HCU 54 which executes S403 to S405, S409 to S411, S419 to S421, S423 to S425, S2413 to S2415, and S2417 corresponds to a "start image formation unit" implemented by the processor 54p. In the first embodiment, a portion of the HCU 54 which executes S201 to S207, S416, and S422 corresponds to a "termination information acquisition unit" implemented by the processor 54p, and a portion of the HCU 54 which executes S403 to S405, S409 To S411, S419 to S421, S423 to S425, S2413 to S2415, and S2417 corresponds to an "termination image formation unit" implemented by the processor 54p.

In addition, in the first embodiment, a portion of the HCU 54 which executes S301 to S306, S402, S408, S418, S422, and S2412 corresponds to a "forward information acquisition unit" implemented by the processor 54p, and a portion of the HCU 54 which executes S403 to S405, S409 to S411, S419 to S421, S423 to S425, S2413 to S2415, and S2417 corresponds to an "emphasized image formation unit" implemented by the processor 54p. In the first embodiment, a portion of the HCU 54 which executes S101 to S106, S301 to S306, S501, S507, and S2513 corresponds to an "operation information acquisition unit" implemented by the processor 54p, and a portion of the HCU 54 which executes S502 to S506, S508 to S512, S2514, and S2515 corresponds to an "operation image formation unit" implemented by the processor 54p.

According to the second embodiment described above, the same operational effects as those of the first embodiment can be obtained, except for the operational effects of the route image 560 of the moving image fashion which gradually extends and the operational effects of the images 560 and 562 of the same color. In addition, the route image 2560 according to the second embodiment is positioned and superimposed at a predetermined position on the forward traveling road 8r, as a result of which the route image 2560 is formed into a moving image fashion approaching the host vehicle 2 side according to the vehicle speed. This allows the user to intuitively and quickly grasp not only the correctness of the scheduled route Rp under the lane control but also the fact that the lane control is correctly continued. Therefore, the feeling of security can be enhanced.

(Other Embodiments)

Hereinbefore, multiple embodiments of the present disclosure are described. However, the present disclosure is not interpreted to be limited to the foregoing embodiments, and various embodiments and combinations thereof may be applied within a scope which does not depart from the gist of the present disclosure.

In Modification 1 related to the first embodiment, the route image 560 may be displayed in the scheduled start period Tpsl. In Modification 2 related to the second embodiment, the display of the route image 2560 may be cleared in the scheduled start period Tpsl. In Modification 2 described above, the dotted start image 2561 is displayed without displaying the route image 2560 in the scheduled start period Tpsl.

In Modification 3 related to the first embodiment, the elongated route image 560 may be continuously displayed so as to show the entirety of the scheduled route Rp. In Modification 4 related to the second embodiment, display in which the display number of the route image 2560 formed in a dot shape is gradually increased forward from the host vehicle 2 side may be repeated.

In Modification 5 according to the first embodiment, the display color of the route image 560 may be set to the same color in the normal on period Tnol and the scheduled termination period Tpel. In Modification 6 related to the second embodiment, the display color of the route image 2560 may be different between the normal on period Tnol and the scheduled termination period Tpel. In this example, in Modification 6 described above, further, the display color of the route image 2560 may be different among the normal on period Tnol, the scheduled termination period Tpel, and the scheduled start period Tpsl.

In Modification 7 related to the first and second embodiments, at least one of the start images 561, 2561 and the termination images 562, 2562 may not be displayed. In Modification 8 related to the first and second embodiments, at least one of the start image for indicating the scheduled start position scheduled to start the cruise control and the termination image for indicating the scheduled termination position scheduled to terminate the cruise control may be displayed.

In Modification 9 related to the first and second embodiments, at least one of the start images 561, 2561 and the termination images 562, 2562 may be blinkingly displayed. In Modification 10 related to the first and second embodiments, the display colors of the start images 561 and 2561 and the display colors of the termination images 562 and 2562 may be set to the same color.

In Modification 11 related to the first embodiment, the display color of the start image 561 and the display color of the route image 560 may be different from each other. In Modification 12 related to the second embodiment, the display color of the start image 2561 and the display color of the route image 2560 may be set to the same color.

In Modification 13 related to the first embodiment, the display color of the termination image 562 and the display color of the route image 560 may be different from each other. In Modification 14 related to the second embodiment, the display color of the termination image 2562 and the display color of the route image 2560 may be set to the same color.

In Modification 15 related to the first and second embodiments, the vehicle emphasized image 564 is displayed together with the detection emphasized image 563 at the time of follow-up traveling, but at the time of independent traveling, the display of the vehicle emphasized image 564 may be cleared together with the display of the detection emphasized image 563. In Modification 16 related to the first and second embodiments, the emphasized images 563 and 564 may be displayed only when a specific condition is satisfied. In this case, the specific condition is, for example, switching between independent traveling and follow-up traveling, a change in traveling line, and so on.

In Modification 17 related to the first and second embodiments, any one of the detection emphasized image 563 and the vehicle emphasized image 564 may not be displayed at the time of follow-up traveling. In Modification 18 related to the first and second embodiments, the emphasized images 563 and 564 may not be displayed. In Modification 19 related to the first and second embodiments, the display colors of the emphasized images 563 and 564 and the display color of the route image 560 may be different from each other.

In Modification 20 related to the first and second embodiments, at least one of the lane operation images 565, 2565 and the cruise operation images 566, 2566 may not be displayed. In Modification 21 related to the second embodiment, the follow-up operation image 2567 may not be displayed.

In Modification 22 related to the first and second embodiments, the display colors of the lane operation images 565 and 2565 may be set to a constant color irrespective of the state of the lane control. In Modification 23 related to the first and second embodiments, the display colors of the cruise operation images 566 and 2566 may be set to a constant color irrespective of the state of the cruise control.

In Modification 24 related to the first and second embodiments, instead of or in addition to the HDU 50, the operation images 565, 566, 2565, 2566, and 2567 may be displayed by at least one of the other display elements 51 and 52. In Modification 25 related to the first and second embodiments, notification by sound waves or sounds may be executed together with the display, clearing, and a change in the display color of the images 560, 561, 562, 563, 564, 565, 566, 2560, 2561, 2562, 2565, 2566, and 2567. In Modification 26 related to the first and second embodiments, notification by vibration imparting to the user may be executed together with the display, clearing, and a change in the display color of the images 560, 561, 562, 563, 564, 565, 566, 2560, 2561, 2562, 2565, 2566, and 2567.

In Modification 27 related to the first and second embodiments, under a condition that the automatic control switch is turned on, the lane control may be started and put into an on state by the on operation of the lane control switch regardless of the cruise control switch. In Modification 28 related to the first and second embodiments, the automatic control switch as the occupant sensor 41 may not be provided. In Modification 28 described above, the lane control may be started and put into the on state by the operation of turning on the lane control switch under the condition that the automatic control switch is turned on, or by only the operation of turning on the lane control switch as the occupant sensor 41 in combination with Modification 27. Further, in Modification 28, the cruise control may be started and put into the on state by only the operation of turning on the cruise control switch as the occupant sensor 41.

In Modification 29 related to the first and second embodiments, the scheduled route Rp to be followed by the host vehicle 2 may be set when executing the automatic control other than the lane control by the integrated control ECU as the vehicle control ECU 42, and the route images 560 and 2560 corresponding to the route Rp may be formed. In Modification 30 related to the first and second embodiments, a width direction position of the traveling lane of the host vehicle 2 may be automatically controlled by the integrated control ECU as the vehicle control ECU 42 so as to switch between a state of a departure control from the lane marking and a state of the lane change across the lane marking.

In Modification 31 related to the first and second embodiments, the cruising of the host vehicle 2 may be automatically controlled so that an adaptive cruise control (ACC) for keeping an inter-vehicle distance or a vehicle speed in a specific vehicle speed range such as a high speed range may be implemented by an integrated control ECU as the vehicle control ECU 42 instead of the FSRA. In Modification 32 related to the first and second embodiments, the cruise control may not be executed by the integrated control ECU as the vehicle control ECU 42. In Modification 32 described above, Modification 18 is adopted in combination.

Figure 33:
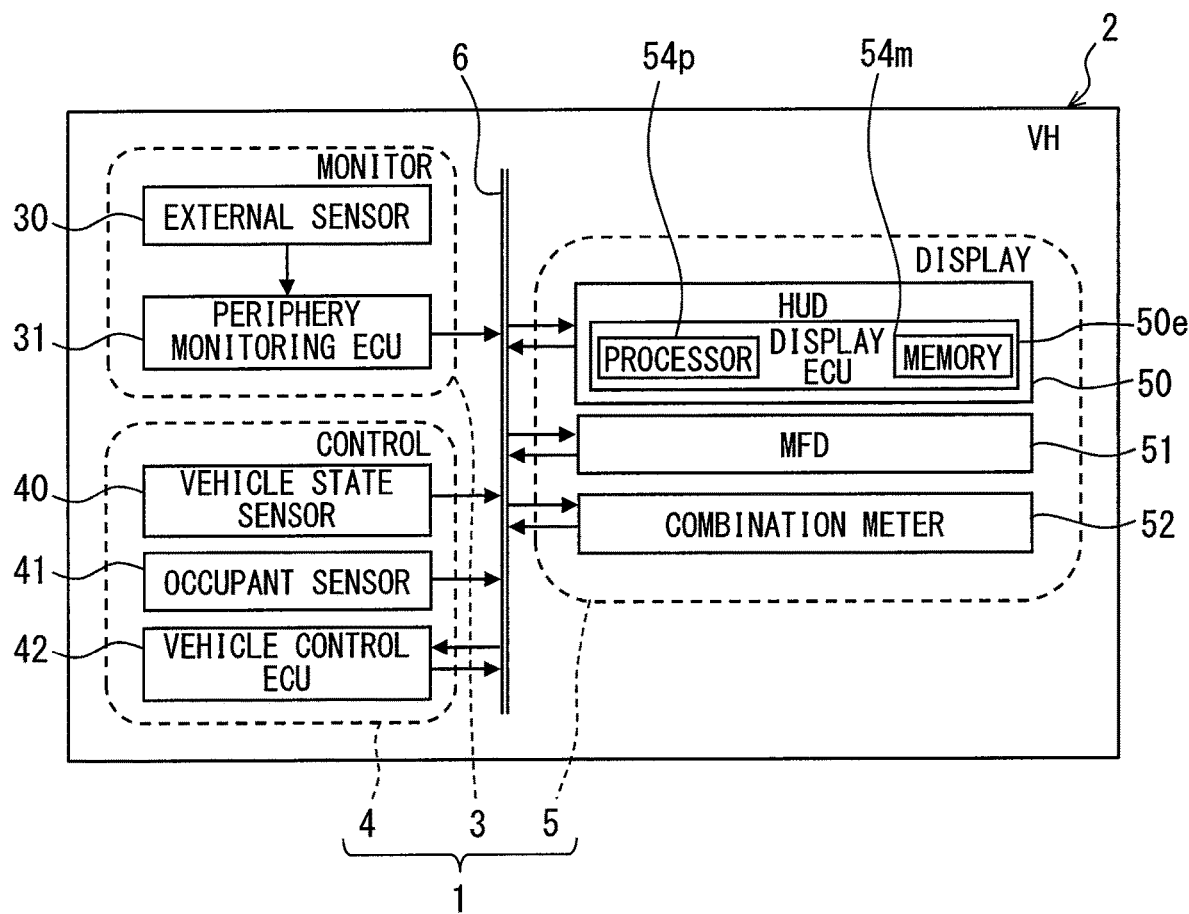
FIG. 33 is a block diagram illustrating a modification of FIG. 2.

In Modification 33 related to the first and second embodiments, the HCU 54 may not be provided. In such Modification 33, for example, one or more of the ECUs 31 and 42 and the display ECUs provided for controlling the display elements 50, 51 and 52 may function as the "vehicle display control device". In other words, the "virtual image display control unit" may be implemented by performing the display control flow of each embodiment with the use of a processor included in one or more types of ECUs. In this example, FIG. 33 illustrates Modification 33 in the case where the ECU 50e having the processor 54p and the memory 54m in the HUD 50 performs the function of the "vehicle display control device".

The present disclosure may be provided as a vehicle display control method.

It is noted that a flowchart or the processing of the flowchart in the present disclosure includes units (also referred to as steps), each of which is represented, for instance, as S101. Further, each unit can be divided into several sub-units while several units can be combined into a single unit. Furthermore, each of thus configured units can be also referred to as a circuit, device, module, or means.

Each or any combination of units explained in the above can be achieved as (i) a software unit in combination with a hardware unit (e.g., computer) or (ii) a hardware unit, including or not including a function of a related apparatus; furthermore, the hardware unit (e.g., integrated circuit, hard-wired logic circuit) may be constructed inside of a microcomputer.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

The invention claimed is:

1. A vehicle display control device executing a control to a virtual image display performed by a head-up display, wherein the head-up display superimposes a display image related to a traveling state of a host vehicle on an outside scenery of the host vehicle to perform the virtual image display, and an automatic control unit is equipped to the host vehicle and executes an automatic control to the traveling state of the host vehicle, the vehicle display control device comprising:
a route information acquisition unit that acquires route information related to a scheduled route of the host vehicle, the automatic control unit setting the scheduled route for the host vehicle;
a route image formation unit that forms a route image indicative of the scheduled route which the host vehicle is scheduled to follow under the automatic control, based on the route information acquired by the route information acquisition unit, the head-up display projecting the route image as the display image in a virtual image display region that is superimposed on a forward traveling road included in the outside scenery;
a termination information acquisition unit that acquires termination information related to a scheduled termination position where the automatic control executed by the automatic control unit is scheduled to terminate after the automatic control is started by the automatic control unit; and
a termination image formation unit that forms a termination image indicative of the scheduled termination position at which the automatic control is scheduled to terminate, as the display image based on the termination information acquired by the termination information acquisition unit, the head-up display projecting the termination image in the virtual image display region that is superimposed on the forward traveling road,
wherein the route information acquisition unit, the route image formation unit, the termination information acquisition unit, and the termination image formation unit are implemented by at least one processor.

2. The vehicle display control device according to claim 1, wherein
the host vehicle is equipped with, as the automatic control unit, a lane control unit that executes, as the automatic control, a lane control for automatically controlling a width direction position of the host vehicle within a traveling lane of the host vehicle, and
the route image formation unit forms the route image indicative of the scheduled route to be traveled by the host vehicle under the lane control of the lane control unit, and the route image is used in the control of the virtual image display in the host vehicle.

3. The vehicle display control device according to claim 2, wherein the route image formation unit repeatedly forms the route image in a moving image fashion so that the route image repeatedly formed in the moving image fashion gradually extends from the host vehicle in a forward direction.

4. The vehicle display control device according to claim 2, wherein the route image formation unit repeatedly forms the route image in a moving image fashion, and each route image is positioned and superimposed on a predetermined place on the forward traveling road so that the route image repeatedly formed in the moving image fashion approaches the host vehicle corresponding to a vehicle speed of the host vehicle.

5. The vehicle display control device according to claim 1, wherein the route image formation unit sets a display color of the route image identical to the display color of the termination image during a period while the termination image is formed by the termination image formation unit.

6. The vehicle display control device according to claim 1, wherein
the host vehicle is equipped with, as the automatic control unit, a cruise control unit that executes, as the automatic control, a cruise control for automatically controlling a cruise of the host vehicle during a follow-up traveling or an independent traveling, the follow-up traveling or the independent traveling is defined according to presence or absence of a preceding vehicle in the outside scenery,
the vehicle display control device further includes:
a forward information acquisition unit that acquires forward information related to the preceding vehicle; and
an emphasized image formation unit that forms, as the display image, an emphasized image in which the presence or absence of the preceding vehicle the host vehicle follows under the cruise control of the cruise control unit is displayed in an emphasized manner based on the forward information acquired by the forward information acquisition unit, the head-up display projecting the emphasized image as the display image in the virtual image display region that is superimposed on the forward traveling road, and
the route information acquisition unit, the route image formation unit, the termination information acquisition unit, the termination image formation unit, the forward information acquisition unit, and the emphasized image formation unit are implemented by the at least one processor.

7. The vehicle display control device according to claim 6, wherein the emphasized image formation unit repeatedly forms the emphasized image in a moving image fashion so that the emphasized image repeatedly formed gradually moves away from the host vehicle in a forward direction.

8. The vehicle display control device according to claim 7, wherein, during the follow-up traveling under the cruise control of the cruise control unit, the emphasized image formation unit repeatedly forms the emphasized image in a moving image fashion so that the emphasized image repeatedly formed gradually moves from the host vehicle toward the preceding vehicle.

9. The vehicle display control device according to claim 8, wherein, during the follow-up traveling under the cruise control of the cruise control unit, the emphasized image formation unit repeatedly forms the emphasized image in the moving image fashion so that the emphasized image has an annular shape that surrounds the preceding vehicle after the emphasized image repeatedly formed gradually moves to the preceding vehicle.

10. The vehicle display control device according to claim 7, wherein, during the independent traveling under the cruise control of the cruise control unit, the emphasized image formation unit repeatedly forms the emphasized image in a moving image fashion so that the emphasized image repeatedly formed gradually moves from the host vehicle toward a horizontal line of the forward traveling road.

11. The vehicle display control device according to claim 1, further comprising:
   an operation information acquisition unit that acquires operation information related to an operation state of the automatic control unit; and
   an operation image formation unit that forms, as the display image, an operation image indicative of the operating state of the automatic control unit based on the operation information acquired by the operation information acquisition unit, the virtual image display region being defined as a first virtual image display region, the head-up display projecting the operation image as the display image in a second virtual image display region which is disposed below the first virtual image display region close to the host vehicle,
   wherein the route information acquisition unit, the route image formation unit, the termination information acquisition unit, the termination image formation unit, the operation information acquisition unit, and the operation image formation unit are implemented by the at least one processor.

12. The vehicle display control device according to claim 11, wherein the operation image formation unit changes a display color of the operation image when the operation state of the automatic control unit is switched.

13. A vehicle display control method for executing a control to a virtual image display performed by a head-up display, wherein the head-up display superimposes a display image related to a traveling state of a host vehicle on an outside scenery of the host vehicle to perform the virtual image display, and an automatic control unit is equipped to the host vehicle and executes an automatic control to the travelling state of the host vehicle,
   the vehicle display control method comprising:
   acquiring route information related to a scheduled route of the host vehicle, the automatic control unit setting the scheduled route for the host vehicle;
   forming a route image indicative of the scheduled route which the host vehicle is scheduled to follow under the automatic control, based on the route information that is acquired, the head-up display projecting the route image as the display image in a virtual image display region that is superimposed on a forward traveling road included in the outside scenery;
   acquiring termination information related to a scheduled termination position where the automatic control executed by the automatic control unit is scheduled to terminate after the automatic control is started by the automatic control unit; and
   forming a termination image indicative of the scheduled termination position at which the automatic control is scheduled to terminate, as the display image based on the acquired termination information, the head-up display projecting the termination image in the virtual image display region that is superimposed on the forward traveling road,
   wherein the acquiring of the route information, the forming of the route image, the acquiring of the termination information, and the forming of the termination image are executed by at least one processor.

14. The vehicle display control device according to claim 1, wherein the route image and the termination image are superimposed on, of the outside scenery of the host vehicle, a same lane so as to be spaced apart from each other.

15. The vehicle display control device according to claim 1, wherein the route image and the termination image are superimposed on the outside scenery of the host vehicle so that in the outside scenery, the termination image has a longer length than the route image in a lane width direction.

16. The vehicle display control device according to claim 1, wherein the route image and the termination image are formed in a same shape.

* * * * *